United States Patent
Huynh

(10) Patent No.: US 10,646,028 B1
(45) Date of Patent: May 12, 2020

(54) BRUSH ASSEMBLIES

(71) Applicant: Nathan Quang Huynh, Sugar Land, TX (US)

(72) Inventor: Nathan Quang Huynh, Sugar Land, TX (US)

( * ) Notice: Subject to any disclaimer, the term of this patent is extended or adjusted under 35 U.S.C. 154(b) by 0 days.

(21) Appl. No.: 16/423,158

(22) Filed: May 28, 2019

Related U.S. Application Data

(60) Provisional application No. 62/817,551, filed on Mar. 12, 2019.

(51) Int. Cl.
   A46B 13/02 (2006.01)
   A46B 7/06 (2006.01)
(52) U.S. Cl.
   CPC .............. *A46B 13/023* (2013.01); *A46B 7/06* (2013.01)
(58) Field of Classification Search
   CPC . A46B 13/023; A46B 7/06; A46B 2200/1066; A46B 13/02; A61C 17/222; A61C 17/349; A61C 17/3436; A61C 17/22
   See application file for complete search history.

(56) References Cited

U.S. PATENT DOCUMENTS

| | | | |
|---|---|---|---|
| 2,935,755 A | 5/1960 | Leira | |
| 3,082,457 A | 3/1963 | Lucibe et al. | |
| 4,240,452 A * | 12/1980 | Jean | A46B 5/0029 15/167.1 |
| 4,346,492 A | 8/1982 | Solow | |
| 4,633,542 A | 1/1987 | Taravel | |
| 4,691,405 A | 9/1987 | Reed | |
| 4,694,844 A * | 9/1987 | Berl | A46B 3/00 132/308 |
| 4,795,347 A * | 1/1989 | Maurer | A46B 7/06 15/167.2 |
| 5,224,234 A | 7/1993 | Arsenault | |
| 5,259,083 A * | 11/1993 | Stansbury, Jr. | A61C 17/32 15/22.1 |
| 5,274,870 A | 1/1994 | Stollman | |
| 5,435,032 A * | 7/1995 | McDougall | A46B 7/06 15/201 |
| 5,956,797 A | 9/1999 | Wilson | |
| 6,785,999 B1 | 9/2004 | Fritsch | |
| 6,988,777 B2 | 1/2006 | Pfenniger | |
| 7,174,596 B2 | 2/2007 | Fischer | |
| 7,334,283 B2 * | 2/2008 | Kunita | A46B 7/06 15/167.1 |
| 7,600,288 B1 | 10/2009 | Givonetti | |
| 7,743,452 B1 | 6/2010 | Tcholakov | |
| 8,069,524 B2 | 12/2011 | Kraemer | |

(Continued)

FOREIGN PATENT DOCUMENTS

| | | |
|---|---|---|
| EP | 3409141 A1 | 5/2018 |
| WO | WO2002082947 A1 | 4/2002 |
| WO | WO2012035490 A1 | 3/2012 |

*Primary Examiner* — Robert J Scruggs
(74) *Attorney, Agent, or Firm* — Nathan Q. Huynh

(57) ABSTRACT

The disclosure herein includes a brush assembly, which brush assembly may include: a motor capable of generating vibration; a head coupled to the motor, wherein the head may be capable of receiving vibration generated by the motor; a face removably coupled to the head; and a tuft slidably coupled to the face, wherein a surface of the head may be capable of pushing an end of the tuft a distance away from the surface.

13 Claims, 26 Drawing Sheets

(56) References Cited

U.S. PATENT DOCUMENTS

| | | |
|---|---|---|
| 8,132,284 B1 | 3/2012 | Kraemer |
| 8,332,982 B2 | 12/2012 | Braun et al. |
| 8,595,882 B2 | 12/2013 | Bax |
| 8,869,340 B2 | 10/2014 | Lee |
| 10,080,428 B2 | 9/2018 | Kern |
| 2005/0269078 A1 | 12/2005 | Morgenthaler |
| 2007/0095362 A1 | 5/2007 | Koopah |
| 2007/0204417 A1 | 9/2007 | Russell |
| 2010/0282274 A1* | 11/2010 | Huy .................. A61C 17/3427 134/6 |
| 2014/0245553 A1 | 9/2014 | Gravina |
| 2017/0119511 A1 | 5/2017 | Salblatschan et al. |
| 2018/0132989 A1 | 5/2018 | Deane |

* cited by examiner

BRUSH ASSEMBLIES

CROSS REFERENCE TO RELATED APPLICATIONS

This application claims benefit to U.S. Provisional Application No. 62/817,551, filed on Mar. 12, 2019; and this application hereby incorporates herein U.S. Provisional Application No. 62/817,551 as if set forth herein in its entirety.

BACKGROUND

1. Field of Inventions

The field of this application and any resulting patent is brush assemblies.

2. DESCRIPTION OF RELATED ART

Various brush assemblies and methods for brushing surfaces have been proposed and utilized, including some of the methods and structures disclosed in the references appearing on the face of this application or issued patent. However, those methods and structures lack the combination of steps and/or features of the methods and/or structures covered by what is disclosed herein. Furthermore, it is contemplated that the methods and/or structures disclosed herein solve many of the problems that prior art methods and structures have failed to solve. Also, the methods and/or structures disclosed herein have benefits that would be surprising and unexpected to a hypothetical person of ordinary skill with knowledge of the prior art existing as of the filing date of this application.

SUMMARY

The disclosure herein includes a brush assembly, which brush assembly may include: 1) a motor capable of generating vibration; 2) a head coupled to the motor, the head having a knob; 3) a face removably coupled to the head; and 4) a tuft slidably coupled to the face, wherein the knob may be capable of pushing an end of the tuft a distance from the knob.

The disclosure herein includes a brush assembly, which brush assembly may include: 1) a motor capable of generating vibration; and 2) a head coupled to the motor, the head having a knob capable of being abutted against an end of a tuft and capable of pushing the end of the tuft a distance from the knob, wherein, when the head receives vibration generated by the motor, the vibration is transferred from the head to a face.

The disclosure herein includes a brush assembly, which brush assembly may include: 1) a face capable of being removably coupled to a vibrating head; and 2) a tuft, the tuft may include: a) a base extending through the face: b) one or more bristles extending from a first end of the base; c) a collar extending radially from the base; and d) a bulb extending from a second end of the base, wherein the bulb may be capable of being abutted against a knob of the vibrating head and may be capable of being pushed by the knob a distance from the knob.

A brush assembly, comprising: 1) a motor capable of generating vibration; 2) a head coupled to the motor; 3) a face removably coupled to the head, the face comprising: a) a bulb; and b) one or more bristles; and 4) a head removably coupled to the face, wherein after receiving vibration generated by the motor, the head may be capable of pushing a portion of the tuft farther from the face.

A brush assembly, comprising: a face comprising: an inner surface; an outer surface; a bulb extending from the inner surface; and one or more bristles extending from the outer surface; wherein the bulb and the one or more bristles may be capable of being pushed by a knob of a head a distance from the knob.

The disclosure herein a method of unsheathing tufts of a brush assembly, which method may include 1) sliding a tuft on a tapered portion of a magnet of a head; 2) pushing the tuft through a face; 3) moving the magnet away from the tuft; and 4) aligning the tuft with a knob of the head.

The disclosure herein a method of unsheathing tufts of a brush assembly, which method may include 1) sliding a tuft on a tapered portion of a magnet of a head; 2) pushing the tuft through a face; 3) moving the magnet away from the tuft; and 4) aligning the tuft with a knob of the head. In any one of the methods or structures disclosed herein, the head may be capable of being moved laterally relative to a tuft.

The disclosure herein includes a brush assembly, which brush assembly may include 1) a motor capable of generating vibration; 2) a face that may be capable of receiving vibration generated by the motor; 3) a tuft extending through the face; and 4) a head removably coupled to the face, the head having a surface that may be capable of pushing a portion of the tuft a distance from the head.

The disclosure herein includes a brush assembly, which brush assembly may include 1) a motor capable of generating vibration; 2) a tuft that may be capable of receiving vibration generated by the motor; and 3) a head having a knob that may be capable of pushing the tuft after the head receives vibration generated by the motor.

The disclosure herein includes a brush assembly, which brush assembly may include a head having a knob that may be capable of being moved towards a tuft after the head receives vibration generated by a motor.

The disclosure herein includes a brush assembly, which brush assembly may include a head having a knob that may be capable of pushing a tuft away from the knob after the head receives vibration generated by a motor.

The disclosure herein includes a brush assembly, which brush assembly may include a head having a knob that may be capable of pushing a tuft away from the knob.

The disclosure herein includes a brush assembly, which brush assembly may include a head having a knob that may be capable of pushing a tuft extended through a face after the head receives vibration generated by a motor.

The disclosure herein includes a brush assembly, which brush assembly may include: 1) a face capable of being coupled to a head; 2) a tuft extending through the face, wherein the tuft has a portion capable of being abutted against a knob of the head.

The disclosure herein includes a brush assembly, which brush assembly may include: 1) a face capable of being removably coupled to a vibrating head; 2) and a tuft, the tuft may include: a) a base extending through the face; b) one or more bristles extending from a first end of the base; c) a collar extending radially from the base; and d) a bulb extending from a second end of the base, wherein the bulb may be capable of being abutted against a surface of the vibrating head and may be capable of being pushed by the surface a distance from the surface.

The disclosure herein includes a brush assembly, which brush assembly may include: 1) a face capable of receiving vibration from a head; 2) a tuft extending through the face, wherein the tuft may be capable of being pushed by a surface of the head a distance from the surface.

The disclosure herein includes a brush assembly, which brush assembly may include: 1) a face having a first sidewall and a second sidewall, wherein the first sidewall and the second sidewall may be capable of being coupled to a head; and 2) a tuft coupled to the face; wherein the face and tuft may be capable of receiving vibration from the head.

The disclosure herein includes a brush assembly, which brush assembly may include: 1) a handle having a head having a surface; 2) a face removably coupled to the head; 3) a tuft slidably coupled to the face; and 4) a motor housed in the handle and capable of generating and transferring vibration to the head, wherein, when vibrated, the head may be capable of causing the surface of the head to push an end of the tuft a distance away from the surface.

The disclosure herein includes a brush assembly, which brush assembly may include: 1) a handle having a head; 2) a motor housed in the handle, the motor capable of generating vibration; 3) a face removably coupled to the head; and 4) a tuft slidably coupled to the face; wherein the head may be capable of pushing an end of the tuft a distance away from the head.

The disclosure herein includes a brush assembly, which brush assembly may include: 1) a handle having a surface; and 2) a motor coupled to the handle and capable of generating and transferring vibration to the handle, wherein the vibrating handle may be capable of causing the surface to push an end of a tuft a distance away from the surface.

The disclosure herein includes a brush assembly, which brush assembly may include: 1) a handle having a surface; and 2) a motor coupled to the handle and capable of generating and transferring vibration to the handle and the surface may be capable of pushing an end of a tuft a distance away from the surface.

The disclosure herein includes a brush assembly, which brush assembly may include: 1) a motor capable of generating vibration; 2) a face capable of receiving vibration generated by the motor; 3) a tuft extending through an aperture of the face; and 4) a head removably coupled to the face, the head having a knob capable of pushing a portion of the tuft away from the knob.

The disclosure herein includes a brush assembly, which brush assembly may include: 1) a motor capable of generating vibration; 2) a face capable of receiving vibration generated by the motor; 3) a tuft extending through the face; and 4) a head having a knob capable of receiving vibration generated by the motor and capable of pushing a portion of the tuft away from the knob.

The disclosure herein includes a brush assembly, which brush assembly may include: 1) a motor capable of generating vibration; 2) a face removably coupled to the head; and 3) a tuft extending through the face; and 4) a head coupled to the motor, wherein the head may be capable of pushing a portion of the tuft a distance away from the head.

The disclosure herein includes a brush assembly, which brush assembly may include: 1) a motor capable of generating vibration; 2) a face that may be capable of receiving vibration generated by the motor; 3) a tuft extended through the face; and 4) a head removably coupled to the face, the head having a knob that may be capable of pushing a portion of the tuft a distance from the knob.

The disclosure herein includes a brush assembly, which brush assembly may include: 1) a motor capable of generating vibration; 2) a face that may be capable of receiving vibration generated by the motor; 3) a tuft extended through the face; and 4) a head capable of receiving vibration generated by the motor, the head having a knob that may be capable of pushing a portion of the tuft a distance from the head.

The disclosure herein includes a brush assembly, which brush assembly may include: 1) a motor capable of generating vibration; 2) a face that may be capable of receiving vibration generated by the motor; 3) a tuft extended through the face; and 4) a head capable of receiving vibration generated by the motor, the head having a knob that may be capable of pushing a portion of the tuft a distance from the knob.

The disclosure herein includes a brush assembly, which brush assembly may include: 1) a motor capable of generating vibration; 2) a face; 3) a tuft extended through an aperture of the face; and 4) a head coupled to the motor and the face, the head may include: a) a non-magnetic portion having a knob; and b) a magnet coupled to the tuft.

The disclosure herein includes a brush assembly, which brush assembly may include: 1) a motor capable of generating vibration; 2) a face; 3) a tuft extended through an aperture of the face; and 4) a head coupled to the motor and the face, the head may include: a) a non-magnetic portion having a knob; and b) a magnet slidably coupled to the tuft.

The disclosure herein includes a brush assembly, which brush assembly may include: 1) a motor capable of generating vibration; 2) a face; 3) a tuft extending through the face; and 4) a head coupled to the motor and the face, the head comprising: a) a non-magnetic portion having a knob; and b) a magnetic portion capable of being slidably coupled to the tuft.

The disclosure herein includes a brush assembly, which brush assembly may include: 1) a motor capable of generating vibration; 2) a face; 3) a tuft extending through the face; and 4) a head coupled to the motor and the face, the head comprising: a) a non-magnetic portion having a knob; and b) a magnetic portion capable of being magnetically coupled to the tuft.

The disclosure herein includes a brush assembly, which brush assembly may include: 1) a motor capable of generating vibration; 2) a handle housing the motor and having a head having a knob; 3) a face removably coupled to the head; and 4) a tuft slidably couple to the face, the tuft comprising: a) one or more bristles; b) a base coupled to the one or more bristles; and c) a bulb coupled to the base and capable of being abutted against the knob, wherein the hand, the face, and the tuft may be capable of receiving vibration generated by the motor.

The disclosure herein includes a brush assembly, which brush assembly may include: 1) a motor capable of generating vibration; 2) a head coupled to the motor, the head having a surface that may be capable of extending towards a tuft away from the surface.

The disclosure herein includes a brush assembly, which brush assembly may include: 1) a motor capable of generating vibration; 2) a head coupled to the motor, the head having a surface that may be capable of pushing a tuft.

The disclosure herein includes a brush assembly, which brush assembly may include: 1) a motor capable of generating vibration; 2) a head coupled to the motor, the head having a surface; 3) a face removably coupled to the head; and 4) a tuft slidably coupled to the face, wherein the surface may be capable of pushing an end of the tuft a distance from the surface.

The disclosure herein includes a brush assembly, which brush assembly may include: 1) a motor capable of generating vibration; 2) a head coupled to the motor; 3) a face removably coupled to the head; 4) a tuft extending through an aperture of the face; and 5) a head removably coupled to the face and capable of pushing an end of the tuft a distance from the head.

The disclosure herein includes a brush assembly, which brush assembly may include: 1) a motor capable of generating vibration; 2) a tuft capable of receiving vibration generated by the motor; and 3) a head having a knob capable of pushing the tuft away from the knob.

The disclosure herein includes a brush assembly, which brush assembly may include: 1) a motor capable of generating vibration; 2) a tuft; and 3) a head having a knob capable of moving towards the tuft.

The disclosure herein includes a brush assembly, which brush assembly may include: 1) a motor capable of generating vibration; and 2) a handle housing the motor, the handle having a head having a knob capable of pushing a tuft a distance away from the knob when.

The disclosure herein includes a brush assembly, which brush assembly may include: 1) a motor capable of generating vibration; and 2) a head coupled to the motor, the head having a knob capable of pushing a tuft a distance away from the knob after the knob receives vibration generated by the motor.

The disclosure herein includes a brush assembly, which brush assembly may include: 1) a motor capable of generating vibration; and 2) a head coupled to the motor, the head having a surface capable of being abutted against an end of a tuft and capable of pushing the tuft a distance from the surface, wherein, when the head receives vibration generated by the motor, the vibration is transferred from the head to a face.

The disclosure herein includes a brush assembly, which brush assembly may include: 1) handle; 2) a motor disposed in the handle and capable of generating vibration; and 3) a head having a surface capable of pushing a tuft away from the surface, wherein the head and the handle are unitary.

The disclosure herein includes a brush assembly, which brush assembly may include: 1) a face capable of being coupled to a head; 2) a tuft extending through the face, wherein the tuft may be capable of being pushed by the head a distance from the head.

The disclosure herein includes a brush assembly, which brush assembly may include: 1) a face capable of receiving vibration from a head; 2) a tuft extending through the face, wherein the tuft may be capable of being pushed by a knob of the head a distance from the knob.

The disclosure herein includes a method of brushing a surface, which method may include: 1) providing a face having a tuft extending therethrough, the tuft comprising: a) one or more bristles; b) a base coupled to the one or more bristles; and c) a bulb coupled to the base; wherein the face may be capable of being removably coupled to a handle that houses a motor capable of generating vibration on the handle to cause a surface of the handle to push a portion of the tuft a distance away from the handle.

The disclosure herein includes a method of brushing a surface, which method may include: 1) providing a face having a tuft extending therethrough, the tuft comprising: a) one or more bristles; b) a base coupled to the one or more bristles; and c) a bulb coupled to the base; wherein the face may be capable of being removably coupled to a head coupled to a motor capable of generating vibration on the head to cause a knob of the head to push a portion of the tuft a distance away from the knob.

The disclosure herein includes a method of brushing a surface, which method may include: 1) providing brush assembly, comprising: a) a motor capable of generating vibration; b) a head coupled to the motor, the head having a knob; c) a face removably coupled to the face; and d) a tuft extending through the face; and e) a head removably coupled to the face, the head having a knob; 2) vibrating, with the motor, the head, the face, and the tuft; and 3) pushing, with the knob of the head, the tuft away from the knob.

The disclosure herein includes a method of brushing a surface, which method may include: 1) providing brush assembly, comprising: a) a motor capable of generating vibration; b) a head coupled to the motor, the head having a surface; c) a face removably coupled to the face; and d) a tuft extending through the face; and e) a head removably coupled to the face, the head having a surface; 2) vibrating, with the motor, the head, the face, and the tuft; and 3) pushing, with the surface of the head, the tuft away from the surface.

The disclosure herein includes a method of brushing a surface, which method may include: 1) providing brush assembly, comprising: a) a motor; b) a head coupled to the motor, the head having a knob; c) a face removably coupled to the head; and d) a tuft extending through the face; 2) generating vibration with the motor; 3) transferring vibration generated by the motor to the head, the face, and the tuft; 4) abutting the knob against the tuft; and 5) moving the tuft a distance from the knob.

The disclosure herein includes a method of brushing a surface, which method may include: 1) providing brush assembly, comprising: a) a motor; b) a head coupled to the motor; c) a face removably coupled to the head; and d) a tuft extending through the face; 2) generating vibration with the motor; 3) transferring vibration generated by the motor to the head, the face, and the tuft; 4) abutting a surface of the head against the tuft; and 5) moving the tuft a distance from the surface of the head.

The disclosure herein includes a method of unsheathing a tuft of a brush assembly, which method may include 1) moving a head laterally relative to a tuft, wherein the head has a magnet; 2) attracting the tuft to the magnet; and 3) pulling, with the magnet, the tuft through a face.

DETAILED DESCRIPTION

1. Introduction

Figure 1A:
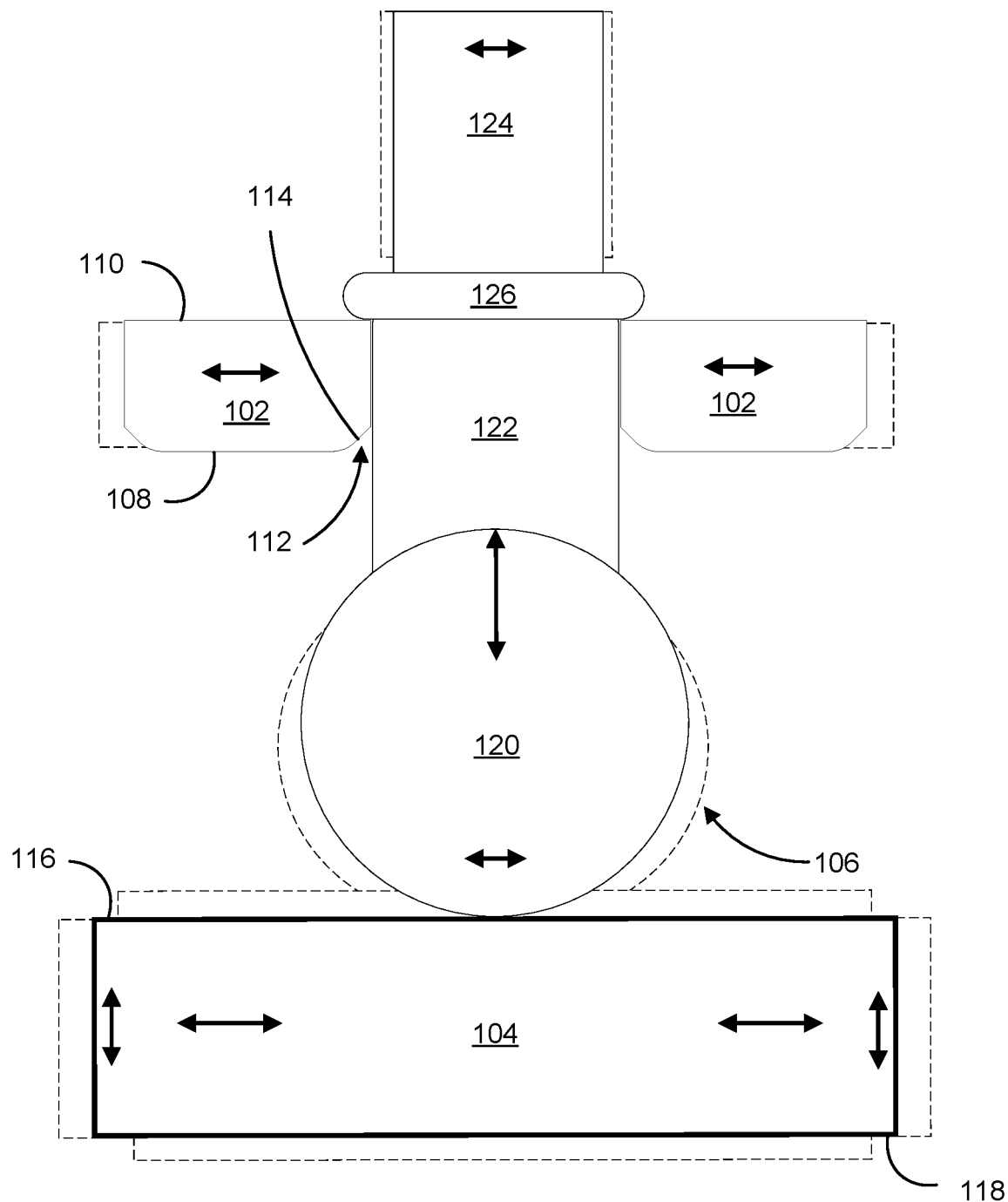
FIG. 1A illustrates a close-up cross-sectional side view of a brush assembly having a face, a tuft, and a head being vibrated, in which the tuft may extend through the face.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "abut against" as used herein as a verb is defined as position adjacent to and either physically touch or press against, directly or indirectly. After any abutting takes place with one object relative to another object, the objects may be fully or partially "abutted." For example, a first object may be abutted against a second object such that the second object is limited from moving in a direction of the first object. Thus, a knob of a head may be abutted against a tuft. A knob may be abutted against a tuft such that fluid may be disposed between the knob and the tuft. Additionally, a bulb of a tuft may be abutted against a knob of a head. Also, a bulb of a tuft may be abutted against an inner surface of a face.

The term "align" as used herein is a verb that means manufacture, form, adjust, or arrange one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. Thus, a face may be aligned with a head. In certain instances, the aligned borders or perimeters may share a similar profile. For instance, the surface that defines an aperture of a sidewall of a face may be aligned with a protrusion of a head. Additionally, apertures may be aligned, such that a structure or portion of a structure may be extended into and/or through the apertures.

The term "aperture" as used herein is defined as any opening in a solid object or structure, e.g., face, head, sidewall, and/or neck. For example, an aperture may be an opening that begins on one side of a solid object and ends on the other side of the object. An aperture may alternatively be an opening that does not pass entirely through an object, but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., a tuft, a bristle, a base, and/or a protrusion. For example, a portion of a tuft may be received in an aperture of a face.

The term "assembly" as used herein is defined as any set of components that have been fully or partially assembled together. A group of assemblies may be coupled to form an assembly or a solid structure having an inner surface and an outer surface.

The term "base" as used herein is defined as a structure to which another structure, may be coupled. A base may be capable of ingress, egress, or both, through an aperture disposed in a face. A base may be solid. A base may be a sleeve. One or more bristles may be coupled to a base. One or more bristles may extend from a base. A base and one or more bristles may be unitary. A bulb may be coupled to a base. A base and a bulb may be unitary. A base may be tapered. A base may have frustoconical portion. A base may have one or more outer surfaces abutted against an inner surface of a face in which the inner surface defines an aperture.

The term "bristle" as used herein is defined as a structure configured to be abutted against a surface of an object, e.g., skin, tooth, floor, wall, ceiling, machinery, earthenware, or animal. A bristle may be capable of ingress, egress, or both, through an aperture disposed through a face. A bristle may be constructed from various materials, e.g., silicone, rubber, plastic, nylon, carbon fiber, ceramic, metal, wood, plant fiber, cotton, or fabric. A bristle may be flexible. A bristle may be rigid. A bristle may be coupled to a base. A bristle and a base may be unitary. A bristle may be coupled to a bulb. A bristle and a bulb may be unitary. A set of bristles may have one bristle. A set of bristles may have 2, 3, 5, 10, 20, or 30 or more bristles. A bristle may be cylindrical. A bristle may be elongated. A bristle may be a spherical cap.

The term "brush assembly" as used herein is defined as an assembly or structure configured for brushing a surface of an object or structure, e.g., skin, tooth, floor, wall, ceiling, machinery, earthenware, shoe, or animal. A brush assembly may be used, e.g., in domestic settings, to clean surfaces including human skin, teeth, earthenware, floors, walls, car finish, pets, eating utensils, machinery. A brush assembly may be used, e.g., in industrial settings, to clean surfaces including human skin, floors, walls, equipment, machinery, vehicles, and animals. Types of manually operated brush assemblies may include brooms, toothbrushes, combs, make-up application brushes, make-up removal brushes, hand brushes, toilet brushes, scrubbers, and dishwashing brushes. Types of mechanical brush assemblies may include vacuum cleaners, buffers, and rotary brush. A brush assembly may include a motor, a handle, a head, a face, and one or more tufts. Additionally, a brush assembly may include batteries coupled to the motor. A brush assembly may have a handle and a head that are unitary. A brush assembly may have a motor disposed in a handle. A brush assembly may receive vibration generated by a motor. A brush assembly may receive vibration from a drive shaft coupled to a motor that is generating vibration.

The term "bulb" as used herein is defined as a structure of a tuft configured to receive force, directly or indirectly, from another structure or object, e.g., surface or knob of a head. A bulb may have a radiused profile, e.g., surface. A bulb may be tapered. A bulb may be abutted against a knob. A bulb may be abutted against a surface of a face. Preferably, a bulb has a portion that is a spherical cap, e.g., dome. A bulb may be disposed adjacent a knob of a head. When a bulb is abutted against an inner surface of a face, the bulb may be separated from a knob and/or surface of a head by a distance of as little as 0.02 millimeter, 0.03 millimeter, 0.04 millimeter, 0.05 millimeter, 0.07 millimeter, 1.0 millimeter or as far as 1.1 millimeter, 1.2 millimeter, 1.3 millimeter, 1.4 millimeter, 1.5 millimeter, 2 millimeters, or farther. Additionally, when a bulb is abutted against an inner surface of a face, the bulb may be separated from a knob and/or surface of a head by a distance of as little as 1.0 millimeter, 2.0 millimeters, 3.0 millimeters, 4.0 millimeter, 5.0 millimeters, 7.0 millimeters, 8.0 millimeters or as far as 1.0 centimeter, 1.5 centimeter, 2 centimeters, or farther.

The term "couple" as used herein is defined as directly or indirectly connect or attach. After any coupling takes place with two or more objects, the objects may be fully or partially "coupled." A first object may be coupled to a second object such that the first object is positioned at a specific location and orientation with respect to the second object. For example, a face may be coupled to a head. A first object may be either removably, slidably, and/or magnetically coupled to a second object. Two objects may be removably coupled via protrusions, friction, shear pins, threads, tape, rings, hooks, fasteners, locks, male and female connectors, clips, clamps, knots, and/or surface-to-surface contact. For example, a face and a head may be removably coupled to each other such that the face may then be uncoupled and removed from the head. Two objects may be slidably coupled, where an aperture of one object may be capable of receiving a second object. For example, a tuft slid through an aperture of a face may be slidably coupled to the face. Two objects may be magnetically coupled where a first object exerts a magnetic force on a second object that includes ferromagnetic or magnetic material. Magnetically coupled objects are magnetically attracted to each other. For example, a tuft including a ferromagnetic portion may be magnetically coupled to a magnet on a head of a brush assembly.

The term "cylindrical" as used herein is defined as shaped like a cylinder, e.g., having straight parallel sides and a circular or oval or elliptical cross-section. Examples of a cylindrical structure or object may include a head, a neck, a handle, a bristle, and a base of a tuft. A cylindrical object may be completely or partially shaped like a cylinder. Alternatively, a solid cylindrical object may have an inner surface or outer surface having a diameter that changes abruptly. A cylindrical object may have an inner or outer surface having a diameter that changes abruptly to form a collar, e.g., flange, radial face, rim, or lip. A cylindrical object may have a surface forming a collar extending toward or away from the central axis of the object. A cylindrical object may have an inner surface forming a collar disposed thereon. A cylindrical object may have an outer surface forming an outer collar disposed thereon. A cylindrical object may have an outer collar having a first outer surface and a second outer surface, in which the first outer surface has a first diameter greater than a second diameter of the second surface. For example, a tuft may have a base having an outer collar extending outwardly therefrom. A first diameter of the outer collar of the base may be greater than a second diameter of a second outer surface of the base. Additionally, a cylindrical object, may have a collar that is tapered or radiused.

The term "face" as used herein is defined as a structure configured for coupling to a second structure, e.g., a head, and receive vibration from the second structure. A face may have an inner surface and an outer surface. A face may have an inner surface disposed adjacent to an inner surface of a head. One or more objects, e.g., tufts and/or bristles, may extend through the face. A face may have a body and one or more sidewalls. A face may have a planar inner surface. A face may have a planar outer surface. A face may be curved. A face may be cylindrical. One or more apertures may extend through the body. A surface defining an aperture through a face may have a frustoconical portion, e.g., tapered or radiused portion. A face may be removably coupled to a head. A face may be removably coupled to protrusions of a head. A face may have one or more sidewalls. A face may have one or more apertures extending therethrough. An aperture extended through a face may have a tapered cross-section. An object, e.g., tuft and/or bristle, may extend through the face. An object, e.g., tuft and/or bristle, may extend through an aperture of the face.

The term "ferromagnetic" as used herein is defined as attractive to a magnet. Ferromagnetic material may be capable of being magnetized.

The terms "first" and "second" as used herein merely differentiate two or more things or actions, and do not signify anything else, including order of importance, sequence, etc.

The term "fluid" as used herein is defined as material capable of flowing. A fluid may be a liquid or a gas. Examples of a fluid may include saliva, water, mouthwash, cleaning fluid, and liquid soap. A fluid can be a mixture of two or more fluids. A fluid may absorb heat. A fluid may have properties such as viscosity, anti-foaming, thermal stability, thermal conductivity, and thermal capacity. A fluid may be water-based, oil-based, synthetic, or a combination of viscous materials and solid materials.

The term "groove" as used herein is defined as an indentation in a surface. A groove may extend in a straight line from one end to another. A groove may be a continuous loop, e.g., around a cylindrical structure. One or more grooves may be formed on an outer surface of an object to form pin grooves. One or more grooves may be formed on the inner surface of an object to form box grooves. A groove may extend in a meandering path from an end to another, e.g., a S-shaped or C-shaped path. A groove may have a cross-section that is V-shaped. A groove may have a cross-section that is rectangular. A groove may have a cross-section that is arcuate, e.g., U-shaped.

The term "handle" as used herein is a noun defined as a structure configured to be grasped by a human hand. A brush may have a handle. A handle may have a head extending therefrom. A handle may be removably coupled to a head. A handle and a head may be unitary. A handle may house a motor.

The terms "he," "she," "they," and any other personal pronouns as used herein refer to any gender interchangeably. For example, all uses of "he" encompasses "she" as well.

The term "head" as used herein is defined as a structure configured for receiving and/or transferring vibration to another structure, e.g., face, brush handle, and/or drive shaft, and/or receiving vibration generated by a motor. A head may be coupled to a face, neck, and/or handle. A head may be cylindrical. A head may be planar. A head may be curved. A head may have an inner surface and an outer surface. A head may have an inner surface that is planar. A head may have an inner surface that is curved. A head may have an outer surface that is planar. A head may have an outer surface that is curved. A head may have an inner surface facing an inner surface of a face. A head may have an outer surface facing an inner surface of a face. An inner surface of a head and an inner surface of a face may have fluid and/or debris disposed there between. A head may have inner surface capable of being adjacent a tuft and open to, e.g., exposed to, physical contact with fluid and/or debris. A head may have one or more protrusions. A head may have one or more protrusions extending from a surface of the head, e.g., for coupling to a face. A head may have one or more knobs. A head may have one or more knobs extending from a front a surface of the head. A head may have a knob capable of being adjacent a tuft and open to, e.g., exposed to, physical contact with fluid and/or debris.

The term "knob" as used herein is defined as a structure, e.g., configured to transfer force, directly or indirectly, to another structure, e.g., bulb of a tuft. A knob may be a protrusion on an object, e.g., face and/or head. A knob may protrude, e.g., extend, rise, and/or elevate, from a surface of an object, e.g., face and/or head. A knob would directly transfer force to a tuft if the knob is in physical contact with the tuft. A knob would indirectly transfer force to a tuft if the knob pushes another solid object and/or fluid, e.g., saliva and/or water, against a tuft. A knob may be disposed on a head of a brush. A knob and a head may be unitary. A knob may have a portion covered by elastic material, e.g., rubber, plastic, and/or silicone. A knob may have a radiused profile, e.g., surface. A knob may be tapered. A knob may have a portion that is a spherical cap, e.g. dome.

The term "medium" as used herein as a noun is a defined as an object configured to be disposed between two or more objects or structures. A medium may be a solid, a liquid, or a mixture of both. A medium that is a solid may be made from various materials including rubber, plastic, silicone, carbon fiber, ceramic, wood, and/or metal. A medium that is a liquid may include saliva, water, alcohol, hydrocarbon, and/or other fluids. A medium may be pushed by a first object. A medium having been pushed by a first object may, in turn, push a second object. A medium may receive vibration from an object. A medium having received vibration from a first object may, in turn, transfer the vibration to a second object.

The term "motor" as used herein is defined as any device capable of generating vibration and/or imparting motion. Types of motors may include electromagnetic induction motors, eccentric rotating mass (ERM) motors, coin motors, linear resonant actuator (LRA) motors, and any other vibration generating devices. Power may be supplied to a motor via batteries, alternating currents. A motor may be powered by a direct current (DC) source, e.g., battery or rectifier. A motor may be powered by alternating current (AC) sources, e.g., power grid, inverter, or electrical generator.

The term "neck" as used herein is a defined as a structure configured to be coupled to and/or extend an object. A neck may receive vibration, e.g., transferred from a drive shaft. A neck may be coupled to a head. A neck may be coupled to a handle.

The term "obround" as used herein is defined as having a shape consisting of two semicircles connected by parallel lines tangent to their endpoints.

The term "perpendicular" as used herein is defined as at an angle ranging from 85° or 88 to 92° or 95°, e.g., to a line, a plane, or a surface. Two structures that are perpendicular to each other may be orthogonal and/or tangential to each other.

The term "providing" as used herein is defined as making available, furnishing, supplying, equipping, or causing to be placed in position.

The term "protrusion" as used herein is defined as a structure, e.g., extending from an object or structure. A protrusion may be received in an aperture. For example, a head may have one or more protrusions extending from a surface of the head. A face may have one or more protrusions extending from a surface of the face. A protrusion may be received in an aperture. A protrusion may have a portion covered by elastic and/or resilient material, e.g., rubber, plastic, and/or silicone. A protrusion may have a radiused profile, e.g., surface. A protrusion may be tapered.

The term "pushing" as used herein is a verb is defined as applying force, e.g., towards an object or structure. Pushing may compel, e.g., urge, cause, compel, influence, force, and/or press, displacement of an object. A first object, having received force from a source, may push another object by transferring the force to the second object, directly or indirectly. For example, a knob of a head having received force from a motor would push a tuft by transferring the force to the tuft, directly or indirectly. A first object may directly push a second object where the objects physically touched. A first object may indirectly push a second object via magnetism or electromagnetism. A first object may indirectly push a second object via physical contact with a medium, e.g., where the medium may be disposed between the first object and the second object. A medium may include, water, saliva, other fluids, gas, particles, and/or solid objects. After any pushing takes place, the object may be "pushed." A pushed object may be displaced. A pushed object may remain in its original position. An object may be pushed towards or away from another object. For example, a tuft may be pushed towards or away from a knob. An object may be pushed by a medium that is pushed by another object. For example, a tuft may be pushed by fluid that is pushed by a knob. An object that is being pushed repeatedly between two or more positions is said to be vibrating, e.g., resonating, rattling, pulsating, and/or shaking.

The term "radiused" as used herein is defined as having a contour that is curved, semicircle, and/or hemispherical. A radiused surface may be concave or convex. A radiused surface may be a spherical cap.

The term "sidewall" as used herein is defined as any structure having a planar surface. The sidewall may be a flat plate, e.g., disc. A sidewall may be cylindrical. A sidewall may be continuous. A sidewall may be solid. A sidewall may have curved planar sides that may or, in some cases, may not be parallel to one another. A sidewall may be rigid. A sidewall may be flexible. A sidewall may be planar. A sidewall may have a plane that is perpendicular to a body of a face. A sidewall and body of face may form a shape of a block letter "L". A sidewall may be curved. A sidewall may be disposed at an end of a body of a face. A sidewall may have a surface that is parallel to a side surface of a head. A sidewall may have a thickness less than that of a body of a face. A sidewall may have one or more apertures. A sidewall may have one or more apertures disposed therethrough. A sidewall may have an aperture configured to receive a protrusion of a head.

The term "socket surfaces" as used herein is defined as connected surfaces having a polygonal cross-section. An example of a polygonal cross-section may be triangular, square, rectangular, pentagonal, hexagonal, or octagonal. Socket surfaces may have surfaces connected to form a polygonal shape, e.g., triangular, square, rectangular, pentagonal, hexagonal, or octagonal. Males socket surfaces may be disposed on an outer surface of a cylindrical structure, e.g., ring, head, housing, or bolt. Female socket surfaces may be disposed on an inner surface of a cylindrical structure, e.g., ring, face, housing, or nut. Female socket surfaces of a landing seat may be capable of being aligned with male socket surfaces of a landing mandrel. Female socket surfaces of a landing seat may be capable of being abutted against male socket surfaces of a landing mandrel.

The term "spherical cap" as used herein is defined as a portion of a sphere cut off by a plane. A spherical cap may be a structure. Spherical cap may also be referred to as a spherical dome or a spherical segment. A bulb may have a portion that is a spherical cap. A bulb may have a profile of spherical cap. A knob may have a portion that is a spherical cap. A knob may a profile of a spherical cap.

The term "surface" as used herein is defined as any boundary of a structure. A surface may also refer to that flat or substantially flat area that is extended radially around a cylindrical structure which may, for example, be part of a base, a bulb, or a knob. A surface may also refer to that flat or substantially flat area that extend radially around a cylindrical structure or object which may, for example, be part of a brush, a face, a head, a neck, a handle, and/or a tubular structure. A surface may have irregular contours. A surface may be formed from coupled components, e.g., a knob, tuft, a bulb, a base, a bristle, a brush, a face, a head, a neck, a handle, and/or a tubular structure. Coupled components may form irregular surfaces. A plurality of surfaces may be connected to form a polygonal cross-section. An example of a polygonal cross-section may be triangular, square, rectangular, pentagonal, hexagonal, or octagonal.

The term "tapered" as used herein is defined as having a surface and/or profile defining a set of circumferences that becomes progressively smaller from a first end to a second end. Structures that are tapered may have a profile that is beveled, triangular, frustoconical, and/or conical.

The term "transfer" as used herein as a verb is defined as cause, directly or indirectly, to convey, e.g., pass, shift, or move, something, e.g., from a first object and/or position to a second object and/or position. A first object may receive force from a source, e.g., motor, and then transfers the force to a second object. For example, a knob may receive force from a motor and then transfers the force to a tuft. Also, a head may receive force from a motor and then transfers the force to a face. A thing that can be "transferred" may include any object, structure, energy, pressure, vibration, force, push, or pull. For example, force may be transferred, directly or indirectly, from a knob to a tuft. Force may be directly transferred from a source, e.g., motor, to a first object, e.g., knob or head, to a second object, e.g., tuft or face, via physical contact of the first object with the second object. Force may be indirectly transferred from a source to a first object to a second object via a medium, e.g., gas, fluid, or solid object, disposed between the first object and the second object. Force may be transferred from a first object to a second via a medium by magnetism or physical contact of the medium with the first object and second object.

The term "tubular" as used herein as an adjective is defined as a having an inner surface and an outer surface. A tubular structure may have an aperture disposed therethrough. Examples of a tubular may a head, a neck, and a handle of a brush. Preferably, a tubular structure is cylindrical. However, any or all tubular structures of an assembly may have polygonal cross-sections, e.g., triangular, rectangular, pentagonal, hexagonal, or octagonal.

The term "tuft" as used herein is defined as a structure configured to receive force from an object, e.g., teeth, knob of a head, saliva, toothpaste, and/or fluid. A tuft may include a bulb, a base, and one or more bristles. A tuft may be elastic and/or flexible. A tuft may be constructed from various materials including rubber, plastic, silicone, carbon fiber, ceramic, wood, plant fiber, cotton, and/or metal. A tuft may have one or more bristles, a base, and a bulb that are unitary. A tuft may have a base and one or more bristles that are unitary. A tuft may have a bulb and a base that are unitary. A tuft may have a bulb, a base, and one or more bristles may be unitary.

The term "vibration" as used herein is defined as a disturbance in one or more portions of a fluid or a solid. An object or structure being vibrated or receiving vibration, in some cases, is said to lack internal equilibrium.

The term "unitary" as used herein is defined as having the nature, properties, or characteristics of a single unit. For example, a body and one or more sidewalls that are individual parts of a face may be unitary in the sense they are not separate but rather are formed from a single piece of material, e.g., plastic, nylon, carbon fiber, ceramic, or metal. In addition, a head that is an individual part may be unitary with a handle in the sense they are not separate but rather are formed from a single piece of material, e.g., plastic, nylon, carbon fiber, fiber glass, ceramic, wood, or metal. Also, a knob that is an individual part may be unitary with a head in the sense they are not separate but rather are formed from a single piece of material, e.g., plastic, nylon, carbon fiber, fiber glass, ceramic, wood, or metal. Additionally, a bristle, a base, and a bulb that are individual parts of a tuft may be unitary in the sense they are not separate but rather are formed from a single piece of material, e.g., silicone, plastic, nylon, carbon fiber, ceramic, wood, or metal.

The terms "upper," "lower," "top," "bottom", "front", "back" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a face, a head, a neck, a head, a sidewall, and a tuft may each have an upper end and a lower end. The term "top" as used herein means in the highest position, e.g., farthest from the ground. The term "bottom" as used herein means in the lowest position, e.g., closest the ground. For example, a cylindrical object, e.g., a face, a head, a neck, a head, a sidewall, and a tuft, may have a top portion and a bottom portion. The term "front" identifies any object or part of a particular object that is closest to a person viewing the object. The term "back" identifies any object or part of a particular object that is closest to a person viewing the object.

3. Certain Specific Embodiments

Certain specific embodiments of methods, structures, elements, and parts are described below, which are by no means an exclusive description of the inventions. Other specific embodiments, including those referenced in the drawings, are encompassed by this application and any patent that issues therefrom.

The disclosure herein includes a brush assembly, which brush assembly may include: 1) a motor capable of generating vibration; 2) a head coupled to the motor, the head having a knob; 3) a face removably coupled to the head; and 4) a tuft slidably coupled to the face, wherein the knob may be capable of pushing an end of the tuft a distance from the knob.

The disclosure herein includes a brush assembly, which brush assembly may include: 1) a motor capable of generating vibration; and 2) a head coupled to the motor, the head having a knob capable of being abutted against an end of a tuft and capable of pushing the end of the tuft a distance from the knob, wherein, when the head receives vibration generated by the motor, the vibration is transferred from the head to a face.

The disclosure herein includes a brush assembly, which brush assembly may include: 1) a face capable of being removably coupled to a vibrating head; and 2) a tuft, the tuft may include: a) a base extending through the face: b) one or more bristles extending from a first end of the base; c) a collar extending radially from the base; and d) a bulb extending from a second end of the base, wherein the bulb may be capable of being abutted against a knob of the vibrating head and may be capable of being pushed by the knob a distance from the knob.

A brush assembly, comprising: 1) a motor capable of generating vibration; 2) a head coupled to the motor; 3) a face removably coupled to the head, the face comprising: a) a bulb; and b) one or more bristles; and 4) a head removably coupled to the face, wherein after receiving vibration generated by the motor, the head may be capable of pushing a portion of the tuft farther from the face.

A brush assembly, comprising: a face comprising: an inner surface; an outer surface; a bulb extending from the inner surface; and one or more bristles extending from the outer surface; wherein the bulb and the one or more bristles may be capable of being pushed by a knob of a head a distance from the knob.

The disclosure herein a method of unsheathing tufts of a brush assembly, which method may include 1) sliding a tuft on a tapered portion of a magnet of a head; 2) pushing the tuft through a face; 3) moving the magnet away from the tuft; and 4) aligning the tuft with a knob of the head.

The disclosure herein a method of unsheathing tufts of a brush assembly, which method may include 1) sliding a tuft on a tapered portion of a magnet of a head; 2) pushing the tuft through a face; 3) moving the magnet away from the tuft; and 4) aligning the tuft with a knob of the head. In any one of the methods or structures disclosed herein, the head may be capable of being moved laterally relative to a tuft.

The disclosure herein includes a brush assembly, which brush assembly may include 1) a motor capable of generating vibration; 2) a face that may be capable of receiving vibration generated by the motor; 3) a tuft extending through the face; and 4) a head removably coupled to the face, the head having a surface that may be capable of pushing a portion of the tuft a distance from the head.

The disclosure herein includes a brush assembly, which brush assembly may include 1) a motor capable of generating vibration; 2) a tuft that may be capable of receiving vibration generated by the motor; and 3) a head having a knob that may be capable of pushing the tuft after the head receives vibration generated by the motor.

The disclosure herein includes a brush assembly, which brush assembly may include a head having a knob that may be capable of being moved towards a tuft after the head receives vibration generated by a motor.

The disclosure herein includes a brush assembly, which brush assembly may include a head having a knob that may be capable of pushing a tuft away from the knob after the head receives vibration generated by a motor.

The disclosure herein includes a brush assembly, which brush assembly may include a head having a knob that may be capable of pushing a tuft away from the knob.

The disclosure herein includes a brush assembly, which brush assembly may include a head having a knob that may be capable of pushing a tuft extended through a face after the head receives vibration generated by a motor.

The disclosure herein includes a brush assembly, which brush assembly may include: 1) a face capable of being coupled to a head; 2) a tuft extending through the face, wherein the tuft has a portion capable of being abutted against a knob of the head.

The disclosure herein includes a brush assembly, which brush assembly may include: 1) a face capable of being removably coupled to a vibrating head; 2) and a tuft, the tuft may include: a) a base extending through the face; b) one or more bristles extending from a first end of the base; c) a collar extending radially from the base; and d) a bulb extending from a second end of the base, wherein the bulb may be capable of being abutted against a surface of the vibrating head and may be capable of being pushed by the surface a distance from the surface.

The disclosure herein includes a brush assembly, which brush assembly may include: 1) a face capable of receiving vibration from a head; 2) a tuft extending through the face, wherein the tuft may be capable of being pushed by a surface of the head a distance from the surface.

The disclosure herein includes a brush assembly, which brush assembly may include: 1) a face having a first sidewall and a second sidewall, wherein the first sidewall and the second sidewall may be capable of being coupled to a head; and 2) a tuft coupled to the face; wherein the face and tuft may be capable of receiving vibration from the head.

The disclosure herein includes a brush assembly, which brush assembly may include: 1) a handle having a head having a surface; 2) a face removably coupled to the head; 3) a tuft slidably coupled to the face; and 4) a motor housed in the handle and capable of generating and transferring vibration to the head, wherein, when vibrated, the head may be capable of causing the surface of the head to push an end of the tuft a distance away from the surface.

The disclosure herein includes a brush assembly, which brush assembly may include: 1) a handle having a head; 2) a motor housed in the handle, the motor capable of generating vibration; 3) a face removably coupled to the head; and 4) a tuft slidably coupled to the face; wherein the head may be capable of pushing an end of the tuft a distance away from the head.

The disclosure herein includes a brush assembly, which brush assembly may include: 1) a handle having a surface; and 2) a motor coupled to the handle and capable of generating and transferring vibration to the handle, wherein the vibrating handle may be capable of causing the surface to push an end of a tuft a distance away from the surface.

The disclosure herein includes a brush assembly, which brush assembly may include: 1) a handle having a surface; and 2) a motor coupled to the handle and capable of generating and transferring vibration to the handle and the surface may be capable of pushing an end of a tuft a distance away from the surface.

The disclosure herein includes a brush assembly, which brush assembly may include: 1) a motor capable of generating vibration; 2) a face capable of receiving vibration generated by the motor; 3) a tuft extending through an aperture of the face; and 4) a head removably coupled to the face, the head having a knob capable of pushing a portion of the tuft away from the knob.

The disclosure herein includes a brush assembly, which brush assembly may include: 1) a motor capable of generating vibration; 2) a face capable of receiving vibration generated by the motor; 3) a tuft extending through the face; and 4) a head having a knob capable of receiving vibration generated by the motor and capable of pushing a portion of the tuft away from the knob.

The disclosure herein includes a brush assembly, which brush assembly may include: 1) a motor capable of generating vibration; 2) a face removably coupled to the head; and 3) a tuft extending through the face; and 4) a head coupled to the motor, wherein the head may be capable of pushing a portion of the tuft a distance away from the head.

The disclosure herein includes a brush assembly, which brush assembly may include: 1) a motor capable of generating vibration; 2) a face that may be capable of receiving vibration generated by the motor; 3) a tuft extended through the face; and 4) a head removably coupled to the face, the head having a knob that may be capable of pushing a portion of the tuft a distance from the knob.

The disclosure herein includes a brush assembly, which brush assembly may include: 1) a motor capable of generating vibration; 2) a face that may be capable of receiving vibration generated by the motor; 3) a tuft extended through the face; and 4) a head capable of receiving vibration generated by the motor, the head having a knob that may be capable of pushing a portion of the tuft a distance from the head.

The disclosure herein includes a brush assembly, which brush assembly may include: 1) a motor capable of generating vibration; 2) a face that may be capable of receiving vibration generated by the motor; 3) a tuft extended through the face; and 4) a head capable of receiving vibration generated by the motor, the head having a knob that may be capable of pushing a portion of the tuft a distance from the knob.

The disclosure herein includes a brush assembly, which brush assembly may include: 1) a motor capable of generating vibration; 2) a face; 3) a tuft extended through an aperture of the face; and 4) a head coupled to the motor and the face, the head may include: a) a non-magnetic portion having a knob; and b) a magnet coupled to the tuft.

The disclosure herein includes a brush assembly, which brush assembly may include: 1) a motor capable of generating vibration; 2) a face; 3) a tuft extended through an aperture of the face; and 4) a head coupled to the motor and the face, the head may include: a) a non-magnetic portion having a knob; and b) a magnet slidably coupled to the tuft.

The disclosure herein includes a brush assembly, which brush assembly may include: 1) a motor capable of generating vibration; 2) a face; 3) a tuft extending through the face; and 4) a head coupled to the motor and the face, the head comprising: a) a non-magnetic portion having a knob; and b) a magnetic portion capable of being slidably coupled to the tuft.

The disclosure herein includes a brush assembly, which brush assembly may include: 1) a motor capable of generating vibration; 2) a face; 3) a tuft extending through the face; and 4) a head coupled to the motor and the face, the head comprising: a) a non-magnetic portion having a knob; and b) a magnetic portion capable of being magnetically coupled to the tuft.

The disclosure herein includes a brush assembly, which brush assembly may include: 1) a motor capable of generating vibration; 2) a handle housing the motor and having a head having a knob; 3) a face removably coupled to the head; and 4) a tuft slidably couple to the face, the tuft comprising: a) one or more bristles; b) a base coupled to the one or more bristles; and c) a bulb coupled to the base and capable of being abutted against the knob, wherein the hand, the face, and the tuft may be capable of receiving vibration generated by the motor.

The disclosure herein includes a brush assembly, which brush assembly may include: 1) a motor capable of generating vibration; 2) a head coupled to the motor, the head having a surface that may be capable of extending towards a tuft away from the surface.

The disclosure herein includes a brush assembly, which brush assembly may include: 1) a motor capable of generating vibration; 2) a head coupled to the motor, the head having a surface that may be capable of pushing a tuft.

The disclosure herein includes a brush assembly, which brush assembly may include: 1) a motor capable of generating vibration; 2) a head coupled to the motor, the head having a surface; 3) a face removably coupled to the head; and 4) a tuft slidably coupled to the face, wherein the surface may be capable of pushing an end of the tuft a distance from the surface.

The disclosure herein includes a brush assembly, which brush assembly may include: 1) a motor capable of generating vibration; 2) a head coupled to the motor; 3) a face removably coupled to the head; 4) a tuft extending through an aperture of the face; and 5) a head removably coupled to the face and capable of pushing an end of the tuft a distance from the head.

The disclosure herein includes a brush assembly, which brush assembly may include: 1) a motor capable of generating vibration; 2) a tuft capable of receiving vibration generated by the motor; and 3) a head having a knob capable of pushing the tuft away from the knob.

The disclosure herein includes a brush assembly, which brush assembly may include: 1) a motor capable of generating vibration; 2) a tuft; and 3) a head having a knob capable of moving towards the tuft.

The disclosure herein includes a brush assembly, which brush assembly may include: 1) a motor capable of generating vibration; and 2) a handle housing the motor, the handle having a head having a knob capable of pushing a tuft a distance away from the knob when.

The disclosure herein includes a brush assembly, which brush assembly may include: 1) a motor capable of generating vibration; and 2) a head coupled to the motor, the head having a knob capable of pushing a tuft a distance away from the knob after the knob receives vibration generated by the motor.

The disclosure herein includes a brush assembly, which brush assembly may include: 1) a motor capable of generating vibration; and 2) a head coupled to the motor, the head having a surface capable of being abutted against an end of a tuft and capable of pushing the tuft a distance from the surface, wherein, when the head receives vibration generated by the motor, the vibration is transferred from the head to a face.

The disclosure herein includes a brush assembly, which brush assembly may include: 1) handle; 2) a motor disposed in the handle and capable of generating vibration; and 3) a head having a surface capable of pushing a tuft away from the surface, wherein the head and the handle are unitary.

The disclosure herein includes a brush assembly, which brush assembly may include: 1) a face capable of being coupled to a head; 2) a tuft extending through the face, wherein the tuft may be capable of being pushed by the head a distance from the head.

The disclosure herein includes a brush assembly, which brush assembly may include: 1) a face capable of receiving vibration from a head; 2) a tuft extending through the face, wherein the tuft may be capable of being pushed by a knob of the head a distance from the knob.

The disclosure herein includes a method of brushing a surface, which method may include: 1) providing a face having a tuft extending therethrough, the tuft comprising: a) one or more bristles; b) a base coupled to the one or more bristles; and c) a bulb coupled to the base; wherein the face may be capable of being removably coupled to a handle that houses a motor capable of generating vibration on the handle to cause a surface of the handle to push a portion of the tuft a distance away from the handle.

The disclosure herein includes a method of brushing a surface, which method may include: 1) providing a face having a tuft extending therethrough, the tuft comprising: a) one or more bristles; b) a base coupled to the one or more bristles; and c) a bulb coupled to the base; wherein the face may be capable of being removably coupled to a head coupled to a motor capable of generating vibration on the head to cause a knob of the head to push a portion of the tuft a distance away from the knob.

The disclosure herein includes a method of brushing a surface, which method may include: 1) providing brush assembly, comprising: a) a motor capable of generating vibration; b) a head coupled to the motor, the head having a knob; c) a face removably coupled to the face; and d) a tuft extending through the face; and e) a head removably coupled to the face, the head having a knob; 2) vibrating, with the motor, the head, the face, and the tuft; and 3) pushing, with the knob of the head, the tuft away from the knob.

The disclosure herein includes a method of brushing a surface, which method may include: 1) providing brush assembly, comprising: a) a motor capable of generating vibration; b) a head coupled to the motor, the head having a surface; c) a face removably coupled to the face; and d) a tuft extending through the face; and e) a head removably coupled to the face, the head having a surface; 2) vibrating, with the motor, the head, the face, and the tuft; and 3) pushing, with the surface of the head, the tuft away from the surface.

The disclosure herein includes a method of brushing a surface, which method may include: 1) providing brush assembly, comprising: a) a motor; b) a head coupled to the motor, the head having a knob; c) a face removably coupled to the head; and d) a tuft extending through the face; 2) generating vibration with the motor; 3) transferring vibration generated by the motor to the head, the face, and the tuft; 4) abutting the knob against the tuft; and 5) moving the tuft a distance from the knob.

The disclosure herein includes a method of brushing a surface, which method may include: 1) providing brush assembly, comprising: a) a motor; b) a head coupled to the motor; c) a face removably coupled to the head; and d) a tuft extending through the face; 2) generating vibration with the motor; 3) transferring vibration generated by the motor to the head, the face, and the tuft; 4) abutting a surface of the head against the tuft; and 5) moving the tuft a distance from the surface of the head.

The disclosure herein includes a method of unsheathing a tuft of a brush assembly, which method may include 1) moving a head laterally relative to a tuft, wherein the head has a magnet; 2) attracting the tuft to the magnet; and 3) pulling, with the magnet, the tuft through a face.

In any one of the methods or structures disclosed herein, a medium may be disposed between the surface and a bulb of the tuft.

In any one of the methods or structures disclosed herein, a portion of the tuft may extend through the face.

In any one of the methods or structures disclosed herein, a portion of the tuft may be capable of being abutted against the face.

In any one of the methods or structures disclosed herein, a portion of the tuft may be capable of being moved axially relative to the face.

In any one of the methods or structures disclosed herein, a portion of the tuft may be capable of being moved laterally relative to the face.

In any one of the methods or structures disclosed herein, a surface of the head may be capable of being moved towards the tuft.

In any one of the methods or structures disclosed herein, an end of the tuft may be capable of being moved laterally relative to the knob.

In any one of the methods or structures disclosed herein, an end of the tuft may be disposed between an inner surface of the face and the knob of the head.

In any one of the methods or structures disclosed herein, the bulb and a bristle extending from the outer surface are aligned.

In any one of the methods or structures disclosed herein, the bulb and the one or more bristles aligned.

In any one of the methods or structures disclosed herein, the central axis of the tuft and the central axis of the knob may be aligned.

In any one of the methods or structures disclosed herein, the central axis of the tuft and the central axis of the knob may be portions of one line.

In any one of the methods or structures disclosed herein, the collar may be capable of being abutted against the face.

In any one of the methods or structures disclosed herein, the face may have a sidewall coupled to a sidewall of the head.

In any one of the methods or structures disclosed herein, the face may have a sidewall removably coupled to a sidewall of the head.

In any one of the methods or structures disclosed herein, the face may have an aperture capable of receiving a protrusion of the head.

In any one of the methods or structures disclosed herein, the face may have four sidewalls, wherein the four sidewalls may be capable of being removably coupled to the head, and the head may be capable of being disposed between the four sidewalls.

In any one of the methods or structures disclosed herein, the face may be capable of being removably coupled to the head.

In any one of the methods or structures disclosed herein, the face may be removably coupled to head.

In any one of the methods or structures disclosed herein, the face may be cylindrical.

In any one of the methods or structures disclosed herein, the face may be removably coupled to head.

In any one of the methods or structures disclosed herein, the face, the bulb, and the one or more bristles are unitary.

In any one of the methods or structures disclosed herein, the face, the bulb, and the one or more bristles comprise silicone.

In any one of the methods or structures disclosed herein, the face, the head, the surface, and the tuft may be capable of receiving vibration generated by the motor.

In any one of the methods or structures disclosed herein, the handle and the head are unitary.

In any one of the methods or structures disclosed herein, the handle, the head, and the tuft may be capable of receiving vibration generated by the motor.

In any one of the methods or structures disclosed herein, the head may have a groove capable of receiving a protrusion of the face.

In any one of the methods or structures disclosed herein, the head may be capable of being disposed between the first sidewall and the second side wall.

In any one of the methods or structures disclosed herein, the head may be disposed in the face.

In any one of the methods or structures disclosed herein, the head may be slidably coupled to face.

In any one of the methods or structures disclosed herein, the head may be capable of being moved laterally relative to a bulb of the tuft.

In any one of the methods or structures disclosed herein, the head may be coupled to the motor.

In any one of the methods or structures disclosed herein, the head may further include a protrusion that may be capable of being received in an aperture of a face.

In any one of the methods or structures disclosed herein, the head may further include: a non-magnetic portion having a knob; and a magnet.

In any one of the methods or structures disclosed herein, the head may have a surface capable of being moved axially relative to a tuft.

In any one of the methods or structures disclosed herein, the head may include a protrusion that may be capable of being received in a groove of the face.

In any one of the methods or structures disclosed herein, the head may include a protrusion that may be capable of being received in an aperture of the face.

In any one of the methods or structures disclosed herein, the head, and the tuft may be capable of receiving vibration generated by the motor.

In any one of the methods or structures disclosed herein, the knob may be capable of being moved axially relative to the end of the tuft.

In any one of the methods or structures disclosed herein, the knob may be capable of being moved axially relative to the tuft.

In any one of the methods or structures disclosed herein, the knob may be capable of being moved laterally relative to the end of the tuft.

In any one of the methods or structures disclosed herein, the knob may be capable of being moved laterally relative to the tuft.

In any one of the methods or structures disclosed herein, the knob may be capable of being abutted against the tuft.

In any one of the methods or structures disclosed herein, the knob may be capable of being vibrated from a first position to a second position.

In any one of the methods or structures disclosed herein, the magnet may be capable of being magnetically attractive to the tuft.

In any one of the methods or structures disclosed herein, the magnet may be magnetically coupled to a bulb the tuft.

In any one of the methods or structures disclosed herein, the magnet may have a tapered portion, wherein the largest diameter of the tapered portion may be greater than a diameter of the non-magnet.

In any one of the methods or structures disclosed herein, the magnet may have a tapered portion, wherein the smallest diameter of the tapered portion may be less than or equal to a diameter of the non-magnet.

In any one of the methods or structures disclosed herein, the magnet may have a tapered portion.

In any one of the methods or structures disclosed herein, the magnetic portion may have a tapered portion, wherein the largest diameter of the tapered portion may be greater than a diameter of the non-magnetic portion.

In any one of the methods or structures disclosed herein, the magnetic portion may have a tapered portion.

In any one of the methods or structures disclosed herein, the magnetic portion may be capable of being magnetically attracting to the tuft.

In any one of the methods or structures disclosed herein, the magnetic portion may be magnetically coupled to the tuft.

In any one of the methods or structures disclosed herein, the portion may have a tapered portion, wherein the smallest diameter of the tapered portion may be less than or equal to a diameter of the non-magnetic portion.

In any one of the methods or structures disclosed herein, the surface may be capable of pushing a bulb of the tuft against the face.

In any one of the methods or structures disclosed herein, the surface may be capable of pushing a bulb of the tuft away from the surface.

In any one of the methods or structures disclosed herein, the surface may be capable of pushing a bulb of the tuft.

In any one of the methods or structures disclosed herein, the tuft may include a bristle extending from an outer surface of the face.

In any one of the methods or structures disclosed herein, the tuft may include a bulb extending from an inner surface of the face.

In any one of the methods or structures disclosed herein, the tuft may be capable of being pushed in a direction perpendicular to the head.

In any one of the methods or structures disclosed herein, the tuft may be capable of being pushed in a direction perpendicular to the head.

In any one of the methods or structures disclosed herein, the tuft may be slidably coupled to the face.

In any one of the methods or structures disclosed herein, the tuft may be capable of being abutted against a surface of the head.

In any one of the methods or structures disclosed herein, the tuft may include a bulb that including ferromagnetic material.

In any one of the methods or structures disclosed herein, the tuft may include ferromagnetic material.

In any one of the methods or structures disclosed herein, when the head receives vibration generated by the motor, the vibration may be transferred from the head to a face.

In any one of the methods or structures disclosed herein, the tuft may be slidably coupled to face.

Any one of the methods disclosed herein may further include abutting the tuft against the face.

Any one of the methods disclosed herein may further include moving a portion of the tuft laterally relative to the face.

Any one of the methods disclosed herein may further include moving a portion of the tuft axially relative to the face.

Any one of the methods disclosed herein may further include moving an end of the tuft laterally relative to the knob.

Any one of the methods disclosed herein may further include moving the knob laterally relative to the tuft.

Any one of the methods disclosed herein may further include moving the knob axially relative to the tuft.

Any one of the methods disclosed herein may further include pushing an end of the tuft a distance from the knob.

Any one of the methods disclosed herein may further include pushing an end of the tuft a distance from a surface of the head.

Any one of the methods disclosed herein may further include pushing the tuft towards the knob.

Any one of the methods disclosed herein may further include sliding the tuft on a tapered portion of the magnet.

4. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

This section addresses specific versions of brush assemblies and methods for brushing surfaces. Although this section focuses on the drawings herein, and the specific versions found in those drawings, parts of this section may also have applicability to other versions not shown in the drawings. The limitations referenced in this section should not be used to limit the scope of the versions themselves, which have broader applicability.

Although the methods, structures, elements, and parts described herein have been described in detail, it should be understood that various changes, substitutions, and alterations can be made without departing from the spirit and scope of the inventions as defined by the following claims. Those skilled in the art may be able to study the preferred embodiments and identify other ways to practice the inventions that are not exactly as described herein. It is the intent of the inventor that variations and equivalents of the inventions are within the scope of the claims, while the description, abstract and drawings are not to be used to limit the scope of the inventions. The inventions is specifically intended to be as broad as the claims below and their equivalents.

FIG. 1A illustrates a close-up cross-sectional side view of a brush assembly 100 including a face 102, a head 104, and a tuft 106 being vibrated, in which the tuft 106 may extend through the face 102. The face 102 may be removably coupled to the head 104 (see FIG. 8A and FIG. 9). The face 102 may have an inner surface 108 and an outer surface 110. Additionally, the face 102 may have an aperture 112 extending through the inner surface 108 and the outer surface 110. A frustoconical portion 114 of the inner surface 108 may be adjacent the aperture 112. The frustoconical portion 114 may be tapered and/or radiused. The frustoconical portion 114 may have diameters that become progressively smaller starting from the inner surface 108 towards the outer surface 110.

The head 104 may have an inner surface 116 and an outer surface 118. The inner surface 116 may be planar or curved. The outer surface 118 may also be planar or curved.

The tuft 106 may include a bulb 120, a base 122, and one or more bristles 124. The bulb 120 may be spherical. The bulb 120 may be solid. Preferably, the bulb 120 may have a portion that is a spherical cap. The bulb 120 may extend from a first end of the base 122. The base 122 may be solid. The base 122 may extend through the face 102. The one or more bristles 124 may extend from a second end of the base 122. The one or more bristles 124 may extend through the aperture 112 of the face 102. Also, a collar 126 may extend radially from the base 122. The collar 126 may be disposed between the bulb 120 and the one or more bristles 124. In some cases, the collar 126 may inhibit the tuft 106 from egress through respective apertures 112. The bulb 120, the base 122, the one or more bristles 124, and the collar 126 may be unitary.

Dash lines indicate the face 102, the head 104, and/or the tuft 106 may be vibrated. A motor (not shown) may generate vibration to cause the head 104, the face 102, and/or the tuft 106 to vibrate. The motor may be coupled to the head 104, directly or indirectly. Vibration generated by the motor may be transferred, directly or indirectly, to the head 104. Vibration on the head 104 may cause the inner surface 116 and out surface 118 of the head 104 to also vibrate. The vibrating inner surface 116 may move towards the bulb 120 of the tuft 106. Accordingly, the vibrating inner surface 116 may be abutted against the bulb 120. In some cases, when abutted against the bulb 120, the vibrating inner surface 116 would push the bulb 120 away from the surface 116 and/or the head 104. Accordingly, the base 122 and/or the one or more bristles 124 of the tuft 106 would be displaced and/or slid through the aperture 112 of the face 102. Moreover, an end portion, e.g., tip, of each of the one or more bristles 124 would be displaced away from the outer surface 110 of the face 102. Thus, the displaced ends of the one or more bristles 124 may be abutted against a surface to be cleaned (not shown).

In addition, vibration on the head 104 may be transferred to the face 102 because one or more portions of the face 102 and one or more portions of the head 104 may physically touch. Additionally, vibration on the face 102 may be transferred to the tuft 106 because one or more portions of the vibrating face 102 may, in some cases, physically touch one or more portions of the tuft 106. Vibration on the tuft 106 may cause the bulb 120, the base 122, and/or the one or more bristles 124 of the tuft 106 to vibrate. Thus, vibration and/or abutment of the one or more bristles 124 against a structure may dislodge one or more particles from the structure such as contaminants, debris, plaque, dust, dirt, mud, soil, oil, paraffin, wax, and/or a stain.

Figure 1B:
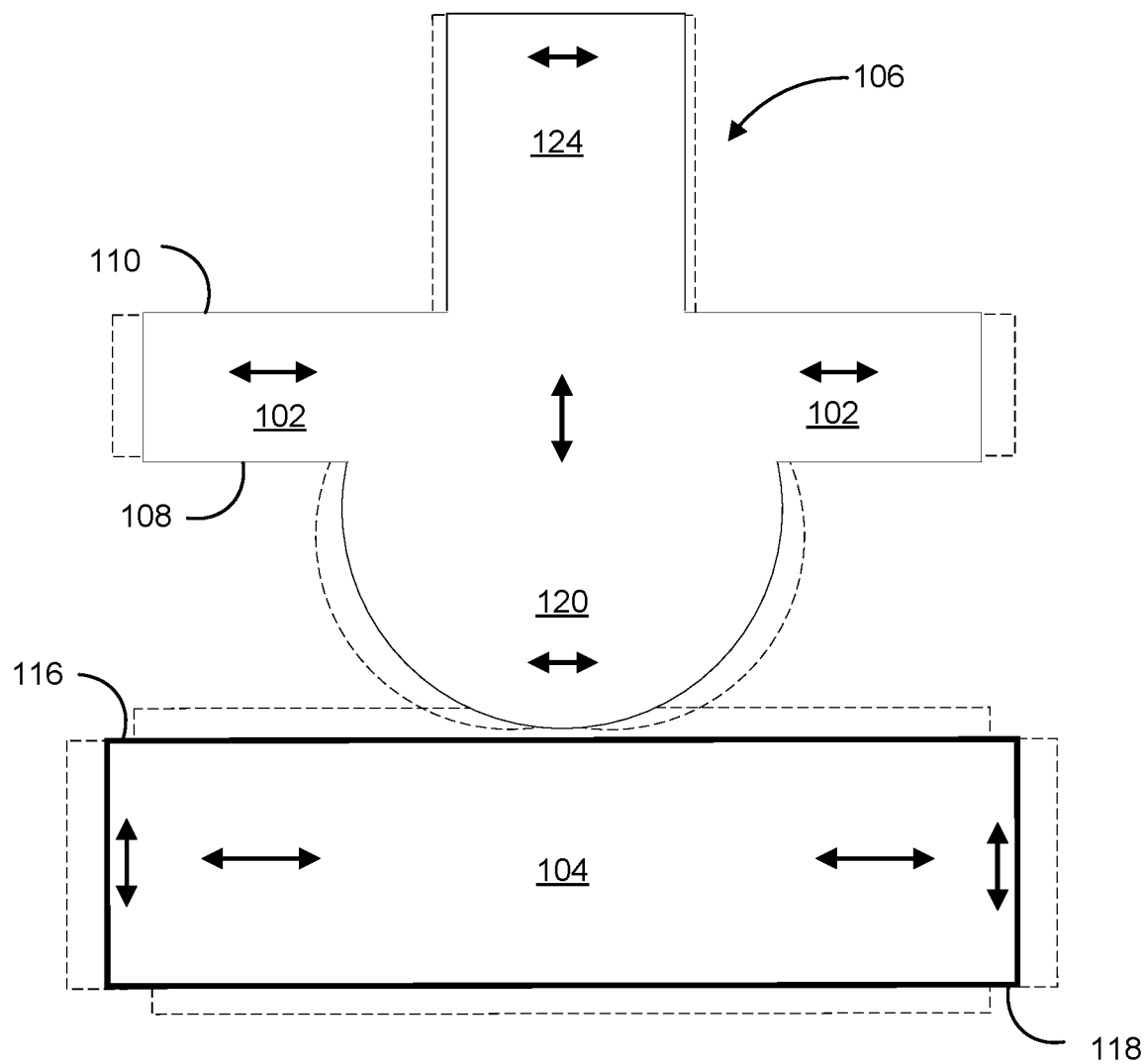
FIG. 1B illustrates a close-up cross-sectional side view of a brush assembly having a face, a tuft, and a head being vibrated, in which the face and the tuft may be unitary.

FIG. 1B illustrates a close-up cross-sectional side view of a brush assembly having a face 102, a head 104, and a tuft 106 being vibrated, in which the face 102 and the tuft 106 may be unitary. The face 102 may be removably coupled to the head 104 (see FIGS. 8A-C and FIG. 9). The face 102 may have an inner surface 108 and an outer surface 110. The face 102 may have a tuft 106. The face 102 may have a bulb 120 and a bristle 124. The bulb 120 and the bristle 124 may share a central axis. The bulb 120 may be spherical. The bulb 120 may be solid. Preferably, the bulb 120 may have a portion that is a spherical cap. The bulb 120 may extend from an inner surface of the face 102. The bristle 124 may extend from an outer surface of the face 102. Accordingly, the face 102, the bulb 120, and the bristle 124 may be unitary. The face 102, the bulb 120, and the bristle 124 may be constructed from material including silicone, rubber, and plastic.

The head 104 may have an inner surface 116 and an outer surface 118. The inner surface 116 may be planar or curved. The outer surface 118 may also be planar or curved.

Dash lines indicate the face 102, the head 104, and/or the tuft 106 may be vibrated. A motor (not shown) may generate vibration to cause the head 104, the face 102, and/or the tuft 106 to vibrate. The motor may be coupled to the head 104, directly or indirectly. Vibration generated by the motor may be transferred, directly or indirectly, to the head 104. Vibration on the head 104 may cause the inner surface 116 and out surface 118 of the head 104 to also vibrate. The vibrating inner surface 116 may move towards the tuft 106. Accordingly, the vibrating inner surface 116 may be abutted against the bulb 120. In some cases, when abutted against the bulb 120, the vibrating inner surface 116 would push the bulb 120 away from the surface 114 and/or the head 104. Accordingly, the bulb 120, a portion of the face 102, and/or the bristle 124 of the tuft 106 would be displaced. Moreover, an end portion, e.g., tip, of the bristle 124 would be displaced away from the inner surface 116 of the head 104. Thus, the displaced end portion of the bristle 124 may be abutted against a surface to be cleaned (not shown).

In addition, vibration on the head 104 may be transferred to the face 102 because one or more portions of the face 102 and one or more portions of the head 104 may physically touch. Additionally, vibration on the face 102 may be transferred to the tuft 106. Vibration on the face 102 may cause the bulb 120 and/or the bristle 124 to vibrate. Thus, vibration and/or abutment of the bristle 124 against a structure may dislodge one or more particles from the structure such as contaminants, debris, plaque, dust, dirt, mud, soil, oil, paraffin, wax, and/or a stain.

Figure 2A:
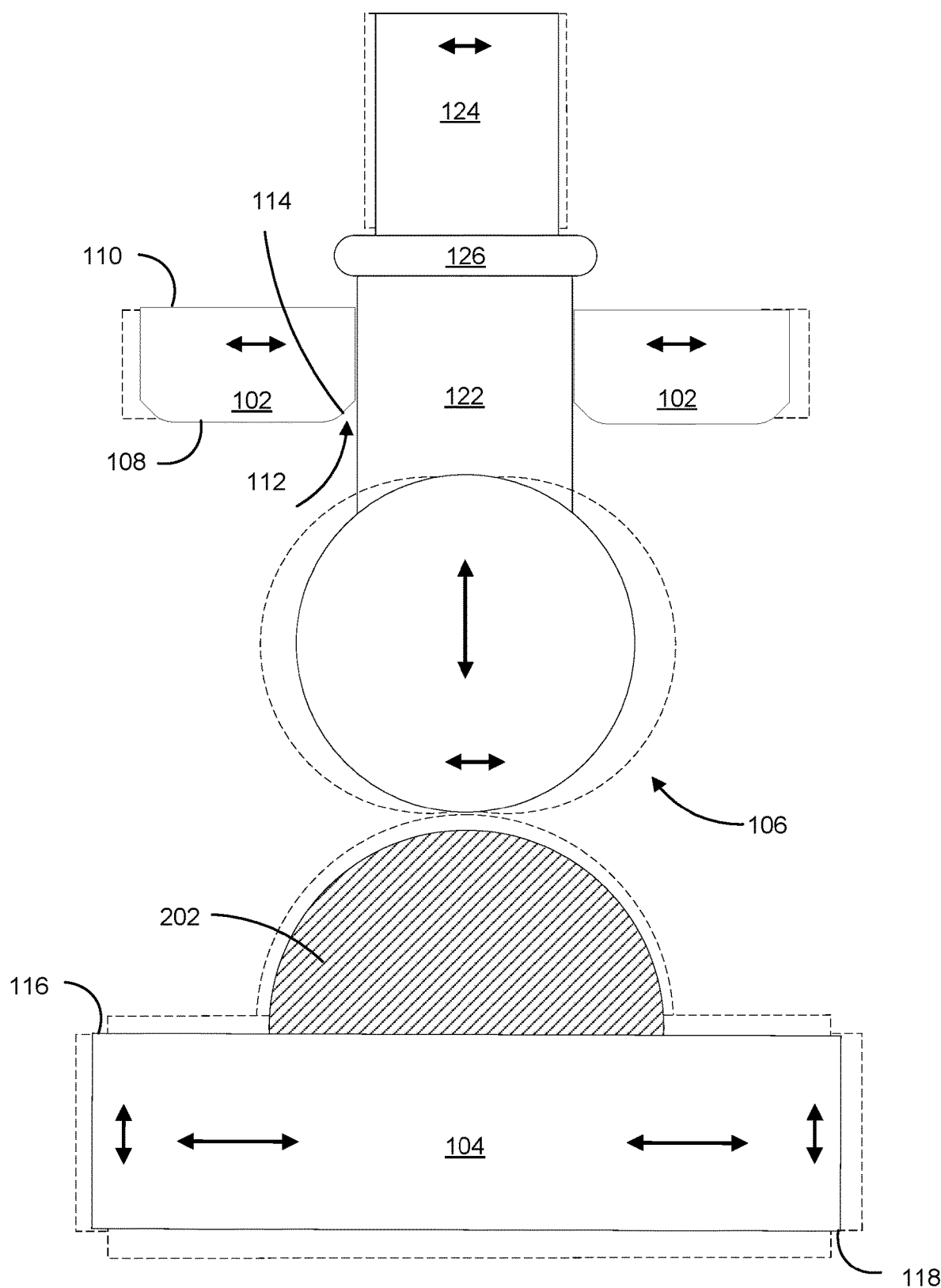
FIG. 2A illustrates a close-up cross-sectional side view of a brush assembly having a head having a face, a head having a knob, and a tuft being vibrated, in which the tuft may extend through the face.

FIG. 2A illustrates a close-up cross-sectional side view of a brush assembly having a face 102, a head 104 having a knob 120, and a tuft 106 being vibrated, in which the tuft 106 may extend through the face 102. The face 102 may be removably coupled to the head 104 (see FIG. 8A and FIG. 9). The face 102 may have an inner surface 108 and an outer surface 110. Additionally, the face 102 may have an aperture 112 extending through the inner surface 108 and the outer surface 110. A frustoconical portion 114 of the inner surface 108 may be adjacent the aperture 112. The frustoconical portion 114 may be tapered and/or radiused. The frustoconical portion 114 may have diameters that become progressively smaller starting from the inner surface 108 towards the outer surface 110.

The head 104 may have an inner surface 116 and an outer surface 118. The outer surface 118 may be planar or curved. The inner surface 116 may be planar or curved. Moreover, the knob 202 may extend from the inner surface 116. The knob 202 may be a spherical cap on the inner surface 116. The knob 202 and the inner surface 116 may be unitary.

The tuft 106 may be slidable coupled to the face 102. The tuft 106 may include a bulb 120, a base 122, and one or more bristles 124. The bulb may be solid. The bulb 120 may be spherical. Preferably, the bulb 120 may have a portion that is a spherical cap. The bulb 120 may extend from a first end of the base 122. The base 122 may be solid. The base 122 may extend through the face 102. A portion of the base 122 may be disposed in the aperture 112 of the face 102. The one or more bristles 124 may extend from a second end of the base 122. The one or more bristles 124 may extend through the aperture 112 of the face 102. The one or more bristles 124 may extend through the aperture 112 of the face 102. Also, a collar 126 may extend radially from the base 122. The collar 126 may be disposed between the bulb 120 and the one or more bristles 124. In some cases, the collar 126 may inhibit the tuft 106 from egress through respective apertures 112. The bulb 120, the base 122, the one or more bristles 124, and the collar 126 may be unitary.

Dash lines indicate that the face 102, the head 104, the tuft 106, and/or the knob 202 may be vibrated. A motor (not shown) may generate vibration to cause the head 104, the face 102, and/or the tuft 106 to vibrate. The motor may be coupled to the head 104, directly or indirectly. Vibration generated by the motor may be transferred, directly or indirectly, to the head 104. Vibration on the head 104 may cause the inner surface 116, out surface 118 of the head 104, and the knob 202 to also vibrate. The vibrating knob 202 may move towards the tuft 106, e.g., laterally or axially. Accordingly, the vibrating knob 202 may be abutted against the tuft 106. In some cases, when abutted against the tuft 106, the vibrating knob 202 would push the tuft 106 away from the head 104. Accordingly, the base 122 and/or the one or more bristles 124 of the tuft 106 would be displaced and/or slid through the aperture 112 of the face 102. Moreover, an end portion, e.g., tip, of each of the one or more bristles 124 would be displaced away from the outer surface 110 of the face 102. Thus, the displaced one or more bristles 124 may be abutted against a structure to be cleaned (not shown).

In addition, vibration on the head 104 may be transferred to the face 102 because one or more portions of the face 102 and one or more portions of the head 104 may physically touch. Additionally, vibration on the face 102 may be transferred to the tuft 106 because one or more portions of the vibrating face 102 may, in some cases, physically touch one or more portions of the tuft 106. Vibration on the tuft 106 may cause the bulb 120, the base 122, and/or the one or more bristles 124 of the tuft 106 to vibrate. Thus, vibration and/or abutment of the one or more bristles 124 against a structure may dislodge one or more particles from the structure such as contaminants, debris, plaque, dust, dirt, mud, soil, oil, paraffin, wax, and/or a stain.

Figure 2B:
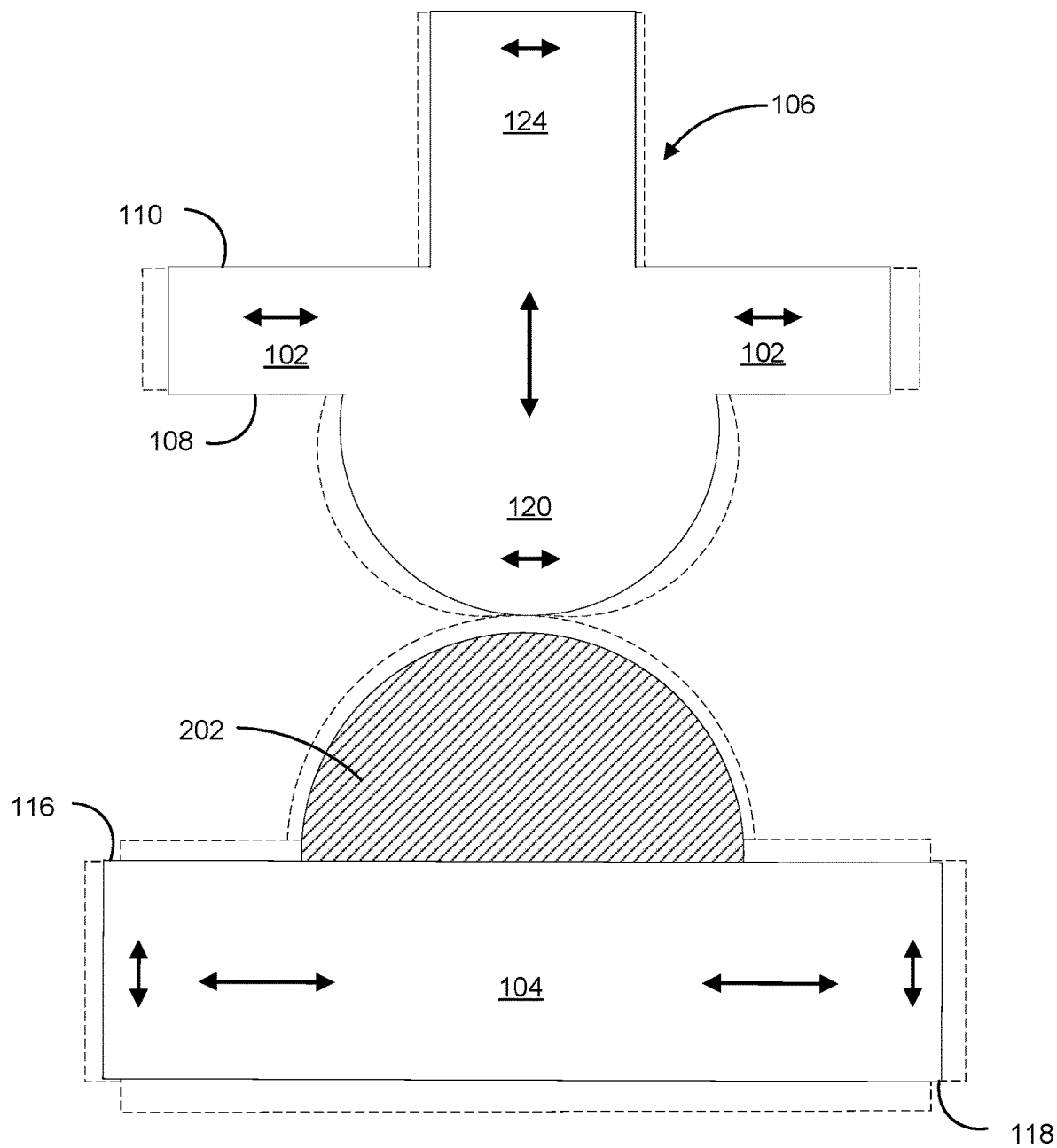
FIG. 2B illustrates a close-up cross-sectional side view of a brush assembly having a face, a head having a knob, and a tuft being vibrated, in which the face and the tuft may be unitary.

FIG. 2B illustrates a close-up cross-sectional side view of a brush assembly 100 having a face 102, a head 104 having a knob 120, and a tuft 106 being vibrated, in which the face 102 and the tuft 106 may be unitary. The face 102 may be removably coupled to the head 104 (see FIG. 8A and FIG. 9). The face 102 may have an inner surface 108 and an outer surface 110. The face 102 may have a tuft 106. The face 102 and the tuft 106 may be unitary. The face 102 may include a bulb 120 and a bristle 124. The bulb 120 may be spherical. The bulb 120 may be solid. Preferably, the bulb 120 may have a portion that is a spherical cap. The bulb 120 may extend from an inner surface of the face 102. The bristle 124 may extend from an outer surface of the face 102. Accordingly, the face 102, the bulb 120, and the bristle 124 may be unitary. The face 102, the bulb 120, and the bristle 124 may be constructed from material including silicone, rubber, and plastic.

The head 104 may have an inner surface 116 and an outer surface 118. The outer surface 118 may be planar or curved. The inner surface 116 may be planar or curved. Moreover, the knob 202 may extend from the inner surface 116. The knob 202 may be a spherical cap on the inner surface 116. The knob 202 and the inner surface 116 may be unitary.

Dash lines indicate the face 102, the head 104, and/or the tuft 106 may be vibrated. A motor (not shown) may generate vibration to cause the head 104, the face 102, and/or the tuft 106 to vibrate. The motor may be coupled to the head 104, directly or indirectly. Vibration generated by the motor may be transferred, directly or indirectly, to the head 104. Vibration on the head 104 may cause the inner surface 116 and out surface 118 of the head 104 to also vibrate. The vibrating inner surface 116 may move towards the tuft 106, e.g., axially. Accordingly, the vibrating inner surface 116 may be abutted against the bulb 120. In some cases, when abutted against the bulb 120, the vibrating inner surface 116 would push the bulb 120 away from the surface 114 and/or the head 104. Accordingly, the bulb 120, a portion of the face 102, and/or the bristle 124 of the tuft 106 would be displaced. Moreover, an end portion, e.g., tip, of each of the bristle 124 would be displaced away from the inner surface 116 of the head 104. Thus, the displaced end portion of the bristle 124 may be abutted against a surface to be cleaned (not shown).

In addition, vibration on the head 104 may be transferred to the face 102 because one or more portions of the face 102 and one or more portions of the head 104 may physically touch. Additionally, vibration on the face 102 may be transferred to the tuft 106. Vibration on the face 102 may cause the bulb 120 and/or the bristle 124 to vibrate. Thus, vibration and/or abutment of the bristle 124 against a structure may dislodge one or more particles from the structure such as contaminants, debris, plaque, dust, dirt, mud, soil, oil, paraffin, wax, and/or a stain.

Figure 3:
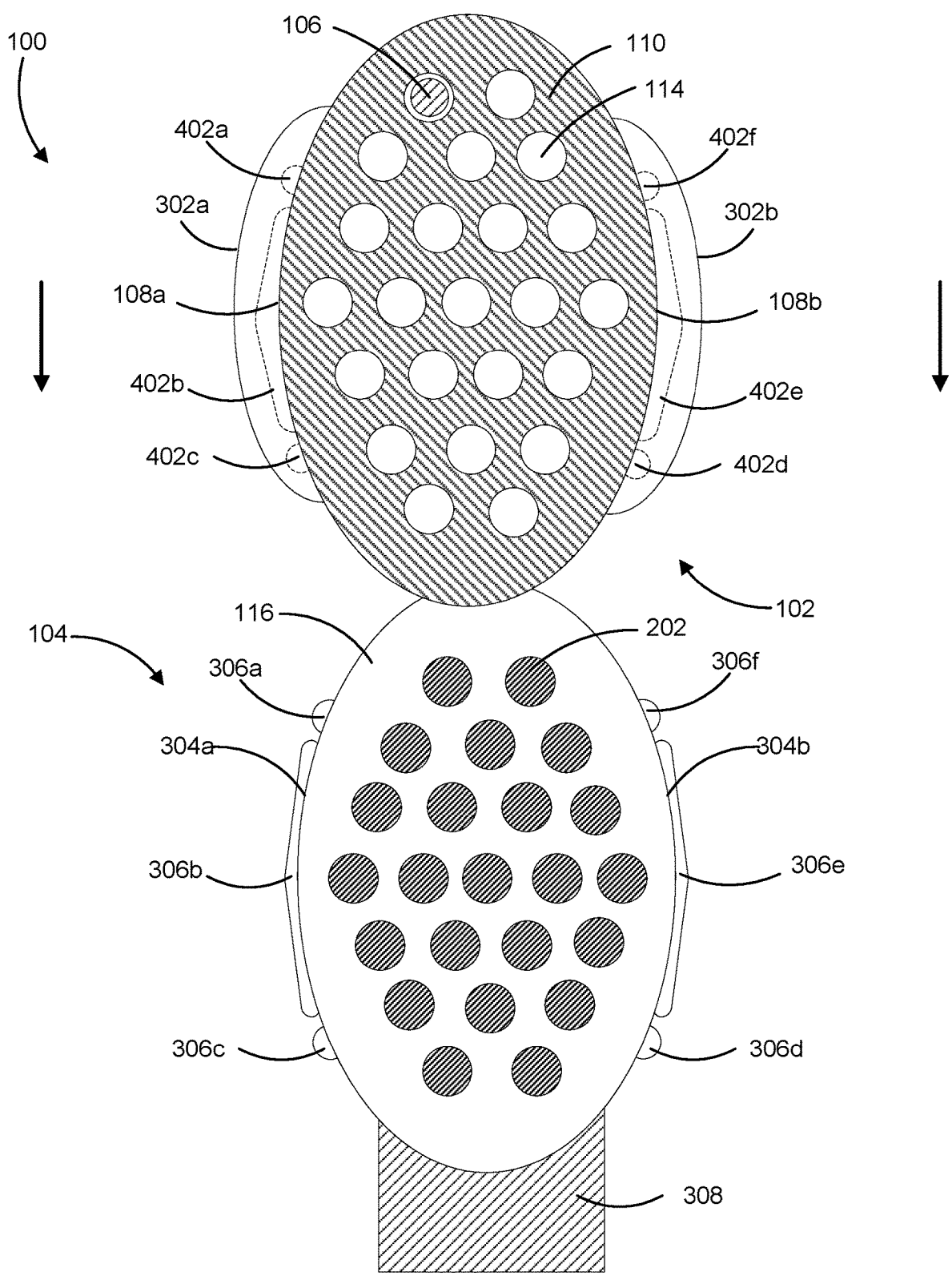
FIG. 3 illustrates a frontal profile view of a brush assembly having a face uncoupled from a head.
Figure 4:
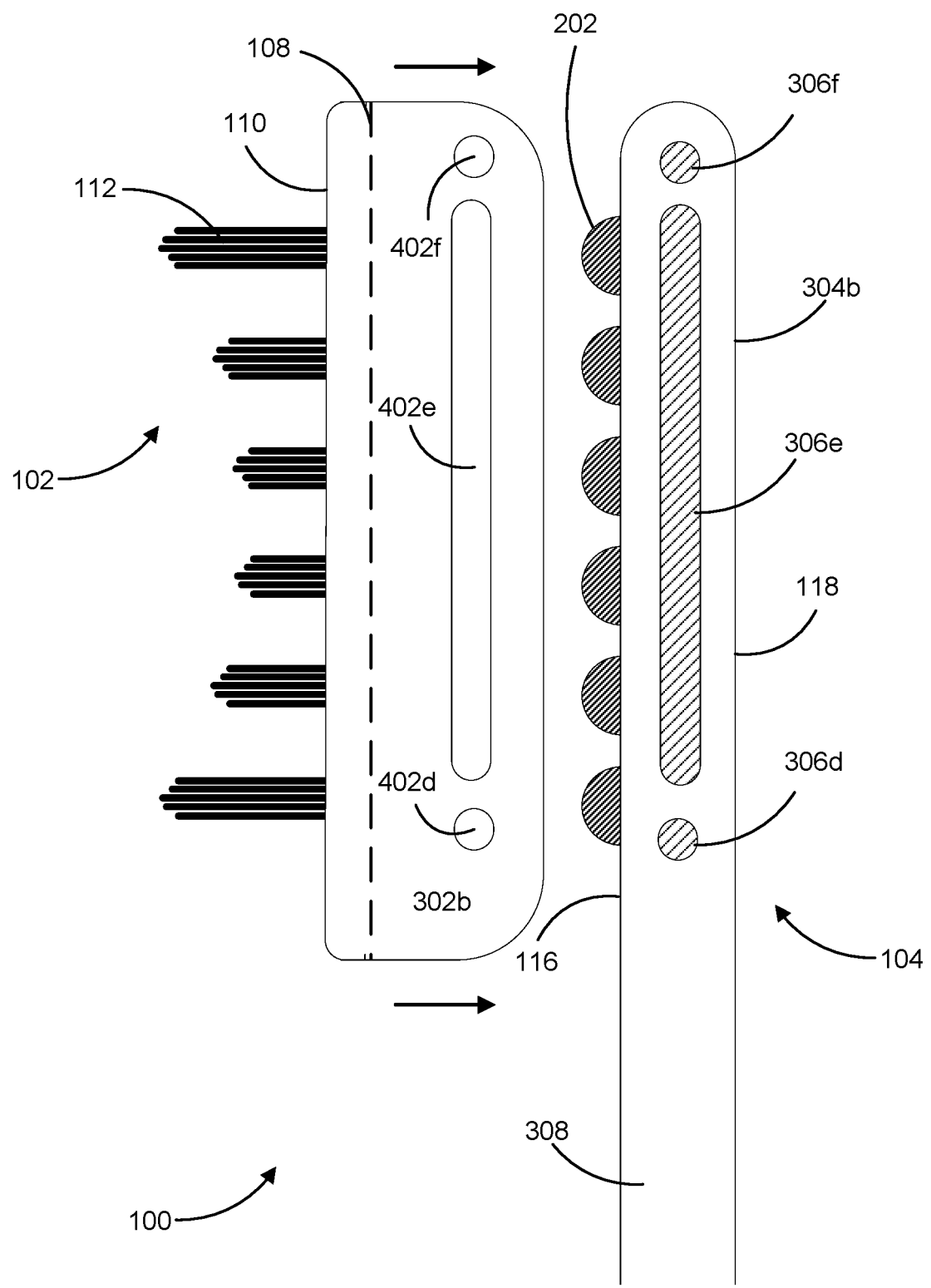
FIG. 4 illustrates a side profile view of a brush assembly having a face uncoupled from a head.

FIG. 3 illustrates a frontal profile view of a brush assembly 100 having a face 102 uncoupled from a head 104. FIG. 4 illustrates a side profile view of a brush assembly 100 having a face 102 uncoupled from a head 104.

Referring to FIG. 3 and FIG. 4, a face 102 may have an inner surface 108 and an outer surface 110, and sidewalls 302a, 302b. The face 102 may have one or more apertures 112 extending through the inner surface 108 and the outer surface 110. A portion of a tuft 106, may extend through each aperture 112.

The sidewalls 302a, 302b and the face 102 may be unitary. Each sidewall 302 may extend from a side of the face 102. Each sidewall 302 may extend perpendicular to a plane of the face 102 (see FIG. 9). Each sidewall 302 may be curved along a curved side of the face 102.

The sidewalls 302a, 302b may have respective apertures 402a-f extended therethrough. Some apertures 402b, 402e may each have an obround cross-section. Other apertures 402a, 402c, 402d, 402f may each be circular.

The head 104 may extend from a neck 308. The head 104 and the neck 308 may be unitary. Moreover, the neck 308 may be coupled to a handle (not shown). The neck 308 may extend from a handle. The head 104, the neck 308, and the handle may be unitary.

Also, the handle may house a motor (not shown) and one or more batteries (not shown) electrically coupled to the motor.

In addition, the head 104 may have an inner surface 116, an outer surface 118, and a side surfaces 304a, 304b. Also, the side surfaces 304a, 304b may be disposed adjacent to the inner surface 116 and the outer surface 118 of the head 104. Each side surface 304 may be disposed between the inner surface 116 and the outer surface 118. Each side surface 304 may be perpendicular to the inner surface 116 and/or the outer surface 118.

The head 104 may have knobs 202 and protrusions 306a-f. The head 104, the knobs 202, and the protrusions 306a-f may be unitary. The knobs 202 may protrude, e.g., extend, from an inner surface 116 of the head 104. The knobs 202 may extend from the inner surface 116 of the head 104. Each knob 202 may be a spherical cap, e.g., dome. The protrusions 306a-f may extend from the head 104. Moreover, the protrusions 306a-f may extend from the side surfaces 304a, 304b, respectively.

When the face 102 and the head 104 are coupled, the protrusions 306a-f would be received in the respective apertures 402a-f of the face 102. The protrusions 306a-f would be abutted against respective surfaces of the sidewalls 302a, 302b that define the respective apertures 402a-f. Accordingly, the protrusions 306a-f would, in some cases, inhibit the face 102 from being uncoupled from the head 104.

Figure 5:
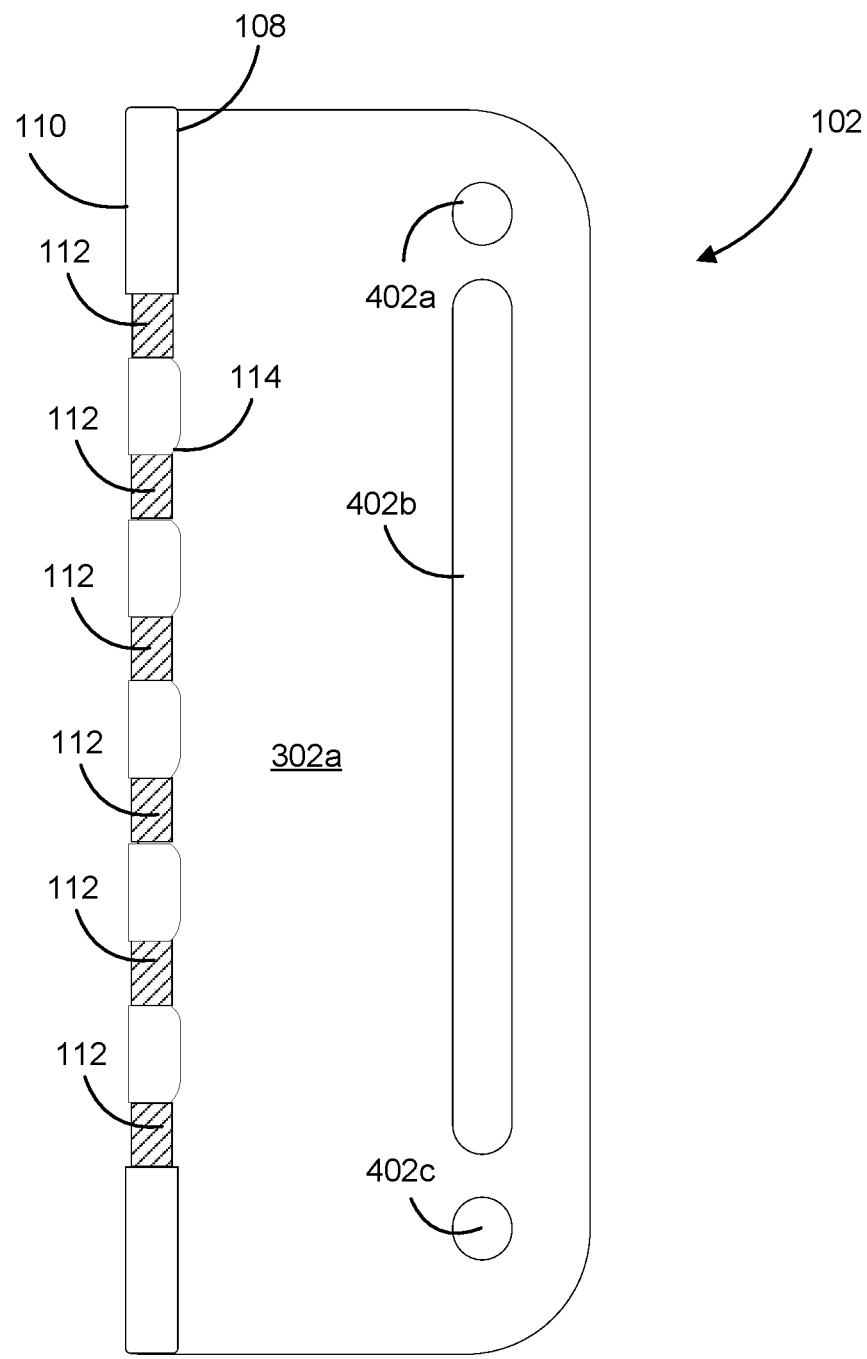
FIG. 5 illustrates a cross-sectional side view of a face.

FIG. 5 illustrates a cross-sectional side view of a face 102. The face 102 may have an inner surface 108 and an outer surface 110. The inner surface 108 may have a frustoconical portion 114, e.g., tapered or radiused portion. The frustoconical portion 114 may have a diameter near the inner surface 108 that is greater than a diameter near the outer surface 110.

The face 102 may have one or more apertures 112 extending through the inner surface 108 and the outer surface 110. A portion of a tuft 106 may extend through each aperture 112 (see FIG. 1A and FIG. 2A).

The face 102 may have two sidewalls 302a, 302b (see FIG. 3). The face 102 and the sidewalls 302a, 302b may be unitary. Although, only the sidewall 302a is shown in FIG. 5, it should be understood that the sidewalls 302a, 302b may have similar features. The sidewall 302a may extend from the face 102. The sidewall 302a may extend perpendicular to a plane of the face 102 (see FIG. 9).

The sidewall 302a may have apertures 402a-c. The aperture 402b may have an obround cross-section. The apertures 402a, 402c may each be circular.

Figure 6A:
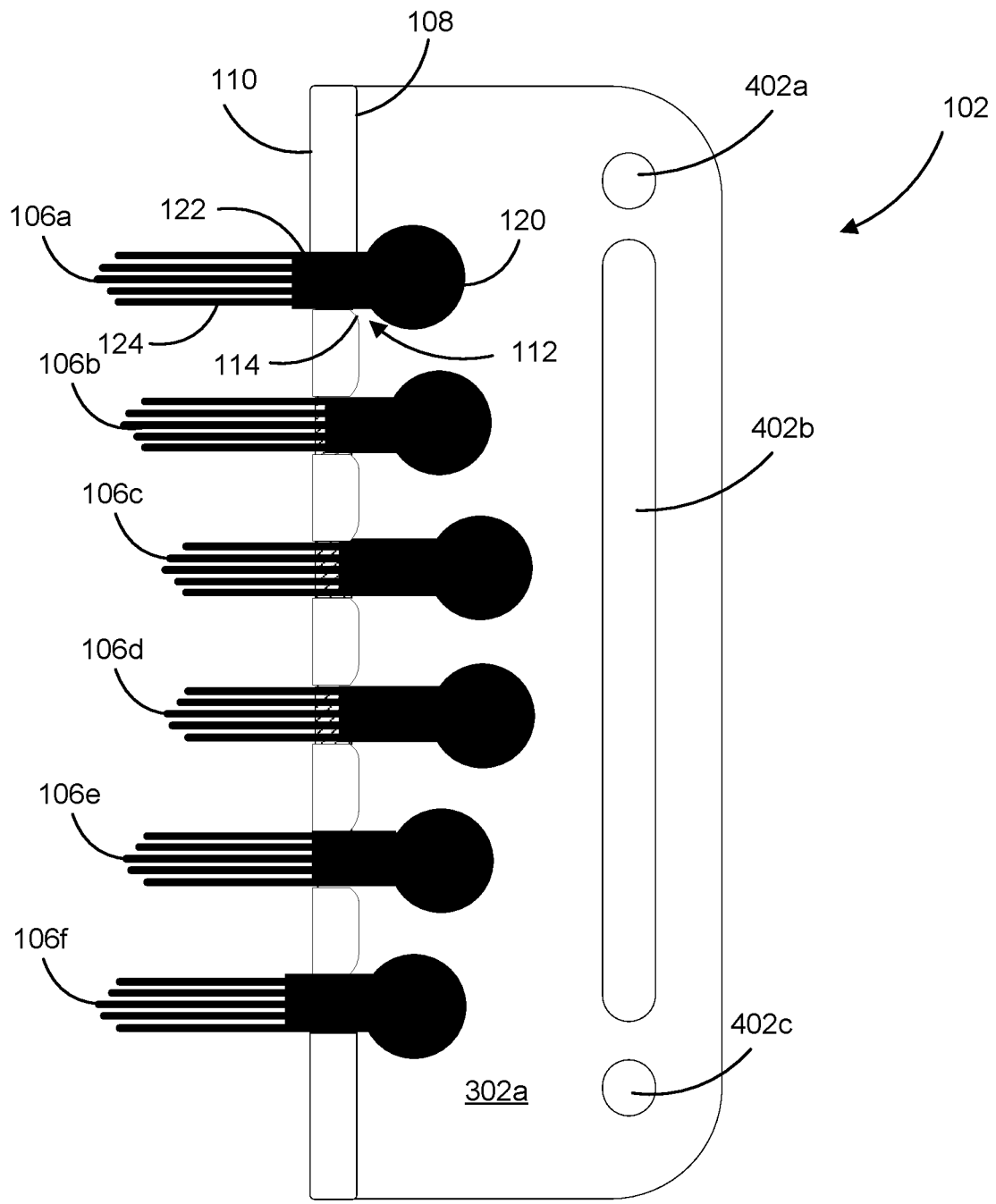
FIG. 6A illustrates a cross-sectional side view of a face having tufts extending therethrough.

FIG. 6A illustrates a cross-sectional side view of a face 102 having tufts 106a-f extending therethrough. The face 102 may have an inner surface 108 and an outer surface 110. The face 102 may have one or more apertures 112 extending through the inner surface 108 and the outer surface 110. The inner surface 108 may have a frustoconical portion 114, e.g., tapered or radiused portion. The frustoconical portion 114 may have a diameter near the inner surface 108 that is greater than a diameter near the outer surface 110.

The tufts 106 may extend through the respective apertures 112 (see also FIG. 5) of the face 102. Each tuft 106 may have a bulb 120, a base 122, and one or more bristles 124. The bulb 120 and the base 122 may be unitary. The bulb 120, the base 122, and the one or more bristles 124 may be unitary.

Each bulb 120 may be solid. Each bulb 120 may be spherical. Preferably, each bulb 120 may have an end that is a spherical cap. Each bulb 120 may extend from a first end of the base 122. Each bulb 120 may have a portion configured to be abutted against the frustoconical portion 114 of the face 102.

Preferably, each base 122 may be solid. Each base 122 may be cylindrical. Each base 122 may be tapered. Each base 122 may be coupled to a corresponding bulb 120. Each base 122 may extend from a bulb 120. Each base 122 may extend through the face 102. Each base 122 may be capable of being pushed and/or slid through an aperture 112 of the face 102.

Each of the one or more bristles 124 may extend from a second end of a base 122. Each of the one or more bristles 124 may be cylindrical. Each of the one or more bristle 124 may be solid. Each of the one or more bristles 124 may extend through an aperture 112 of the face 102. Each of the one or more bristle 124 may be capable of being pushed and/or slid through an aperture 112.

Figure 6B:
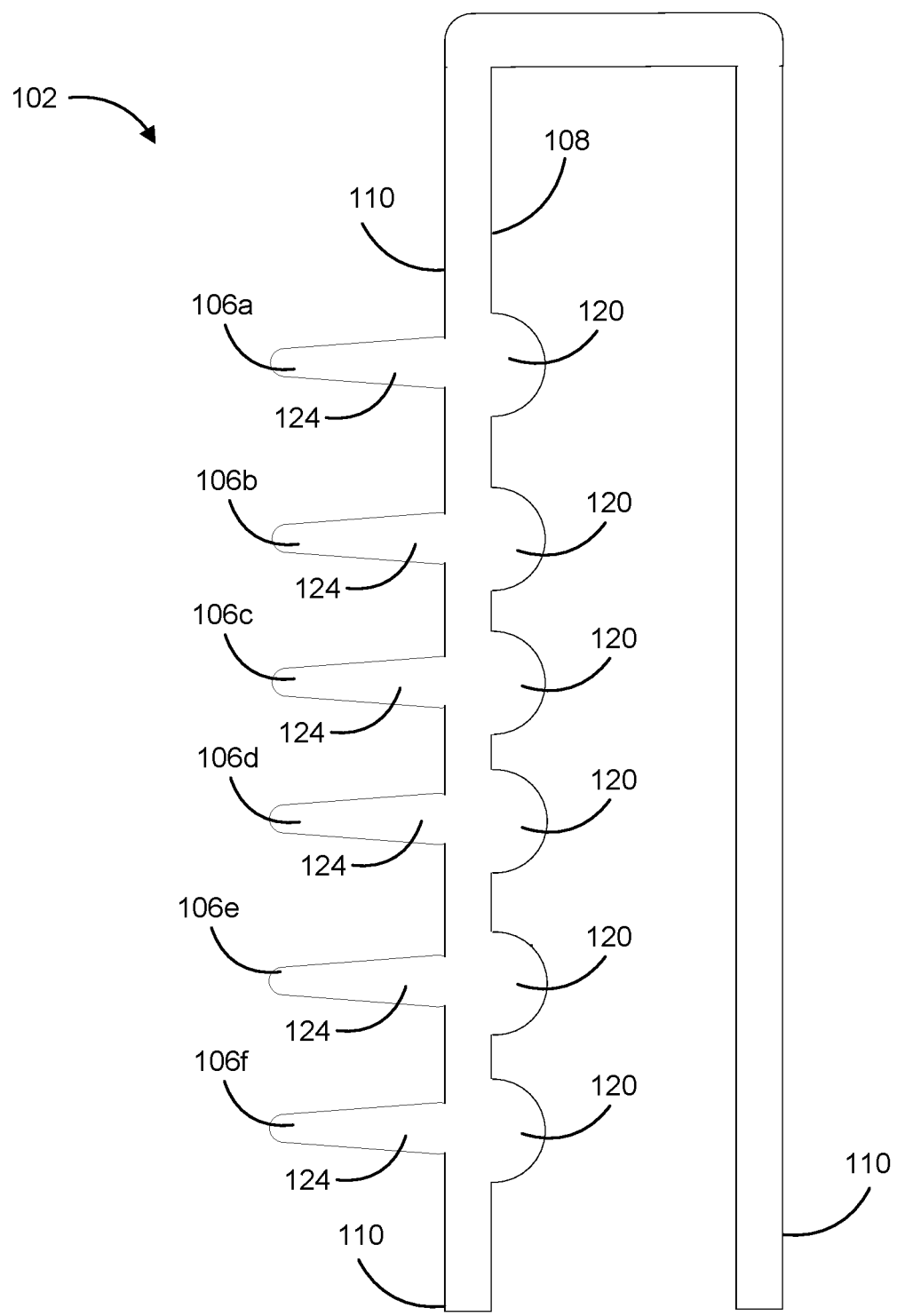
FIG. 6B illustrates a cross-sectional side view of a face and tufts that may be unitary.

FIG. 6B illustrates a cross-sectional side view of a face 102 having tufts 106a-f. The face 102 may have an inner surface 108 and an outer surface 110. The face 102 may be a sleeve capable of receiving a head 104 (see FIG. 8B or FIG. 8C).

Portions, e.g., bulbs 120 and bristles 124, of the tufts 106a-f may extend from surfaces of the face 102. Each tuft 106 may have a bulb 120 and a bristle 124. The face 102, the bulbs 120, the bristles 124 may be unitary.

Each bulb 120 may be solid. Each bulb 120 may be spherical. Preferably, each bulb 120 may have an end that is a spherical cap. Each bulb 120 may extend from the inner surface 108 of the face 102.

Each of the bristles 124 may extend from the outer surface of a face 102. Each of the one or more bristles 124 may be cylindrical. Each of the bristles 124 may be tapered. Each of the bristles 124 may be solid.

Figure 7:
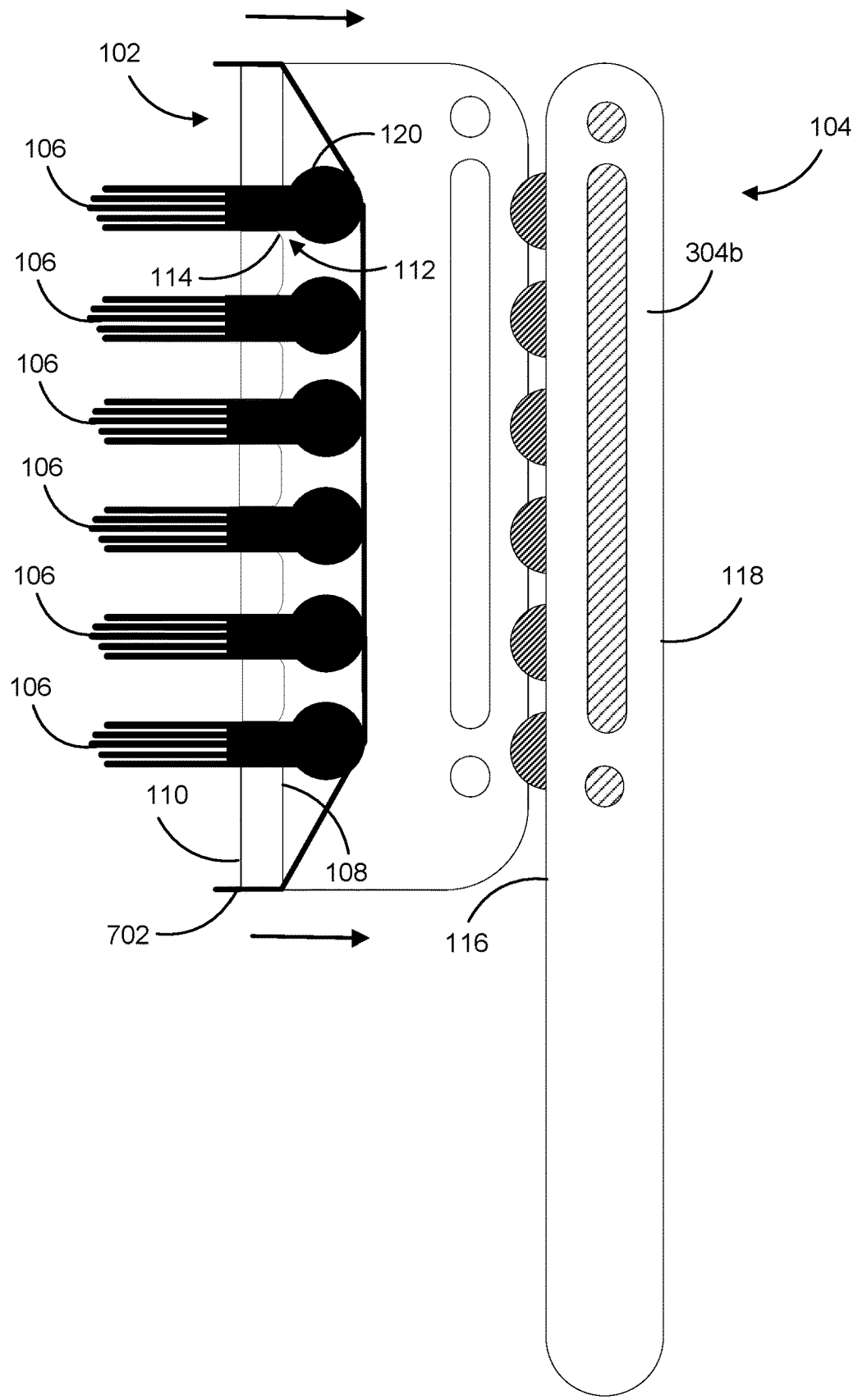
FIG. 7 illustrates a cross-sectional side view of a brush assembly having a face and a head in a pre-assembled configuration.

FIG. 7 illustrates a cross-sectional side view of a brush assembly 100 having a face 102 and a head 104 in a pre-assembled configuration. The face 102 may have an inner surface 108 and an outer surface 110. The face 102 may have one or more apertures 112 extending through the inner surface 108 and the outer surface 110. The inner surface 108 may have a frustoconical portion 114, e.g., tapered or radiused portion. The frustoconical portion 114 may have a diameter near the inner surface 108 that is greater than a diameter near the outer surface 110.

One or more tufts 106 may extend through the respective apertures 112. Each tuft 106 may have a bulb 120, a base 122, and one or more bristles 124. The bulb 120 and the base 122 may be unitary. The bulb 120, the base 122, and the one or more bristles 124 may be unitary.

A tape 702 may be used to retain tufts 106 against the face 102. The tape 702 may have ends removably coupled to sides of the face 102. A portion of the tape 702 may span across the tufts 106a-f. Portions of the tape 702 may be abutted against bulbs 120 of the tufts 106. Thus, the tape 702 may, in some cases, inhibit the tufts 106a-f from egress through respective apertures 112 (see also FIG. 5) of the face 102. Additionally, each tuft 106 may have a collar 126 (see FIG. 1A and FIG. 2A) that may, in some cases, inhibit the tufts 106a-f from egress through respective apertures 112

Figure 8A:
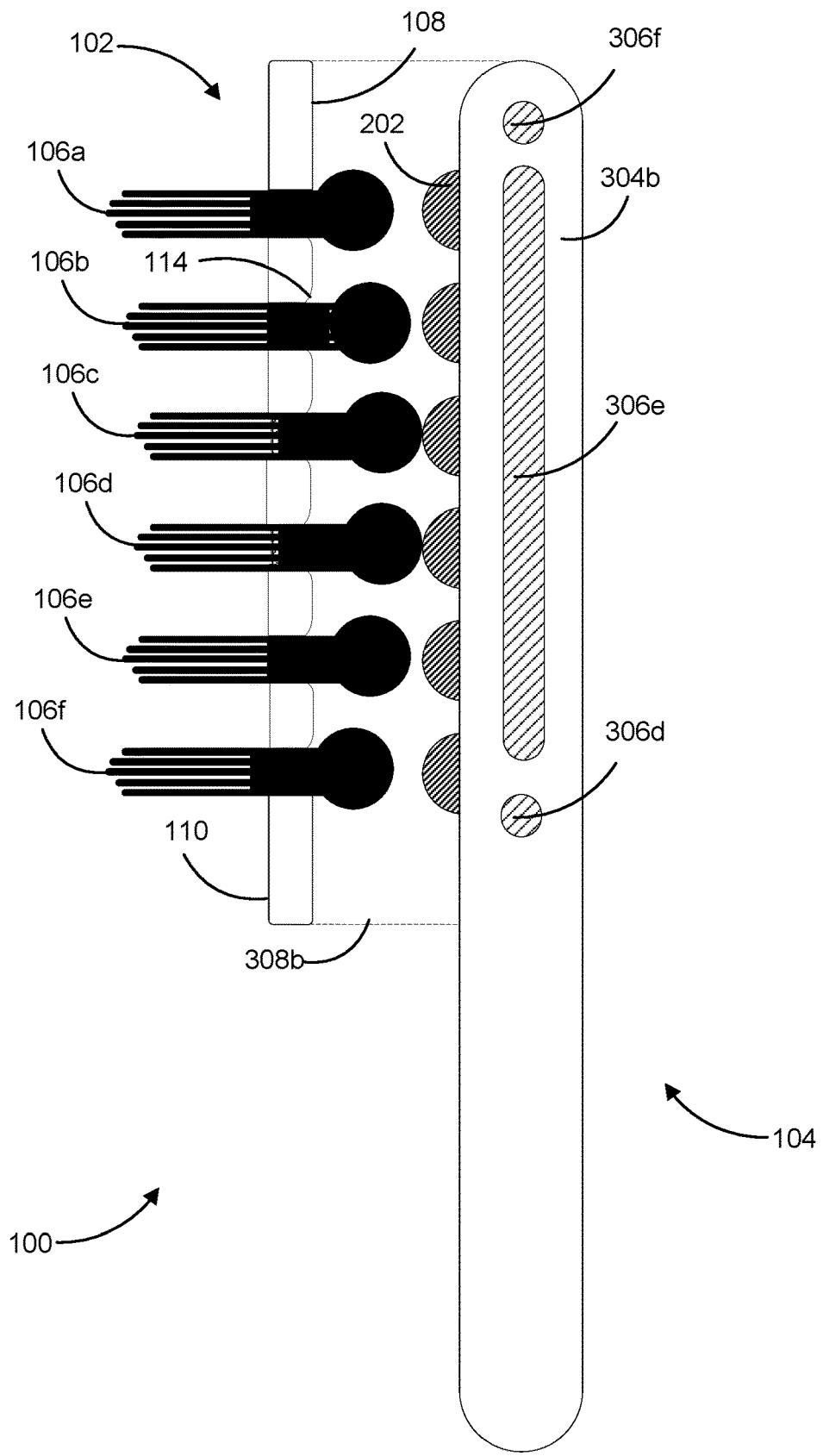
FIG. 8A illustrates a side profile view of a brush assembly in an assembled configuration having a face having tufts extended therethrough, the face coupled to a head having knobs.
Figure 9:
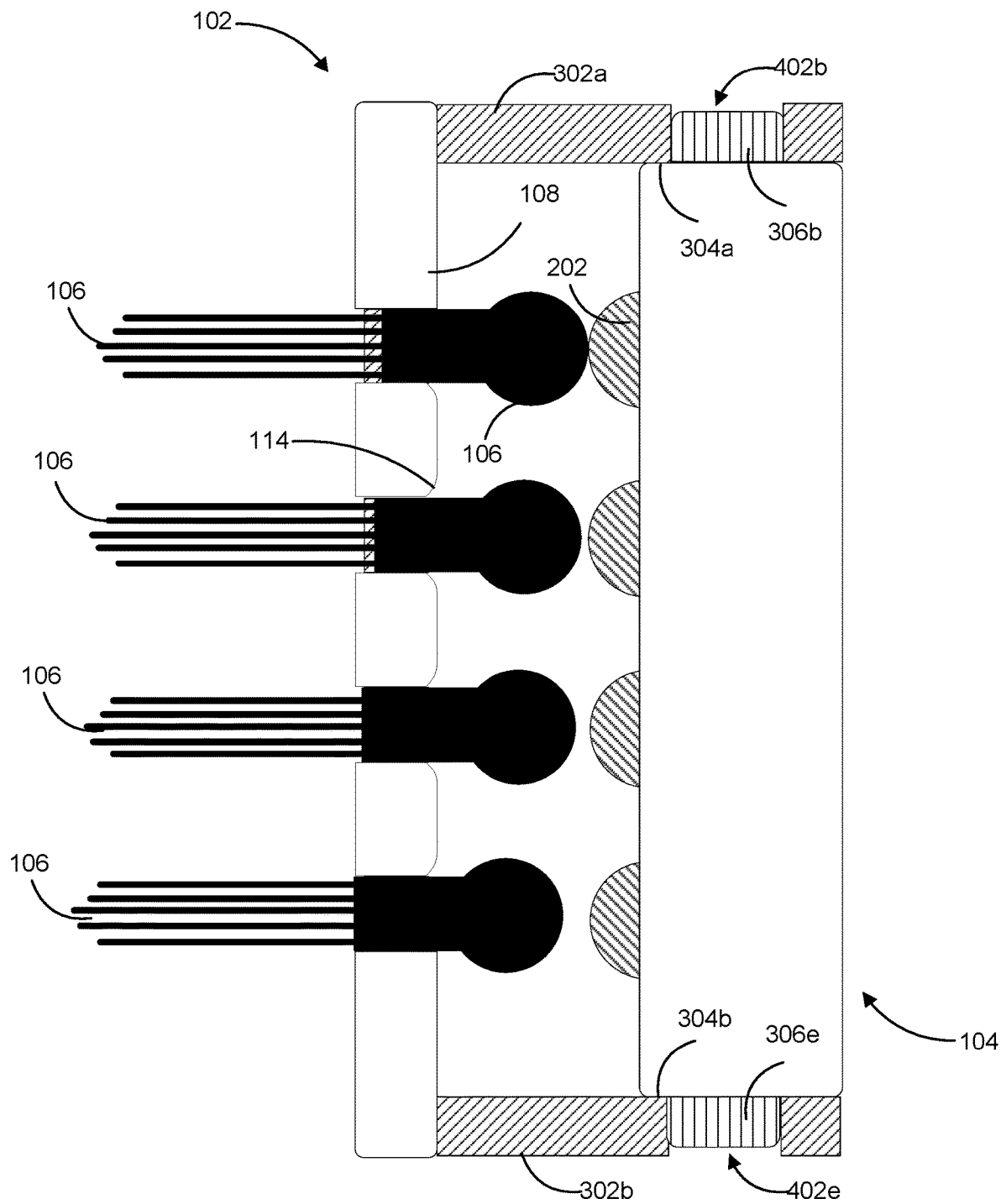
FIG. 9 illustrates a top cross-sectional view of a brush assembly in an assembled configuration having a face coupled to a head.

FIG. 8A illustrates a side profile view of a brush assembly 100 in an assembled position having a face 102 coupled to a head 104. FIG. 9 illustrates a top cross-sectional view of a brush assembly 100 in an assembled position having a face 102 coupled to a head 104.

Referring to FIG. 8A and FIG. 9, the face 102 may have an inner surface 108, an outer surface 110, and sidewalls 302a, 302b. The face 102 may have one or more apertures 112 extending through the inner surface 108 and the outer surface 110. The inner surface 108 may have a frustoconical portion 114, e.g., tapered or radiused portion. The frustoconical portion 114 may have a diameter near the inner surface 108 that is greater than a diameter near the outer surface 110.

The sidewalls 302a, 302b (see also FIG. 3) of the face 102 may be adjacent respective side surfaces 304a, 304b of the head 104. Additionally, the sidewalls 302a, 302b may be abutted against the side surface 304a, 304b of the head 104. Protrusions 306a-f (see also FIG. 3) may be received in respective apertures 402a-f (see also FIG. 3). For example, as shown in FIG. 9, protrusions 306b, 306e may be received in apertures 402b, 402e, respectively. The protrusions 306a-f may be abutted against surfaces of the sidewalls 302a, 302b. The surfaces may define the respective apertures 402a-f of the face 102. Accordingly, the protrusions 306a-f may, in some cases, inhibit the face 102 from being moved relative to the head 104. Thus, the protrusions 306a-f may, in some cases, inhibit the face 102 from being uncoupled from head 104, e.g., when the head 104 is vibrated.

One or more tufts 106 may extend through the face 102. Each tuft 106 may have a bulb 120 capable of being pushed towards a corresponding knob 202. Each bulb 120 may be capable of being abutted against a corresponding knob 202. In addition, each bulb 120 may be capable of being abutted against the surface 108 of the face 102. Each bulb 120 may be capable of being pushed against the inner surface 108 of the face 102 by a corresponding knob 202, e.g., that receives vibration. Moreover, each bulb 120 may be capable of being abutted against a frustoconical portion 114 of the inner surface 108. Furthermore, portions, e.g., a base 102 and/or one or bristles 124, of each tuft 106 may be capable of being pushed through the face 102.

When the head 104 receives vibration from a motor (not shown), knobs 202 of the head 104 would, in some cases, be abutted against respective bulbs 120 of the tufts 106. Each knob 202 would, in some cases, push a corresponding bulb 120 away from the knob 202. Correspondingly, a base 122 and/or one or more bristles 124 of each tuft 106 would be slid within an aperture 112 of the face 102. Moreover, the bulb 120, in some cases, would be capable of being pushed against a frustoconical surface 114 of the face 102.

Figure 8B:
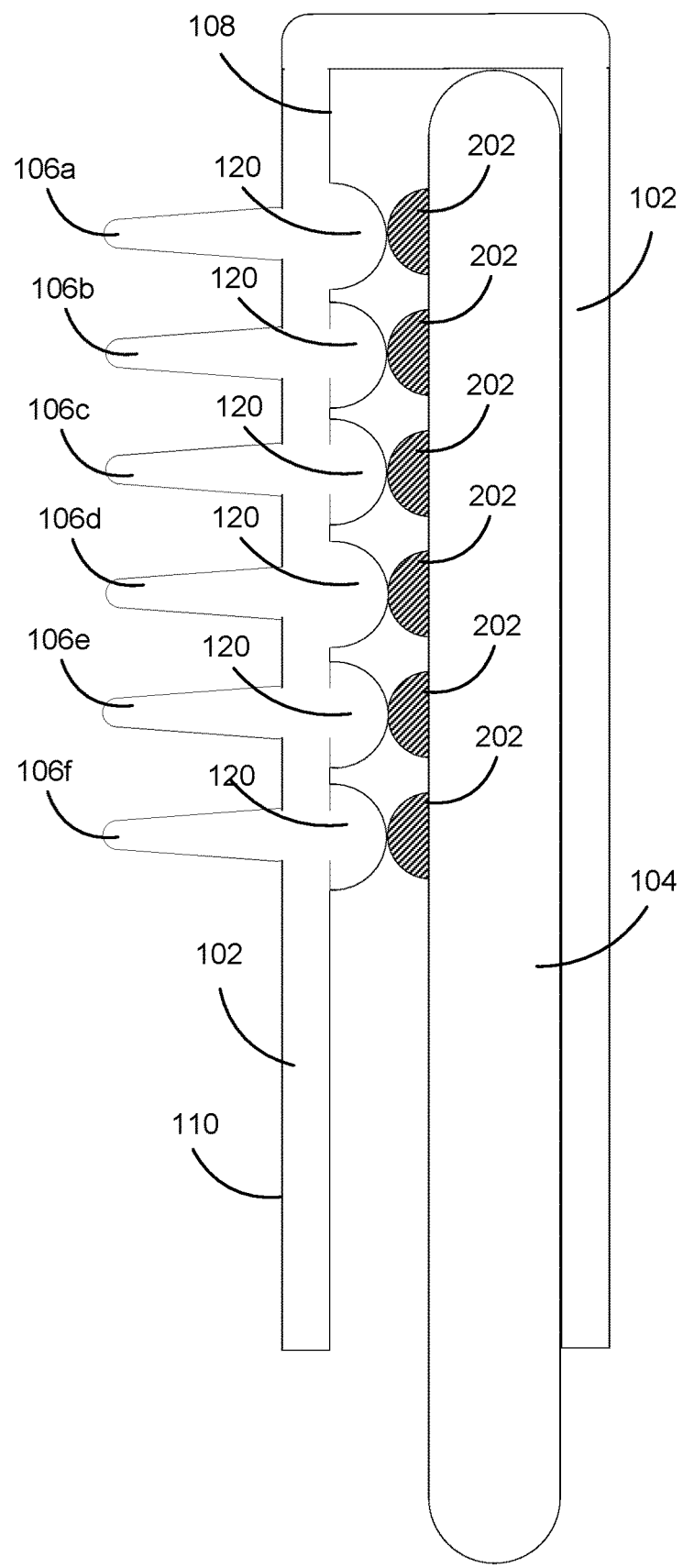
FIG. 8B illustrates a side profile view of a brush assembly in an assembled configuration having a face coupled to a head having knobs, in which the face has tufts, and the face and the tufts are unitary.
Figure 8C:
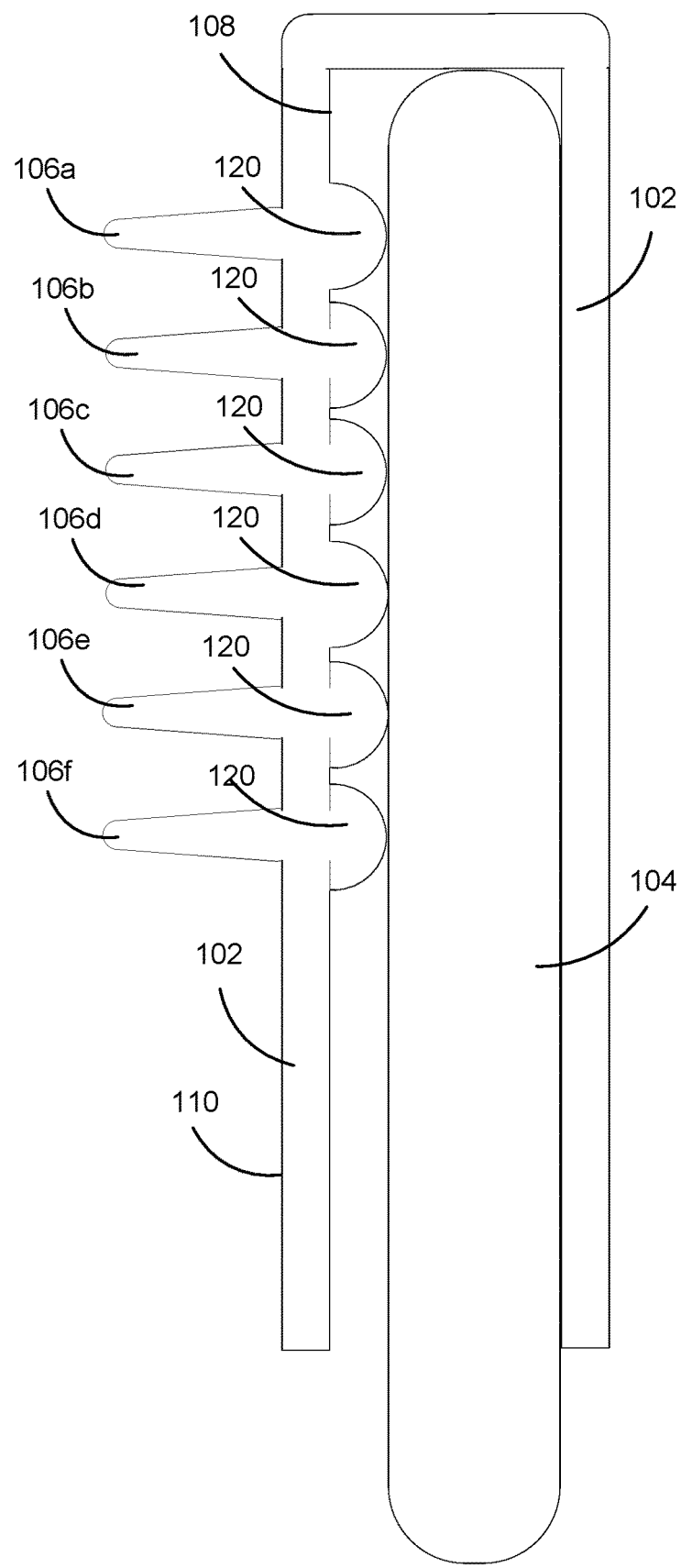
FIG. 8C illustrates a side profile view of a brush assembly in an assembled configuration having a face coupled to a head, in which the face has tufts, and the face and the tufts are unitary.

Referring to FIG. 8B and FIG. 8C, the face 102 may have an inner surface 108 and an outer surface 110. The face 102 may have one or more bulbs 120 extending from the inner surface 108. Also, the face 102 may have one or more bristles extending from the outer surface 110. In addition, the face 102 may be a sleeve. The face 102 may receive a head 104 therein.

Referring to FIG. 8B, the head 104 may have knobs 202. Each knob 202 may abutted against a respective bulb 120. Accordingly, each corresponding bulb 120, bristle 124, and knob 202 may share a central axis.

When the head 104 receives vibration from a motor (not shown), one or more knobs 202 of the head 104 would, in some cases, be abutted against one or more respective bulbs 120 of the tufts 106. Each knob 202 would, in some cases, push a corresponding bulb 120 away from the knob 202. A bristle 124 corresponding to the bulb 120 may be pushed away from the knob 202 as well.

Referring to FIG. 8C, the head 104 may have a planar inner surface 116. Portions of the inner surface 116 may abutted against respective bulbs 120.

When the head 104 receives vibration from a motor (not shown), portions of the inner surface 116 of the head 104 would, in some cases, be abutted against respective bulbs 120 of the tufts 106. The portions of the inner surface 116 would, in some cases, push a corresponding bulb 120 away from the inner surface 116. One or more bristles 124 corresponding to the bulb 120 may be pushed away from the inner surface 116 as well.

Figure 10:
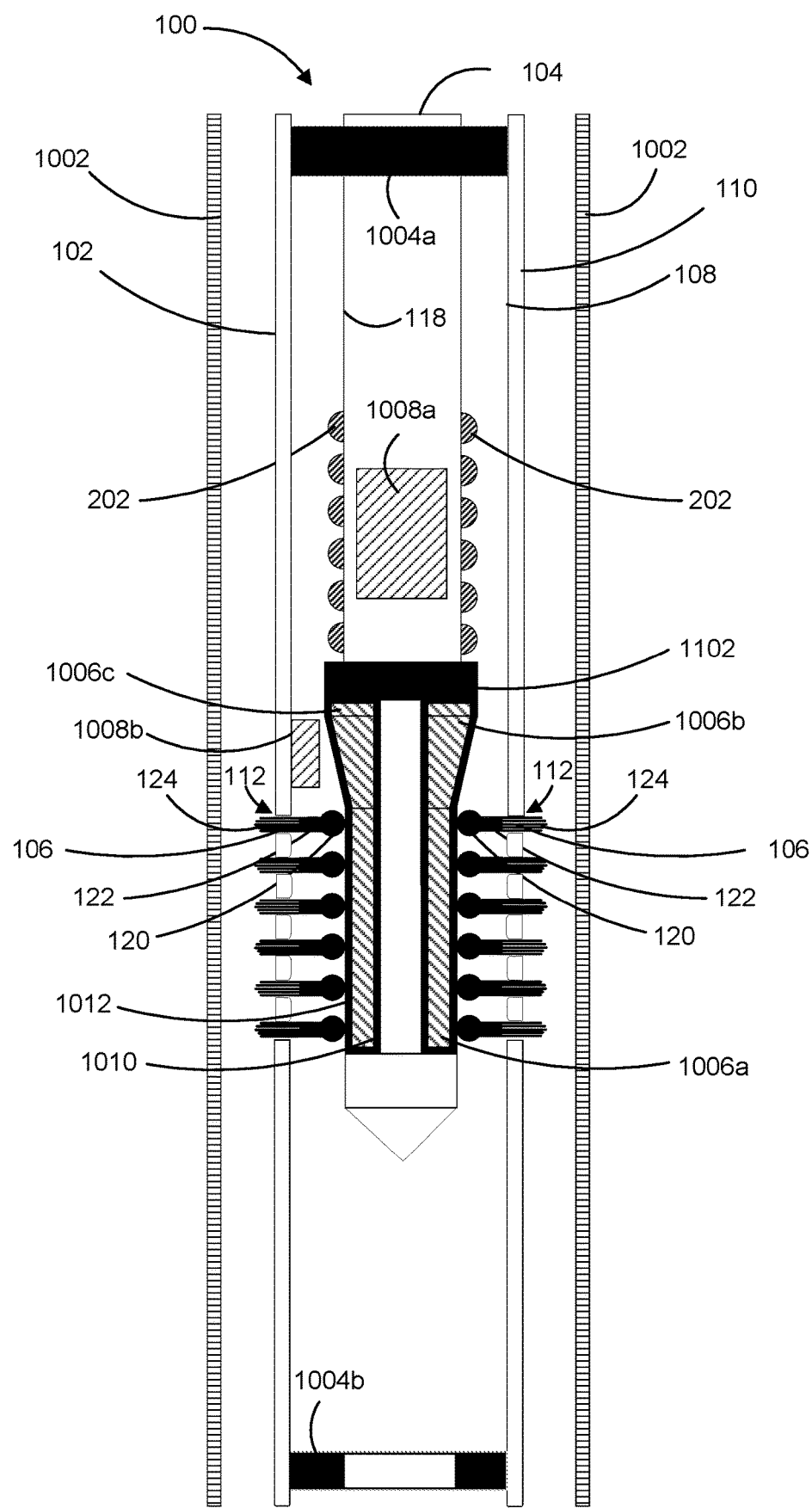
FIG. 10 illustrates a cross-sectional side view of a brush having face and a head in a sheathed configuration.

FIG. 10 illustrates a cross-sectional side view of a brush assembly 100 having a face 102 and a head 104 having bulbs in a sheathed configuration. The brush assembly 100 may be cylindrical. The brush assembly 100 may be disposed within a tubular 1002. In some cases, the brush assembly 100 may be disposed downhole in wellbores, pipes, casing, and/or running tools. In some other cases, the brush assembly 100 may by disposed in waste drains, bath drains, kitchen drains, storm drains, or sewage drains. The brush assembly 100 may be coupled to one or more other assemblies and/or a tubular string extending from the earth's surface.

The brush assembly 100 may include a face 102, a head 104, one or more tufts 106, and a motors 1008a, 1008b. The face 102 may be cylindrical. The head 104 may be cylindrical. The head 104 may be disposed in the face 102. The head 104 and the face 102 may be concentric. The head may have one or more knobs 202. The head 104 and the knobs 202 may be unitary.

A first ring 1004a may be disposed within the face 102. The first ring 1004a may be coupled to an inner surface of the face 102. The first ring 1004a may be slidably coupled to the head 104. The first ring 1004a may be disposed around the head.

The first ring 1004a may be configured to centralize the head 104 relative to the face 102. The first ring 1004a may have one or more grooves (not shown) shaped and sized to receive respective one or more ribs (not shown) disposed in an outer surface 118 of the head 104. Each rib may be abutted against an inner surface of the first ring 1004a defining the groove. Accordingly, the one or more ribs, in some cases, may inhibit rotation of the head 104 relative to the first ring 1004a and/or the face 102. Alternatively, an inner surface of the first ring 1004a may have one or more female socket surfaces (not shown). A portion of the outer surface 118 of the head 104 may have one or more male sockets surfaces (not shown). Portions of each of the one or more male socket surfaces may be abutted against portions of the one or more female socket surfaces. Accordingly, when portions of each respective male socket surface and female socket surface are abutted against each other, they would, in some cases, inhibit rotation of the head 104 relative to the first ring 1004a and/or the face 102.

The first ring 1004a may be configured to seal the head 104 and the face 102. Accordingly, in some cases, the first ring 1004a may inhibit fluid entry through the first ring 1004a. The first ring 1004a may include vibration dampening material, e.g., rubber, plastic, Teflon, silicone, or elastomer. Thus, the first ring 1004a may be capable of absorbing vibration transferred from the face 102 and/or the head 104.

The motor 1008a may be coupled to the head 104. The motor 1008a may be housed in the head 104. The motor 1008a may be capable of generating vibration. The vibration may be transferred from the motor 1008a to the head 104.

The motor 1008b may be coupled to the face 102. Moreover, the motor 1008b may be coupled to an inner surface 108 the face 102. The motor 1008b may be capable of generating vibration. The vibration may be transferred from the motor 1008a to the face 102.

The face 102 may have one or more apertures 112 disposed therethrough. A tuft 106 may extend through a respective aperture 112. Each tuft 106 may have a bulb 120, a base 122, and one or more bristles 124. A portion of each base 122 may be disposed in a corresponding aperture 112. Also, a portion of each bristle 124 may be disposed in a corresponding aperture 112.

Also, each bulb 120 a tuft 106 may include a portion constructed of ferromagnetic material (not shown). For example, each bulb 120 may have a ferromagnetic core covered by a non-ferromagnetic outer layer (not shown). The non-ferromagnetic outer layer may be an elastomer, Teflon, silicone, plastic, nylon, rubber, carbon fiber, ceramic, or metal. Each bulb 102 may be magnetically coupled to a magnet 1006a coupled to the head 104.

The magnet 1006a may be disposed circumferentially around the head 104. Padding 1010 may be disposed between the magnet 1006a and the head 104. The padding 1010 may include vibration dampening material, e.g., rubber, plastic, polytetrafluoroethylene (PTFE), Teflon, silicone, or elastomer. The padding 1010 may, in some cases, absorb and/or inhibit transfer of vibration from the head 104 to the magnet 1006a.

In addition, a sleeve 1012 may be coupled to an outer surface of the magnet 1006a. The sleeves 1012 may be constructed from various material, e.g., plastic, rubber, metal, ceramic, or carbon fiber. The sleeve 1012 may be configured to retain the magnets 1006a against the head 104. Furthermore, the sleeve 1012 may provide a barrier protecting the magnets.

Figure 11:
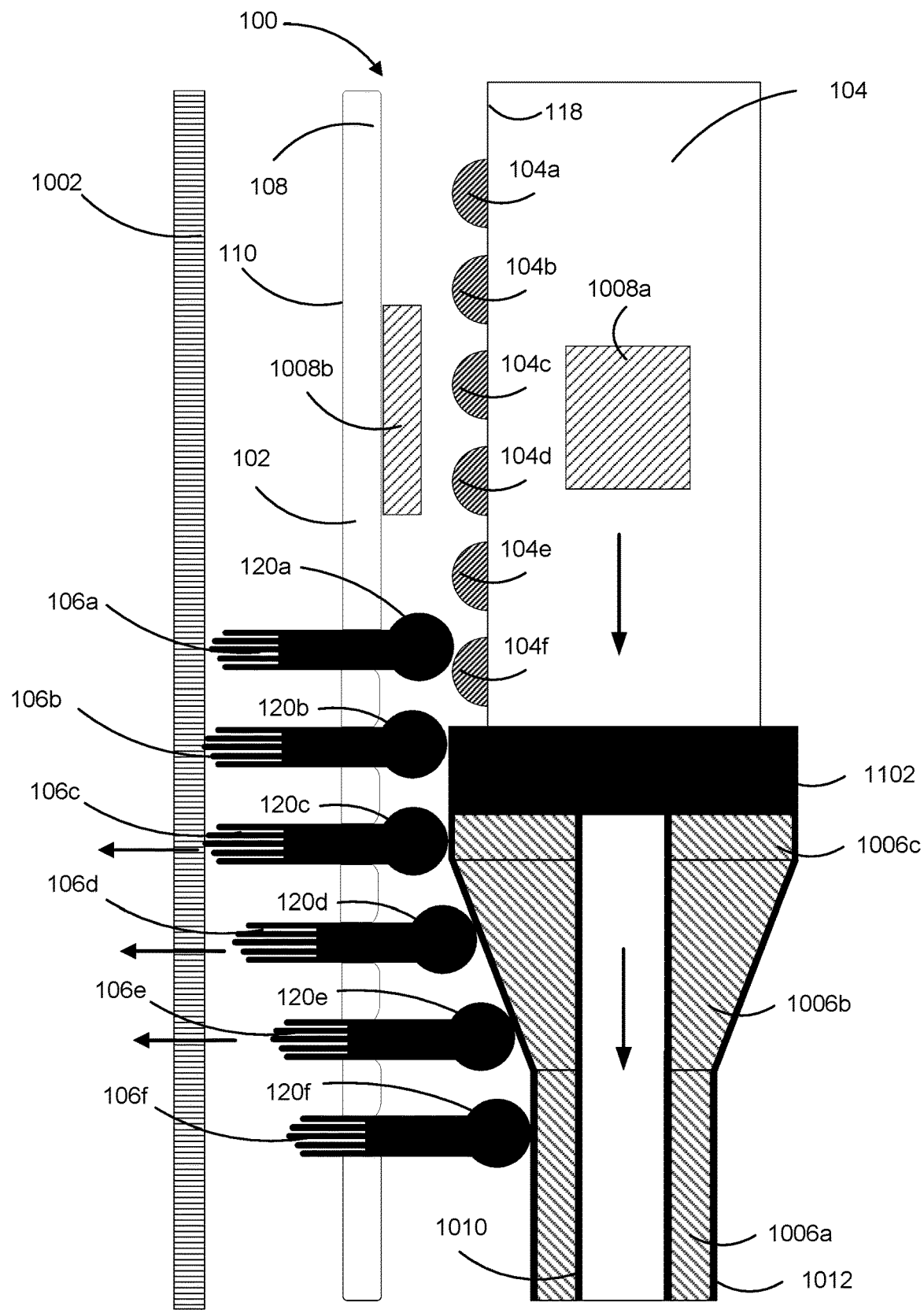
FIG. 11 illustrates a close-up of a cross-sectional side view of a brush assembly having a head having knobs being moved, e.g. slid and/or displaced, relative to a face.

FIG. 11 illustrates a close-up of a cross-sectional side view of a brush assembly 100 having a head 104 having knobs 202 being moved, e.g. slid and/or displaced, relative to a face 102. The brush assembly 100 may include the face 102, the head 104, and tufts 106a-f. The face 102 may be cylindrical. The face 102 may have an inner surface 108 and an outer surface 110. Additionally, the face 102 may have one or more apertures 112 extending through the inner surface 108 and the outer surface 110 (see FIG. 1A and FIG. 2A). A frustoconical portion 114 of the inner surface 108 may define each of the one or more apertures 112 (see FIG. 1A and FIG. 2A). The frustoconical portion 114 may have diameters that become progressively smaller from the inner surface 108 towards the outer surface 110.

The head 104 may be disposed in the face 102. The head 104 and the face 102 may be concentric. In addition, the head 104 may cylindrical. The head 104 may have an outer surface 118.

Tufts 106a-f may each have a portion extending through the respective apertures 112 of the face 102 (see FIG. 10). Each tuft 106 may include a bulb 120, a base 122, and one or more bristles 124 (see FIG. 1A and FIG. 2A). The bulb 120 may be spherical. The bulb 120 may be solid. Preferably, the bulb 120 may have an end that is a spherical cap. The bulb 120 may extend from a lower end of the base 122. The base 122 may be solid. The base 122 may extend through the face 102. The one or more bristles 124 may extend from an upper end of the base 122. The one or more bristles 124 may extend through a respective aperture 112 of the face 102. The bulb 120, the base 122, and the one or more bristles 124 may be unitary.

Also, each bulb 120 may include a portion constructed of ferromagnetic material (not shown). Thus, the bulbs 120a-f may be magnetically coupled to magnets 1006a-c coupled to the head 104. The magnets 1006a-c may be disposed circumferentially around the head 104. The first magnet 1006a may have an outer perimeter smaller than the perimeter of the third magnet 1006c. In addition, the second magnet 1006b may be tapered. The second magnet 1006b may have a lower end having a lower perimeter equal to the perimeter of the first magnet 1006a. The second magnet 1006b may have an upper end having an upper perimeter equal to the perimeter of the third magnet 1006c.

Padding 1010 may be disposed between the magnets 1006a-c and the head 104. The padding 1010 may include vibration dampening material, e.g., rubber, plastic, polytetrafluoroethylene (PTFE), Teflon, silicone, or elastomer. The padding 1010 may, in some cases, absorb and/or inhibit transfer of vibration from the head 104 to the magnets 1006a-c.

One or more sleeves 1012 may be coupled to outer surfaces of the magnets 1006a-c. The one or more sleeves 1012 may be constructed from various material, e.g., plastic, rubber, elastomer, metal, ceramic, or carbon fiber. The one or more sleeves 1012 may be configured to retain the magnets 1006a-c against the head 104. Furthermore, the one or more sleeves 1012 may provide a barrier protecting the magnets 1006a-c.

When the head 104 is moved downward relative to the face 102, e.g., towards a cleaning configuration, the magnets 1006a-c would be slid along the bulbs 120a-f of the respective tufts 106a-f. The bulbs 120a-f may include ferromagnetic material so they may be attracted to the magnets 1006a-c. Therefore, the bulbs 120a-f may be slidably coupled to the magnets 1006a-c.

As shown FIG. 11, the magnet 1006a may be slidably coupled to the bulb 120f. The tapered second magnet 1006b may be slidably coupled to the bulbs 120e, 120d. The third magnet 1006c may be slidably coupled to the bulb 120c.

The bulb 120b may be adjacent a non-ferromagnetic spacer 1102 of the head 104. The non-ferromagnetic spacer 1102 may be disposed between the magnet 1006c and the knob 202f of the head 104.

It should be understood that the orientation of the head 104 may be reversed relative to the face 102. In other words, the magnets 1006a-c may be positioned above the knobs 202a-f. Accordingly, the reversed head 104 may be slid in an upward direction, e.g., towards a cleaning configuration, to align the bulbs 120a-f with the knobs 202a-f, respectively.

Figure 12:
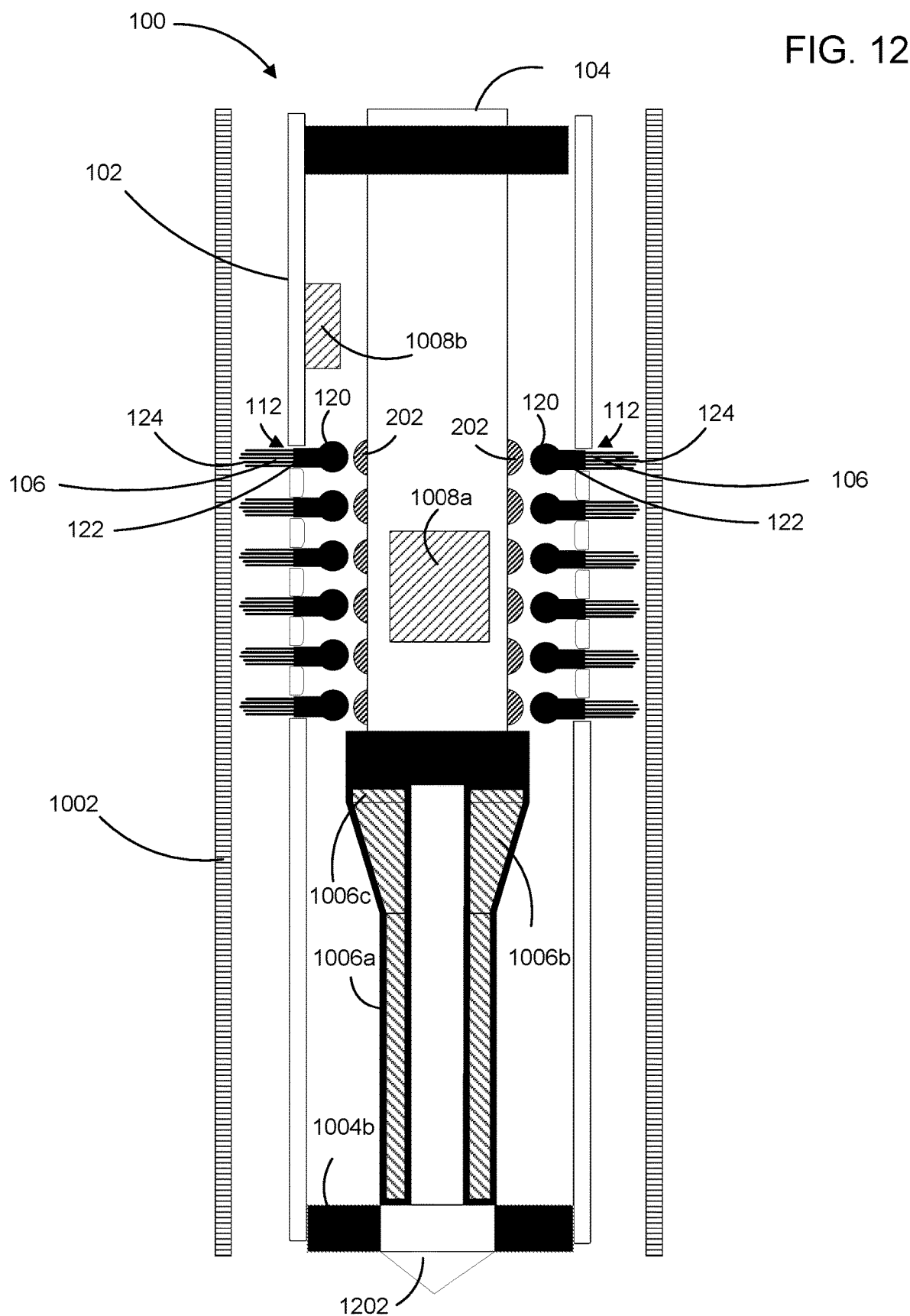
FIG. 12 illustrates a cross-sectional side view of a brush assembly having a face and a head having one or more knobs in a cleaning configuration.

FIG. 12 illustrates a cross-sectional side view of a brush assembly 100 having a face 102 and a head 104 having one or more knobs 202 in a cleaning configuration. The brush assembly 100 may include a face 102, a head 104, one or more tufts 106, and motors 1008a, 1008b. The face 102 may be cylindrical. The head 104 may be cylindrical. The head 104 may be disposed in the face 102. The head 104 and the face 102 may be concentric.

A first ring 1004a may be disposed within the face 102. The first ring 1004a may be coupled to an inner surface of the face 102. The first ring 1004a may be slidably coupled to the head 104. The first ring 1004a may be disposed around the head.

The first ring 1004a may be configured to centralize the head 104 relative to the face 102. The first ring 1004a may have one or more grooves (not shown) shaped and sized to receive respective one or more ribs (not shown) disposed in an outer surface 118 of the head 104. Each rib may be abutted against an inner surface of the first ring 1004a defining the groove. Accordingly, the one or more ribs, in some cases, may inhibit rotation of the head 104 relative to the first ring 1004a and/or the face 102. Alternatively, an inner surface of the first ring 1004a may have one or more female socket surfaces (not shown). A portion of the outer surface 118 of the head 104 may have one or more male sockets surfaces (not shown). Portions of each of the one or more male socket surfaces may be abutted against portions of the one or more female socket surfaces. Accordingly, when portions of each respective male socket surface and female socket surface are abutted against each other, they would, in some cases, inhibit rotation of the head 104 relative to the first ring 1004a and/or the face 102.

The first ring 1004a may be configured to seal the head 104 and the face 102. Accordingly, in some cases, the first ring 1004a may inhibit fluid entry through the first ring 1004a. The first ring 1004a may include vibration dampening material, e.g., rubber, plastic, Teflon, silicone, or elastomer. Thus, the first ring 1004a may be capable of absorbing vibration transferred from the face 102 and/or the head 104.

The motor 1008a may be coupled to the head 104. The motor 1008a may be housed in the head 104. The motor 1008a may be capable of generating vibration. The vibration may be transferred from the motor 1008a to the head 104.

The motor 1008b may be coupled to the face 102. Moreover, the motor 1008b may be coupled to an inner surface 108 the face 102. The motor 1008b may be capable of generating vibration. The vibration may be transferred from the motor 1008a to the face 102.

The face 102 may have one or more apertures 112 disposed therethrough. The one or more tufts 106 may extend through the respective one or more apertures 112. The one or more tufts 106 may respectively be aligned with the one or more knobs 202. Moreover, the central axis of each knob 202 may be aligned with the central axis of a corresponding tuft 106.

Each knob 202 may extend, e.g., protrude, from an outer surface 118 of the head 104. Each knob 202 may be a spherical cap, e.g., dome. Each knob 202 and the head 104 may be unitary.

Additionally, a second ring 1004b may be disposed in the face 102. The second ring 1004b may have an outer surface coupled to an inner surface of the face 102. In the cleaning configuration, an end 1202 of the head 104 may extend through the second ring 1004b. The second ring 1004b may have an inner surface coupled to an outer surface of the head 104. The second ring 1004b may include vibration dampening material, e.g., rubber, plastic, polytetrafluoroethylene (PTFE), Teflon, silicone, or elastomer. Thus, the second ring 1004b may be capable of absorbing vibration transferred from the face 102 and/or the head 104.

It should be understood that in some versions the orientation of the head 104 may be reversed relative to the face 102. In other words, the magnets 1006a-c may be positioned above the knobs 202a-f. Accordingly, the head 104 may be slid in an upward direction to align the bulbs 120a-f with the outer surface 118 of the head 104.

Figure 13:
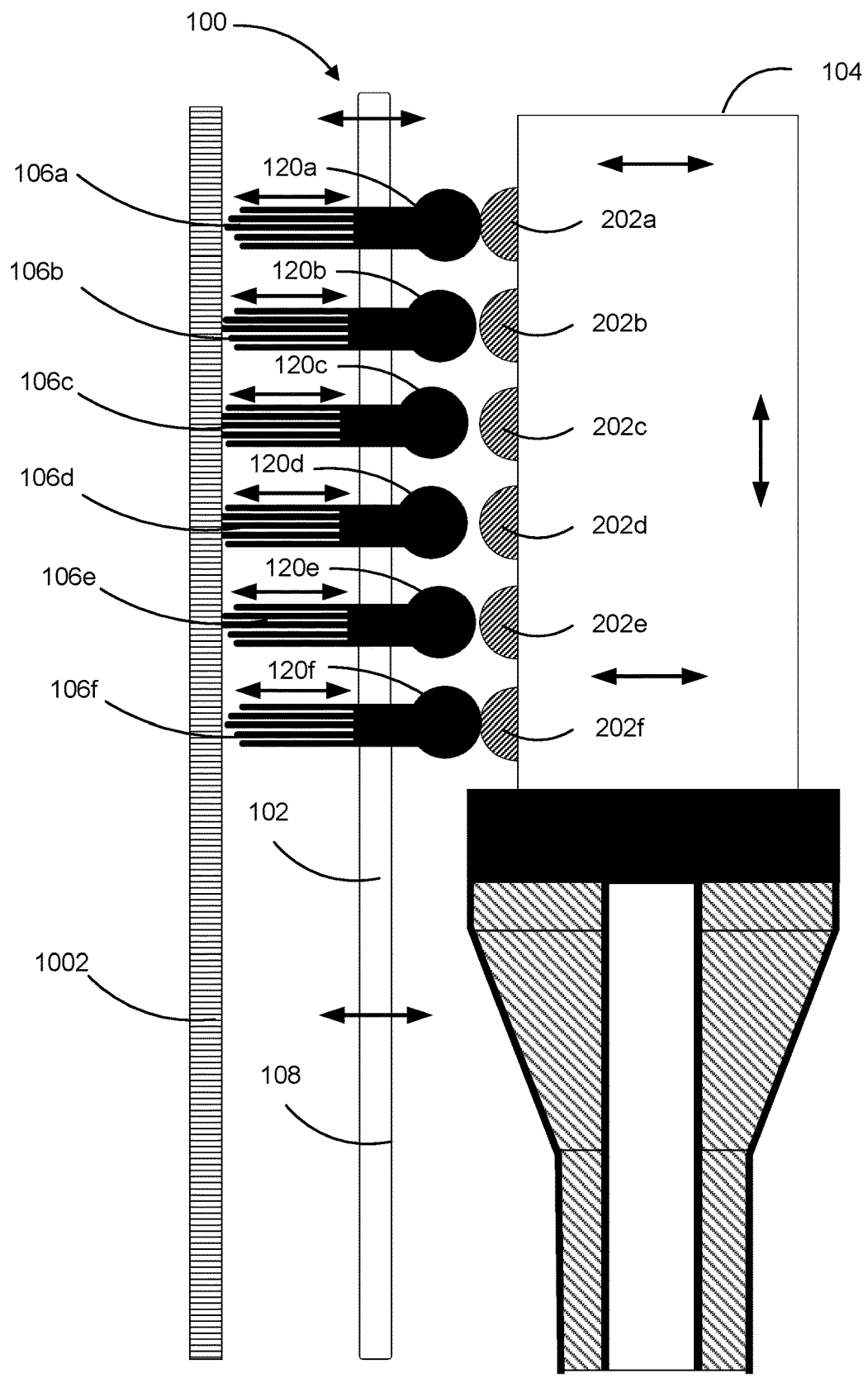
FIG. 13 illustrates a close-up of a cross-sectional side view of a brush assembly having a head, having knobs, being vibrated.

FIG. 13 illustrates a close-up of a cross-sectional side view of a brush assembly 100 having a head 102, having knobs 202, being vibrated (as shown by arrows). The brush assembly 100 may be vibrated to clean a tubular structure 1002, e.g., tubular string, pipe, borehole wall, drain, or sewage line.

The brush assembly 100 may include a face 102, a head 104, one or more tufts 106, and one or more motors (not shown). The face 102 may be cylindrical. The head 104 may be cylindrical. The head 104 may be disposed in the face 102. The head 104 and the face 102 may be concentric. Although not shown, it should be understood that the one or more motors may transfer vibration to the face 102 and/or the head 104.

Apertures 112 (see FIG. 1A and FIG. 2A) may extend through the face 102. Tufts 106a-f may extend through the respective apertures 112. Each tuft 106 may have a bulb 120. The bulb 120 may be abutted against the inner surface 108 of the face 102. For example, the tufts 106c, 106d may have bulbs 120c, 120d abutted against the inner surface 108 of the face 102. Also, each bulb 120 may be capable of being abutted against a corresponding knob 202 of the head 104. For example, the tufts 106a, 106f may have bulbs 120a, 120f abutted against corresponding knobs 202a, 202f.

The head 104 may have knobs 202a-f disposed adjacent the tuft 106a-f, respectively. Vibration transferred, e.g., via the motor 1008a, to the head 104 may cause the head 104 to vibrate, e.g., move side-to-side and/or forward-and-backward. Accordingly, the knobs 202a-f of the head 104 may vibrate as well. Vibration on the head 104 may cause the knobs 202a-f to move toward the tuft 106a-f, respectively. Vibration on the head 104 may cause each knob 202 to be abutted against a bulb 120 of a respective tuft 106. For example, the knobs 202a, 202f may be abutted against the bulbs 120a, 120f. Each knob 202 may push a respective bulb 102 via direct physical contact.

In some cases, a medium, e.g., fluid and/or a solid object may be disposed between each knob 202 and a corresponding tuft 106. The vibration on the head 104 may cause each knob 202 to be abutted against the medium. The medium in turn may be abutted against a bulb 120 of a respective tuft 106. Thus, each knob 202 may also push a respective tuft 106 via a medium.

Accordingly, in any case, when a tuft 106 is pushed, a base 122 and one or more bristles 124 of the tuft 106 would be displaced and/or slid through a respective aperture 112 of the face 102. Moreover, ends of the one or more bristles 124 would be displaced, e.g., moved away, from the face 102. The ends of the one or more bristles 124 may be moved towards a surface of the tubular structure 1002. The ends of the one or more bristles 124 may be abutted against the surface of the tubular structure 1002. The ends of the one or more bristles 124 may be physically touch the surface of the tubular structure 1002. Accordingly, the pushed ends of the one or more bristles 124 may be abutted against contaminants, e.g., plaque, germ, debris, on the tubular structure 1002. The pushed ends of the one or more bristles 124 may cause the contaminants to dislodge from the tubular structure 1002.

Moreover, vibration transferred, e.g., via a motor, to the face 102 may cause the face 102 to vibrate, e.g., move side-to-side and/or forward-and-backward. Vibration on the face 102 may cause one or more surfaces of the face 102 to be abutted against the tufts 106a-f. The one or more surfaces of the vibrating face 102 may transfer vibration from the face to the tufts 106a-f. Vibration on each tuft 106 may cause their one or more bristles 124 to be swept across the surface of the tubular structure 1002. The pushed ends of the one or more vibrating bristles 124 may cause the contaminants to dislodge from the tubular structure 1002.

Figure 14:
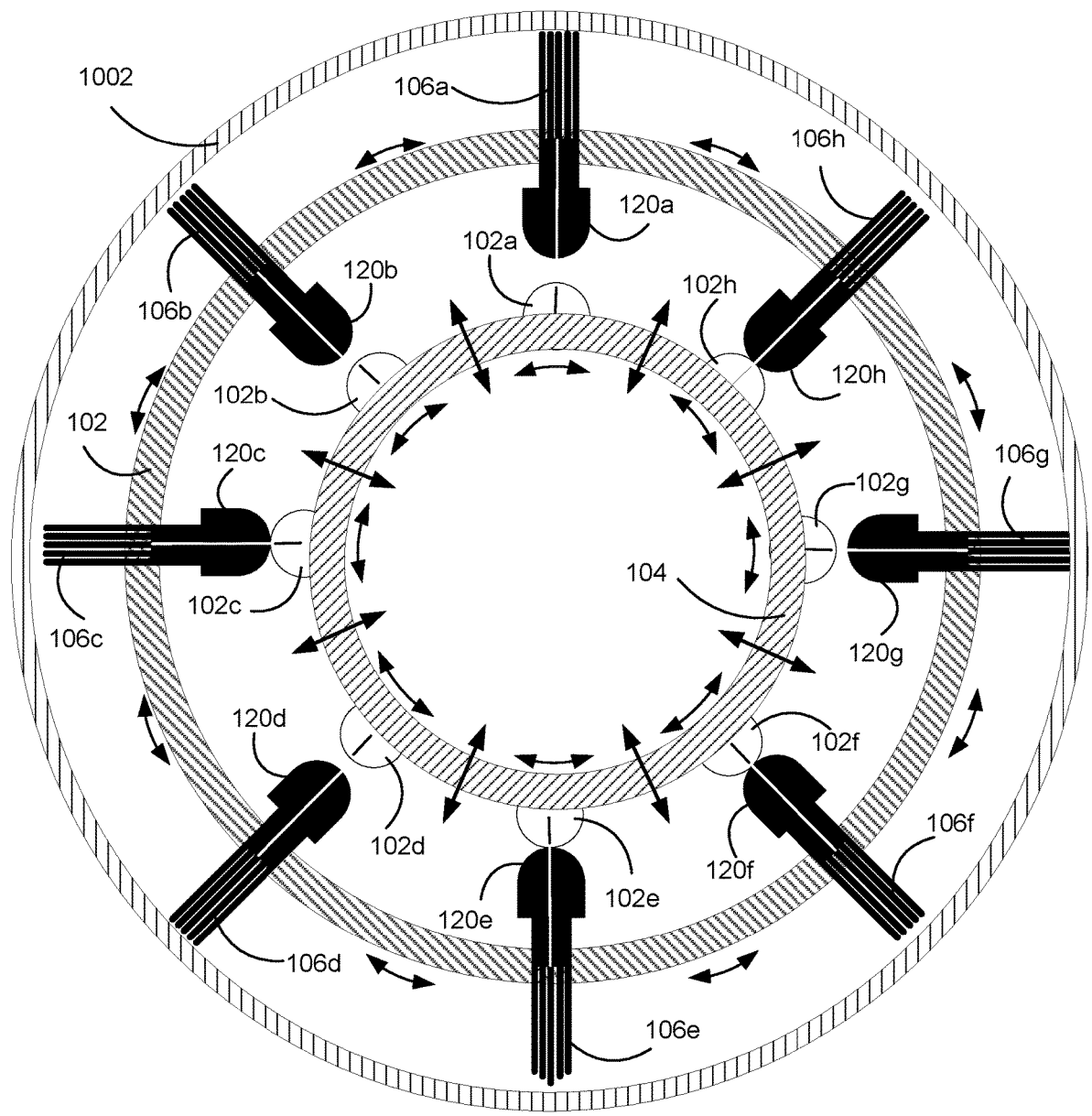
FIG. 14 illustrates a cross-sectional top view of a brush assembly having a head, having knobs, being vibrated.

FIG. 14 illustrates a cross-sectional top view of a brush assembly 100 having a head 104, having knobs 202, being vibrated (as shown by arrows). The brush assembly 100 may be vibrated to clean a tubular structure 1002, e.g., tubular string, pipe, borehole wall, drain, or sewage line.

The brush assembly 100 may include a face 102, a head 104, one or more tufts 106, and one or more motors (not shown). The face 102 may be cylindrical. The head 104 may be cylindrical. The head 104 may be disposed in the face 102. The head 104 and the face 102 may be concentric. Although not shown, it should be understood that the one or more motors may transfer vibration to the face 102 and/or the head 104.

Apertures 112 (see FIG. 1A and FIG. 2A) may extend through the face 102. Tufts 106a-h may extend through the respective apertures 112. Each tuft 106 may have a bulb 120 disposed between an inner surface 108 of the face 102 and an outer surface of the head 104.

The head 104 may have knobs 202a-h disposed adjacent bulbs 120a-h of the tuft 106a-h, respectively. Each knob 202 and each respective bulb 120 may be separated by a distance of as little as 1.0 millimeter, 2.0 millimeters, 3.0 millimeters, 4.0 millimeters, 5.0 millimeters, 7.0 millimeters, 8.0 millimeters or as far as 1.0 centimeter, 1.5 centimeter, 2.0 centimeters, or farther.

Vibration transferred, e.g., via the motor 1008a, to the head 104 may cause the head 104 to vibrate, e.g., move side-to-side and/or forward-and-backward. Accordingly, the knobs 202a-f of the head 104 may vibrate as well. Vibration on the head 104 may cause the knobs 202a-f to move toward the tuft 106a-h, respectively. Vibration on the head 104 may cause each knob 202 to be abutted against a bulb 120 of a respective tuft 106. For example, the knobs 202c, 202e, 202h may be abutted against the bulbs 120c, 120e, 120h. Each knob 202 may push a respective bulb 102 via direct physical contact.

In some cases, a medium, e.g., fluid and/or a solid object may be disposed between each knob 202 and a corresponding tuft 106. The vibration on the head 104 may cause each knob 202 to be abutted against the medium. The medium in turn may be abutted against a bulb 120 of a respective tuft 106. Thus, each knob 202 may also push a respective tuft 106 via a medium.

Accordingly, in any case, when a tuft 106 is pushed, a base 122 and one or more bristles 124 of the tuft 106 would be displaced and/or slid through a respective aperture 112 of the face 102. Moreover, ends of the one or more bristles 124 would be displaced, e.g., moved away, from the face 102. The ends of the one or more bristles 124 may be moved towards a surface of the tubular structure 1002. The ends of the one or more bristles 124 may be abutted against the surface of the tubular structure 1002. The ends of the one or more bristles 124 may be physically touch the surface of the tubular structure 1002. Accordingly, the pushed ends of the one or more bristles 124 may be abutted against contaminants, e.g., plaque, germ, debris, on the tubular structure 1002. The pushed ends of the one or more bristles 124 may cause the contaminants to dislodge from the tubular structure 1002.

Moreover, vibration transferred, e.g., via a motor, to the face 102 may cause the face 102 to vibrate, e.g., move side-to-side and/or forward-and-backward. Vibration on the face 102 may cause one or more surfaces of the face 102 to be abutted against the tufts 106a-h. The one or more surfaces of the vibrating face 102 may transfer vibration from the face to the tufts 106a-h. Vibration on each tuft 106 may cause their one or more bristles 124 to be swept across the surface of the tubular structure 1002. The pushed ends of the one or more vibrating bristles 124 may cause the contaminants to dislodge from the tubular structure 1002.

Figure 15:
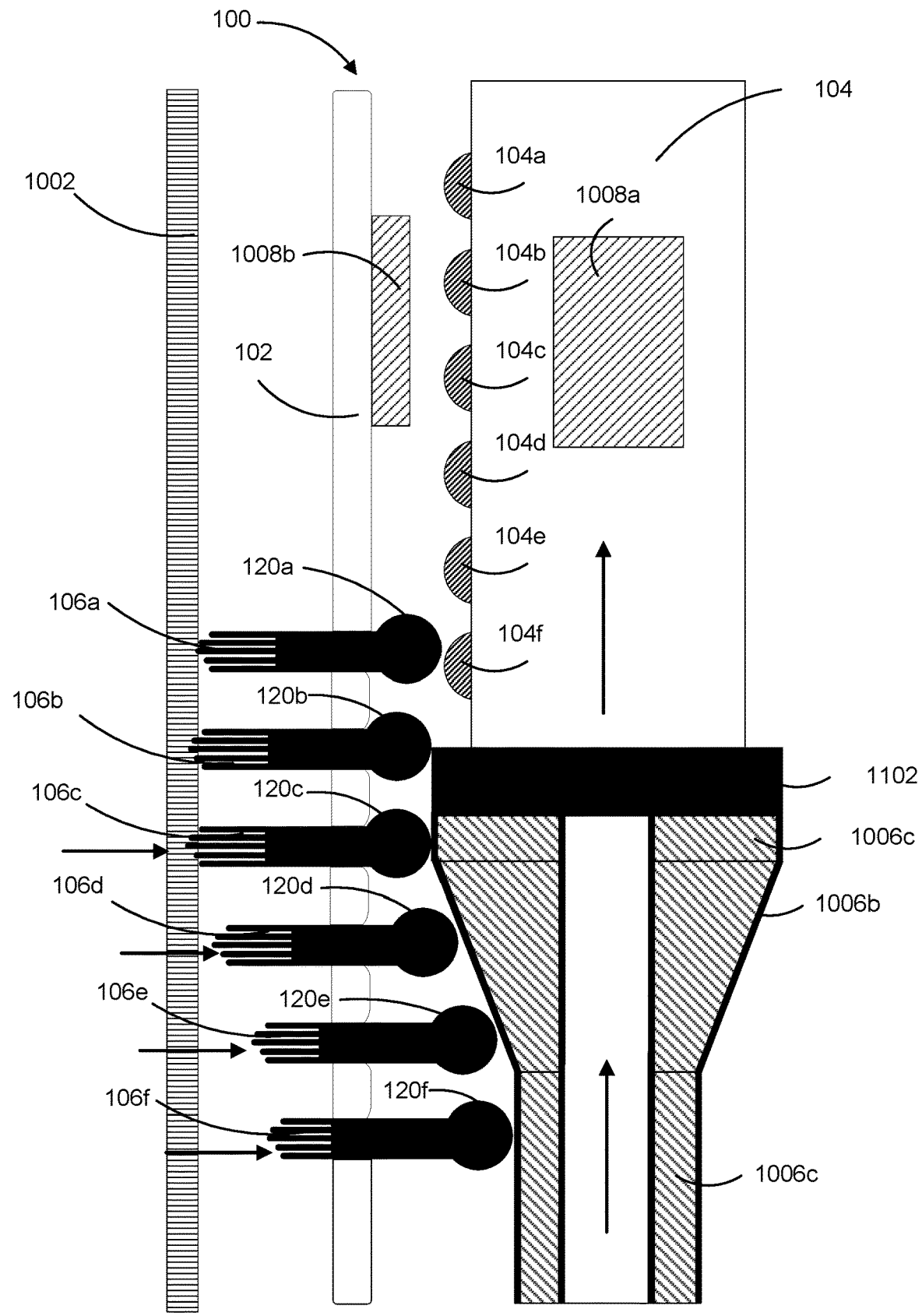
FIG. 15 illustrates a cross-sectional side view of a brush assembly having a head having one or more bulbs being moved, e.g. slid and/or displaced, relative to a face towards a sheathed position.

FIG. 15 illustrates a cross-sectional side view of a brush assembly 100 having a head 104 having one or more bulbs 120 being moved, e.g. slid and/or displaced, relative to a face 102 towards a sheathed position. The head 104 may be moved laterally to tufts 106a-f.

The head 104 may be disposed in the face 102. The head 104 and the face 102 may be concentric. In addition, the head 104 may cylindrical. The head 104 may have an outer surface 118.

Tufts 106a-f may each have a portion extending through the respective apertures 112 of the face 102 (see FIG. 10). Each tuft 106 may include a bulb 120, a base 122, and one or more bristles 124 (see FIG. 1A and FIG. 2A). The bulb 120 may be spherical. The bulb 120 may be solid. Preferably, the bulb 120 may have an end that is a spherical cap. The bulb 120 may extend from a lower end of the base 122. The base 122 may be solid. The base 122 may extend through the face 102. The one or more bristles 124 may extend from an upper end of the base 122. The one or more bristles 124 may extend through a respective aperture 112 of the face 102. The bulb 120, the base 122, and the one or more bristles 124 may be unitary.

Also, each bulb 120 may include a portion constructed of ferromagnetic material (not shown). Thus, the bulbs 120a-f may be magnetically coupled to magnets 1006a-c coupled to the head 104. The magnets 1006a-c may be disposed circumferentially around the head 104. The first magnet 1006a may have an outer perimeter smaller than the perimeter of the third magnet 1006c. In addition, the second magnet 1006b may be tapered. The second magnet 1006b may have a lower end having a lower perimeter equal to the perimeter of the first magnet 1006a. The second magnet 1006b may have an upper end having an upper perimeter equal to the perimeter of the third magnet 1006c.

Padding 1010 may be disposed between the magnets 1006a-c and the head 104. The padding 1010 may include vibration dampening material, e.g., rubber, plastic, polytetrafluoroethylene (PTFE), Teflon, silicone, or elastomer. The padding 1010 may, in some cases, absorb and/or inhibit transfer of vibration from the head 104 to the magnets 1006a-c.

One or more sleeves 1012 may be coupled to outer surfaces of the magnets 1006a-c. The one or more sleeves 1012 may be constructed from various material, e.g., plastic, rubber, elastomer, metal, ceramic, or carbon fiber. The one or more sleeves 1012 may be configured to retain the magnets 1006a-c against the head 104. Furthermore, the one or more sleeves 1012 may provide a barrier protecting the magnets 1006a-c.

When the head 104 is moved upward relative to the face 102, e.g., towards a sheathed configuration, the magnets 1006a-c would be slid along the bulbs 120a-f of the respective tufts 106a-f. The bulbs 120a-f may include ferromagnetic material so they may be attracted to the magnets 1006a-c. Therefore, the bulbs 120a-f may be slidably coupled to the magnets 1006a-c.

As shown FIG. 15, the first magnet 1006a may be slidably coupled to the bulb 120f. The tapered second magnet 1006b may be slidably coupled to the bulbs 120e, 120d. The third magnet 1006c may be slidably coupled to the bulb 120c.

The bulb 120b may be adjacent a non-ferromagnetic spacer 1102 of the head 104. The non-ferromagnetic spacer 1102 may be disposed between the third magnet 1006c and the knob 202f of the head 104. It should be understood that the orientation of the head 104 may be reversed relative to the face 102. In other words, the magnets 1006a-c may be positioned above the knobs 202a-f. Accordingly, the reversed head 104 may be slid in an upward direction, e.g., towards a sheathed configuration, to slidably couple the bulbs 120a-f with the magnets 1006a-b respectively.

Referring the FIG. 1A-9, a person may operate a brush assembly 100 as follow to clean one or more surfaces, e.g., of teeth, skin, kitchen counters, sink counters, toilets, shoes or any other surface capable of being scrubbed. First, the person may couple a face 102 to a head 104 (FIG. 8A and FIG. 9). The head 104 may extend from a handle (not shown). The handle and the head 104 may be unitary. Next, the person may remove a tape 702 (FIG. 7) retaining tufts 106 against an inner surface 108 of the face 102. The tufts 106 may now be freely slid through the face 102.

The person may then position and/or press the tufts 106 against his or her teeth. Depending on the contour of the person's teeth, surfaces of some teeth may push against some tufts 106. Moreover, the teeth may be abutted against tips, e.g., ends, of bristles 124 of the tufts 106. Accordingly, the pushed tufts 106 may be pushed towards a corresponding knob 202. The knob 202 may extend from the head 104.

Next, the person may turn on a motor 1008 in the handle of the brush assembly 100. The motor 1008 may transfer vibration to the drive shaft to the head 104. The vibration in the head 102 may cause the knobs 202 of the head 102 to vibrate, e.g., move back and forth. The vibrating knobs 202 may be abutted against the tufts 106. The vibrating knobs 202 may push those tufts 106. Those pushed tufts 106 may be displaced away from the knob 202. In some cases, the knobs 202 may push fluid, e.g., saliva, toothpaste, soap, and/or water, disposed between the knobs 202 and the tufts 106. Correspondingly, the pushed fluid may push the tufts 106.

Those tufts 106 pushed by the knobs 202 may be pushed against the person's teeth. Moreover, the end of the bristles 124 of those tufts 106 may be abutted against contaminants, e.g., plaque, germs, debris, stuck on the teeth. The tips of the pushed bristles 124 may cause the contaminants to dislodge from the teeth.

Additionally, the vibration from the head 104 may be transferred to sidewalls 302 of the face 102. The face 102 may transfer the vibration to the tufts 106. Bristles 124 of the tufts 106 may be vibrated to sweep the contaminants away from the person's teeth.

Referring the FIG. 10-15, a person may operate a brush assembly 100 having a head 104 having knobs 120 as follow. The brush assembly may be used to clean one or more inner surfaces of a tubular structure 1002, e.g., tubular string, pipe, borehole wall, drain, or sewage line.

Referring the FIG. 10, an operator may first deploy a brush assembly 100 into a tubular structure 1002. The operator may deploy the brush assembly 100 via wireline, coiled tubing, slickline, running tool, and/or thru-tubing equipment. The operator may position the brush assembly 100 at a site on the tubular structure 1002 to be cleaned. The brush assembly 100 may be positioned the tubular structure 1002 by being suspended on a wire or landed on a landing seat (not shown) or a ring coupled to the tubular structure.

Referring to FIG. 11, the operator may cause a head 104 to be moved, e.g. slid and/or displaced, relative to tufts 106*a-f*. The head 104 may be moved via a motor (not shown) or fluid pressure. Preferably, the head 104 may be moved until knobs 202*a-f* of the head 104 is aligned with tufts 106*a-f*, respectively. Alternatively, the head 104 may be moved until an outer surface 118 of the head 104 is aligned with tufts 106*a-f*.

Next, referring to FIG. 12, the operator may actuate one or more motors 1008 to generate vibration. The one or more motors 1008 may be coupled to the face 102. Also, the one or more motors 1008 may be coupled to the head 104. Accordingly, vibration from the one or more motors 1008 may be transferred to the face 102 and/or head 104.

Referring to FIG. 13 and FIG. 14, vibration on the head 104 may cause the head 104 and/or a portion of the head 104 to vibrate, e.g., move side-to-side, and/or forward-and-backward. Vibration on the face 102 may cause the face 102 and/or a portion of the face 104 to vibrate, e.g., move side-to-side, and/or forward-and-backward. Also, vibration on the face 102 may cause bristles 124 of the tufts 106*a-f* to vibrate, e.g., move side-to-side and/or forward-and-backward.

Vibration on the head 104 may cause the knobs 202*a-f* to be moved, e.g., laterally and/or longitudinally. Each knob 202 may be moved, e.g., laterally and/or longitudinally, towards its corresponding tuft 106 (see FIG. 2A). The vibration of the head 104 may cause each knob 202 to be abutted against its corresponding tuft 106.

In some cases, when abutted against a tuft 106, a knob 202 may push the tuft 106 away from the head 104. Accordingly, the pushed tuft 106 would be displaced and/or slid through a corresponding aperture 112 of the face 102. Moreover, bristles of the tuft 106 would be displaced, e.g., moved away, from face 102.

Furthermore, the vibration in the head 104 may cause the one or more knobs 202*a-h* of the head 104 to push a medium (not shown), e.g., fluid and/or solid object, towards corresponding tufts 106*a-h*. The pushed medium may push the one or more tufts 106*a-h* through a corresponding aperture 112 of the face 102.

Ends of the one or more bristles 124 of the pushed one or more tufts 106*a-h* may be pushed farther from the face 102 towards a surface of the tubular structure 1002. The pushed bristles 124 may be abutted against a surface of the tubular structure 1002.

Referring the FIG. 16-21, a person may operate a brush assembly 100 having a head 104 having an outer surface 118 as follow. The brush assembly may be used to clean one or more inner surfaces of a tubular structure 1002, e.g., pipe, borehole wall, drain, or sewage line.

Figure 16:
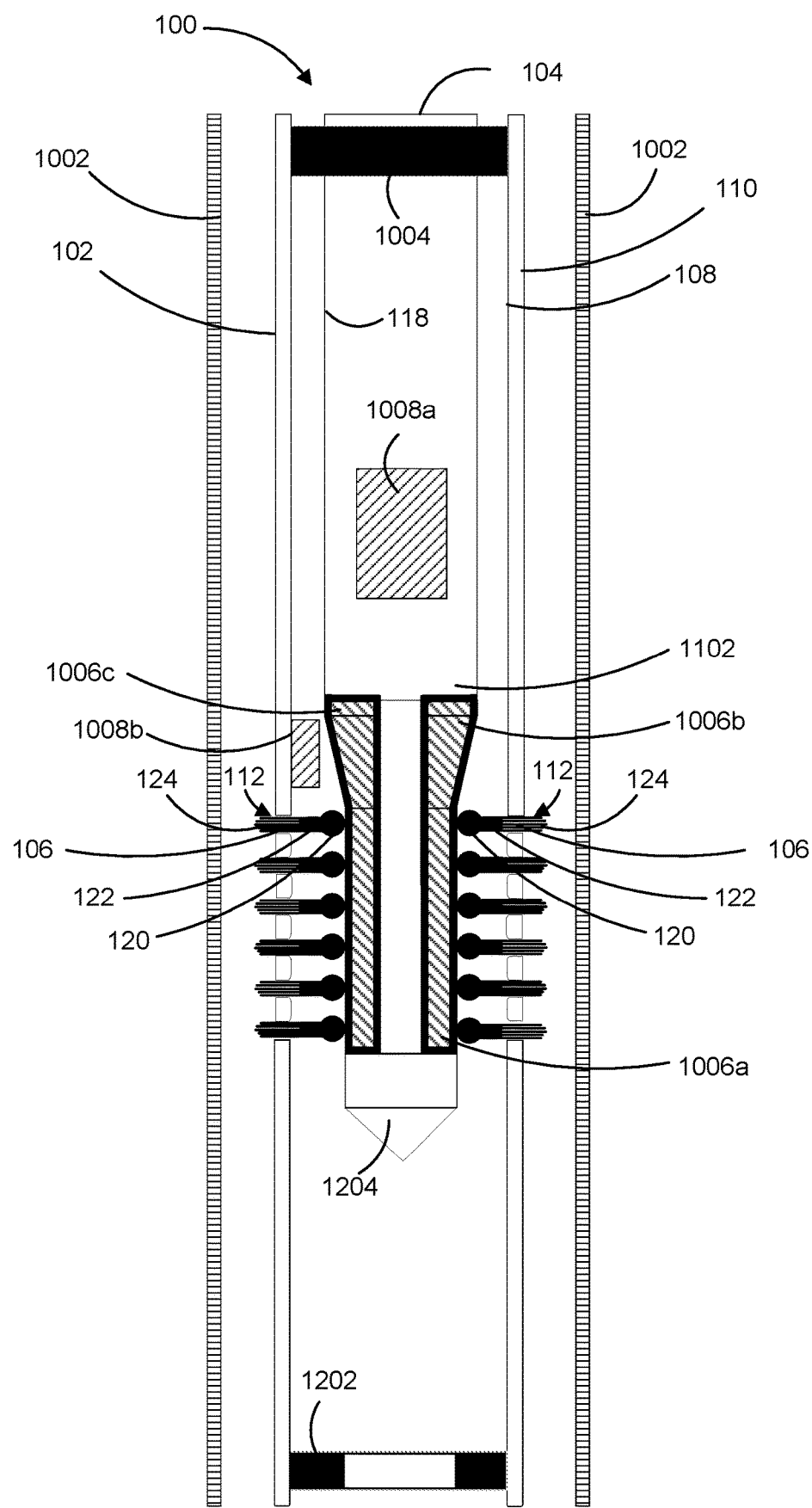
FIG. 16 illustrates a cross-sectional side view of a brush assembly having face and a head 104 a sheathed configuration.

Referring the FIG. 16, an operator may first deploy a brush assembly 100 into a tubular structure 1002. The operator may deploy the brush assembly 100 via wireline, coiled tubing, slickline, running tool, and/or thru-tubing equipment. The operator may position the brush assembly 100 at a site on the tubular structure 1002 to be cleaned. The brush assembly 100 may be positioned the tubular structure 1002 by being suspended on a wire or landed on a landing seat (not shown) or a ring coupled to the tubular structure.

Figure 17:
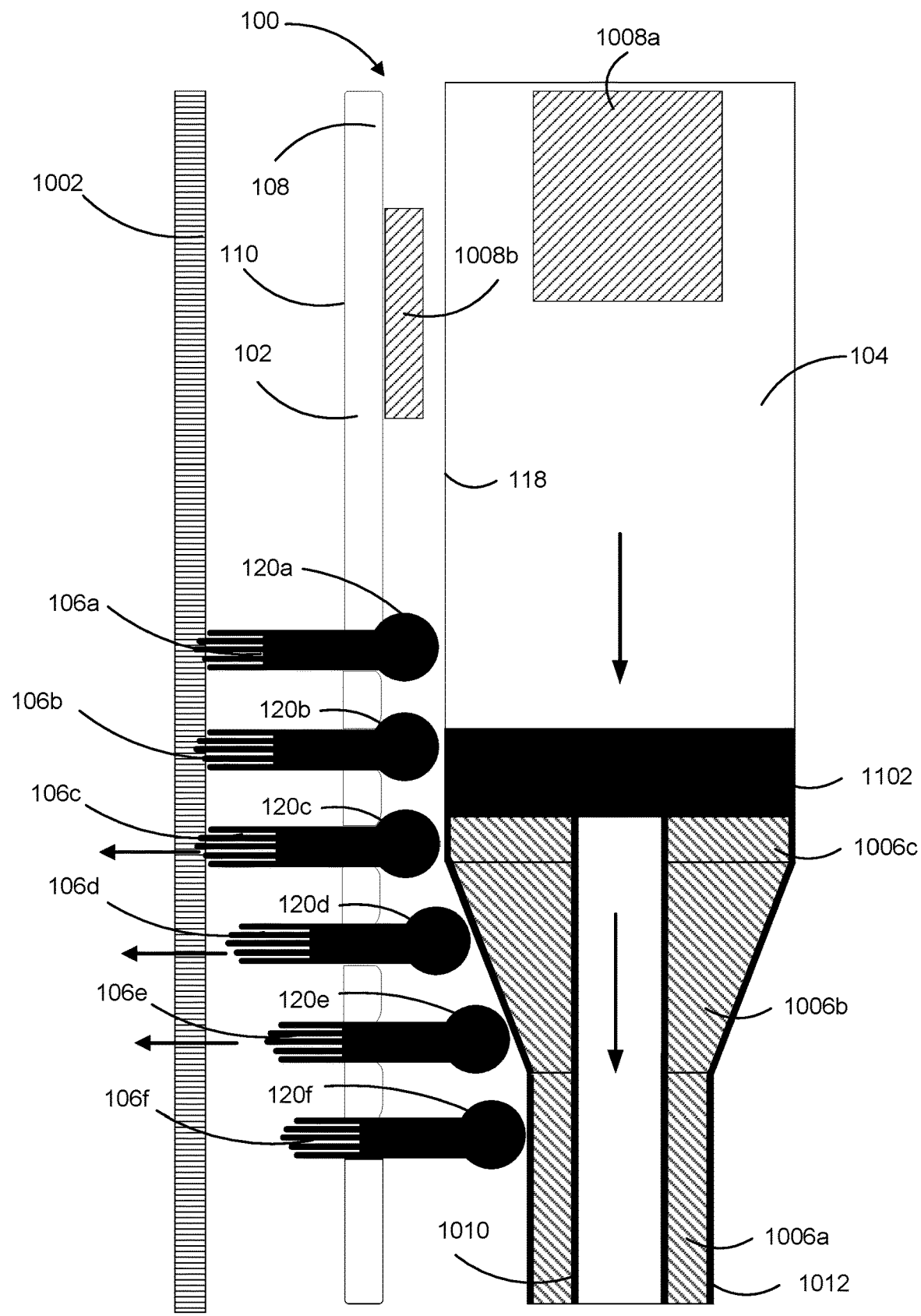
FIG. 17 illustrates a close-up of a cross-sectional side view of a brush assembly having a head having a surface being moved, e.g. slid and/or displaced, relative to a face.

Referring to FIG. 17, the operator may cause a head 104 to be moved, e.g. slid and/or displaced, relative to tufts 106*a-f*. The head 104 may be moved via a motor (not shown) or fluid pressure. Preferably, the head 104 may be moved until the outer surface 118 of the head 104 is aligned with tufts 106*a-f*, respectively. Alternatively, the head 104 may be moved until an outer surface 118 of the head 104 is aligned with tufts 106*a-f*.

Figure 18:
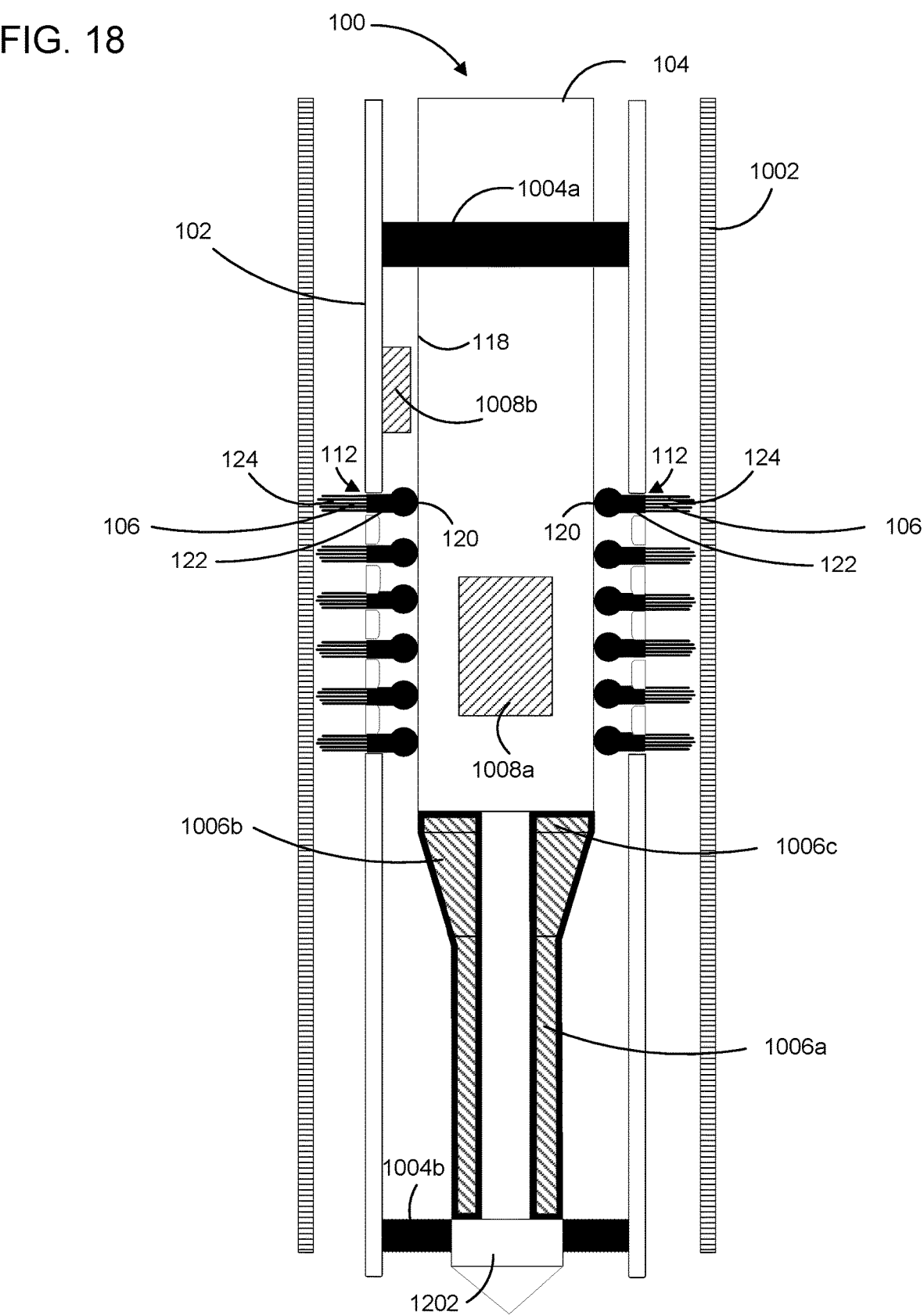
FIG. 18 illustrates a cross-sectional side view of a brush assembly having a face and a head having surface in a cleaning configuration.

Next, referring to FIG. 18, the operator may actuate one or more motors 1008 to generate vibration. The one or more motors 1008 may be coupled to the face 102. Also, the one or more motors 1008 may be coupled to the head 104. Accordingly, vibration from the one or more motors 1008 may be transferred to the face 102 and/or head 104.

Figure 19:
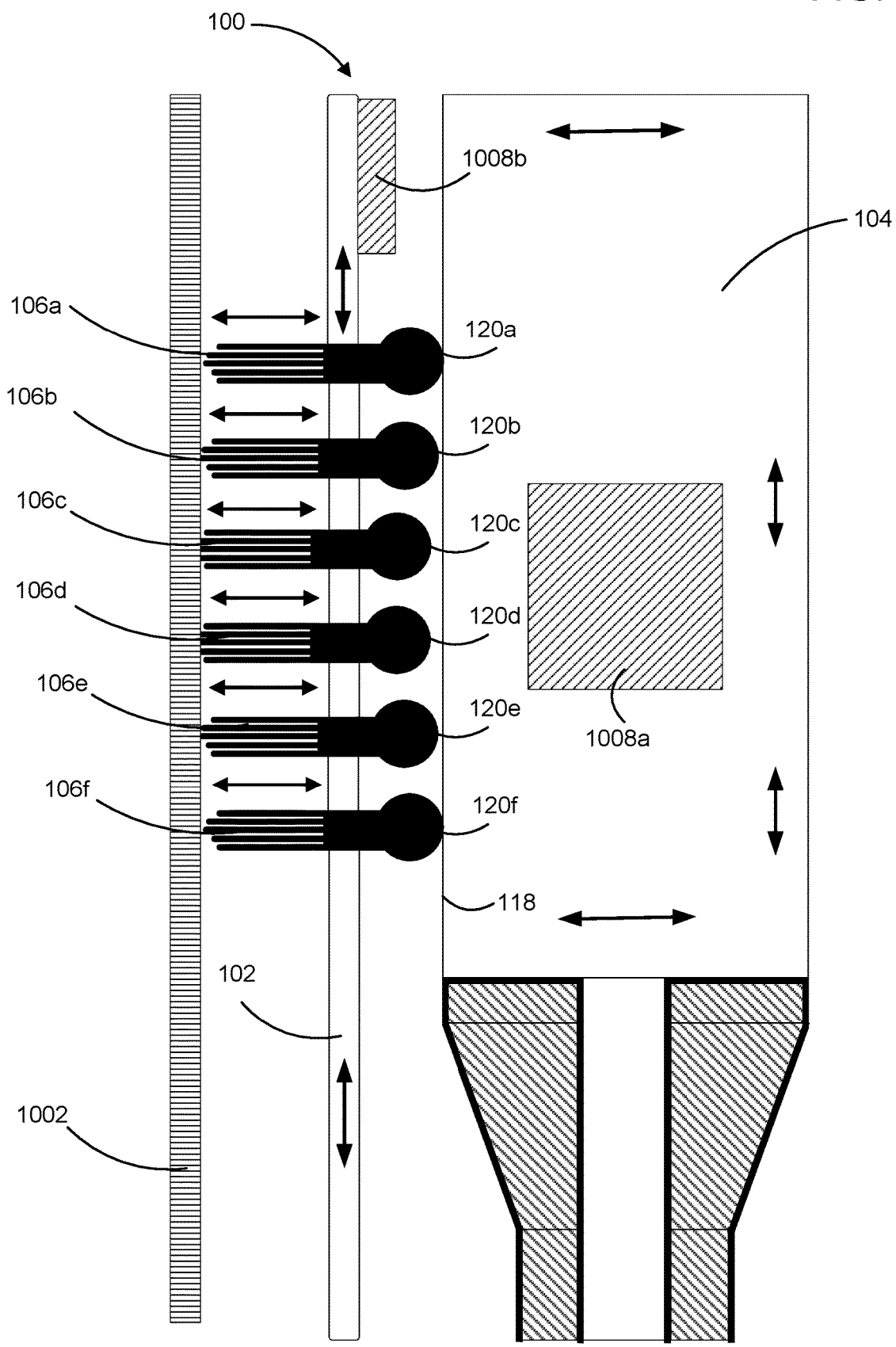
FIG. 19 illustrates a close-up of a cross-sectional side view of a brush assembly having a head, having surface, being vibrated.
Figure 20:
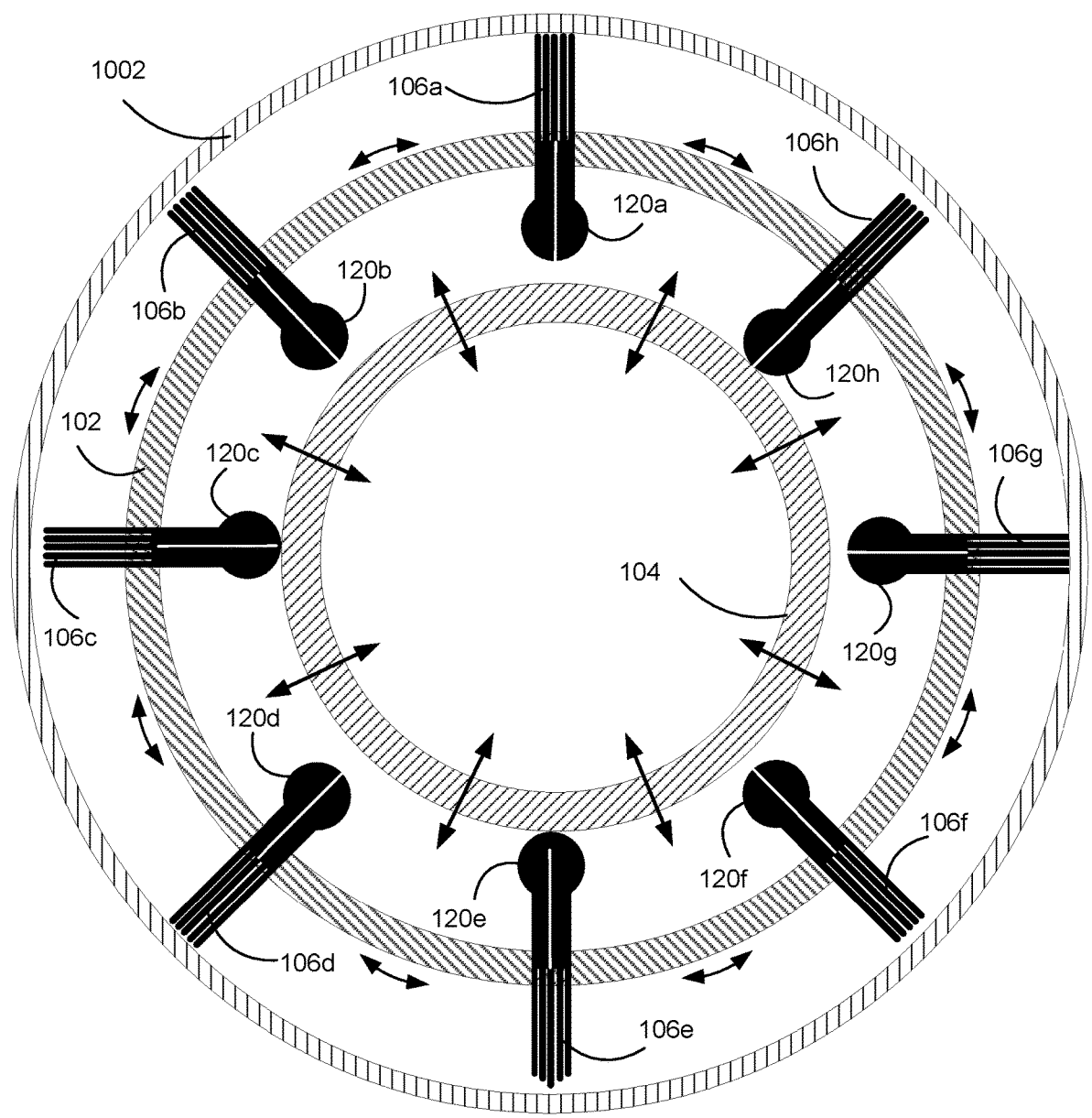
FIG. 20 illustrates a cross-sectional top view of a brush assembly having a head being vibrated.

Referring to FIG. 19 and FIG. 20, vibration on the head 104 may cause the head 104 to vibrate, e.g., move side-to-side, and/or forward-and-backward. Vibration on the face 102 may cause the face 102 to vibrate, e.g., move side-to-side, and/or forward-and-backward. Also, vibration on the face 102 may cause bristles 124 of the tufts 106*a-f* to vibrate, e.g., move side-to-side and/or forward-and-backward.

Vibration on the head 104 may cause the outer surface 118 to be moved, e.g., laterally and/or longitudinally. The outer surface 118 may be moved, e.g., laterally and/or longitudinally, towards its corresponding tuft 106 (see FIG. 2A). The vibration of the head 104 may cause the outer surface 118 to be abutted against its corresponding tuft 106.

In some cases, when abutted against a tuft 106, the outer surface 118 may push the tuft 106 away from the head 104. Accordingly, the pushed tuft 106 would be displaced and/or slid through a corresponding aperture 112 of the face 102. Moreover, bristles of the tuft 106 would be displaced, e.g., moved away, from face 102.

Furthermore, the vibration in the head 104 may cause the outer surface 118 to push a medium (not shown), e.g., fluid and/or solid object, toward corresponding tufts 106*a-h*. The pushed medium may push one or more portion of the tufts 106*a-h* through a corresponding aperture 112 of the face 102.

Ends of the one or more bristles 124 of the pushed one or more tufts 106*a-h* may be displaced farther from the face 102 towards a surface of the tubular structure 1002. The pushed one or more bristles 124 may be abutted against a surface of the tubular structure 1002.

Figure 21:
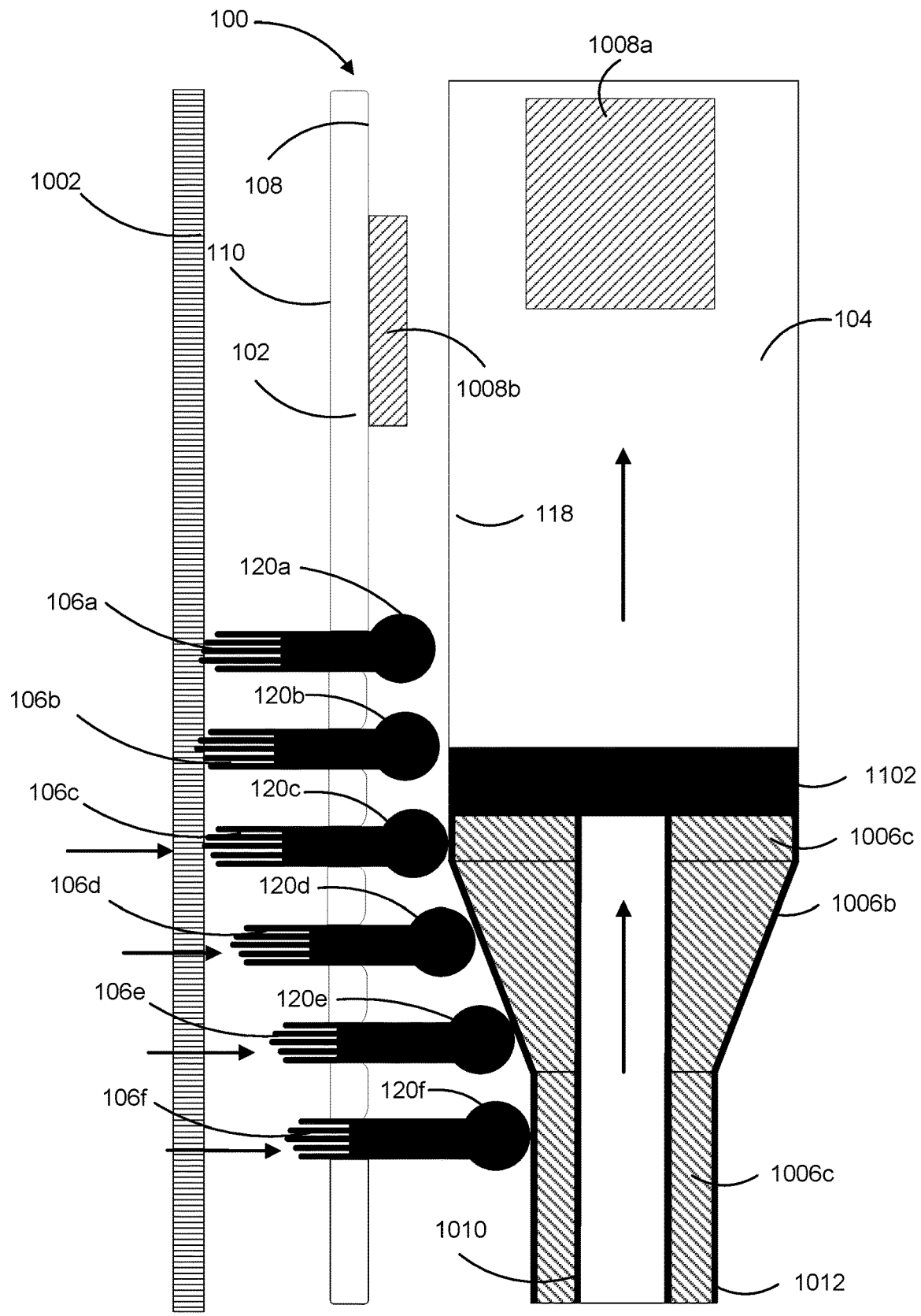
FIG. 21 illustrates a cross-sectional side view of a brush assembly having a head being moved relative to a face towards a sheathed position.

Referring to FIG. 15 and FIG. 21, after cleaning a portion of the of the tubular structure 1002, the operator may wish to position the brush assembly 100 at another portion of the tubular structure. First, the operator may actuate a drive motor (not shown). The drive motor may cause the head 104 to move, e.g., slid, upward. The head 104 may be moved relative to the tufts 106*a-f*.

Accordingly, magnets 1006*a-c* of the head 104 may be moved adjacent to one or more of the tufts 106*a-f*. Each tuft 106 may have a bulb 120. Each bulb 120 may have a magnet (not shown). The magnet of each bulb 120 may be attracted to the magnet magnets 1006*a-c* of the head 104. For example, the first magnet 1006*a* may magnetically attract the tufts 106*f*. The magnet 1006*b* may magnetically attract the tufts 106*d*, 106*e*. the first magnet 1006*a* may magnetically attract the tuft 106*c*

As the head is moved upwardly, the tufts 106*a-f* may be slid along the magnets 1006*a-c*. At the same time, the magnetics 1006*a-c* may pull the tufts 106*a-f* towards the central axis of the head 104. The tufts 106*a-f* may then be abutted against the respective magnets 1006*a-c*. Moreover, the tufts 106*a-f* may also physically touch the respective magnets 1006*a-c*. The operator may now deploy the brush assembly 100 to another part of the tubular structure 1002 for cleaning.

What is claimed as the invention is:

1. A brush assembly, comprising:
    a motor capable of generating vibration;
    a head coupled to the motor, the head having:
        a first head surface;
        a second head surface having a knob protruding away from the first head surface; and
        a side surface disposed between the first head surface and the second head surface;
    a face removably coupled to the side surface, the face having a face surface facing the knob; and
    a tuft coupled to the face, wherein the knob is capable of pushing an end of the tuft to separate from the knob by a distance.

2. The brush assembly of claim 1, wherein a portion of the tuft extends through the face.

3. The brush assembly of claim 1, wherein the tuft is slidably coupled to the face.

4. The brush assembly of claim 1, wherein an end of the tuft is capable of being moved axially and laterally away from the knob.

5. The brush assembly of claim 1, wherein the knob is capable of being moved axially and laterally towards the tuft.

6. The brush assembly of claim 1, wherein the knob is capable of being moved axially and laterally away from the tuft.

7. The brush assembly of claim 1, wherein:
    the side surface of the head has a protrusion; and
    the face has a sidewall having an aperture receiving the protrusion.

8. The brush assembly of claim 1, wherein:
    the face has a sidewall having a protrusion; and
    the side surface of the head has a groove receiving the protrusion.

9. The brush assembly of claim 1, wherein the knob is capable of pushing a portion of the face surface to separate from the knob by a distance.

10. The brush assembly of claim 1, wherein the knob and the end of the tuft are separated by a distance.

11. The brush assembly of claim 1, wherein the knob and the end of the tuft are capable of having fluid disposed therebetween.

12. The brush assembly of claim 1, wherein the knob is capable of pushing the end of the tuft to increase an axial distance between the knob and the end of the tuft.

13. The brush assembly of claim 1, wherein the knob is capable of pushing the end of the tuft to increase a lateral distance between the knob and the end of the tuft.

* * * * *